(12) United States Patent
Patadia

(10) Patent No.: US 10,595,660 B2
(45) Date of Patent: Mar. 24, 2020

(54) PORTABLE FULLY AUTOMATIC COOKING SYSTEM

(71) Applicant: Bhagirath Ghanshyambhai Patadia, Ahmedabad (IN)

(72) Inventor: Bhagirath Ghanshyambhai Patadia, Ahmedabad (IN)

(*) Notice: Subject to any disclaimer, the term of this patent is extended or adjusted under 35 U.S.C. 154(b) by 813 days.

(21) Appl. No.: 15/025,426

(22) PCT Filed: Oct. 1, 2014

(86) PCT No.: PCT/IN2014/000640
§ 371 (c)(1),
(2) Date: Mar. 28, 2016

(87) PCT Pub. No.: WO2015/075730
PCT Pub. Date: May 28, 2015

(65) Prior Publication Data
US 2016/0235239 A1 Aug. 18, 2016

(30) Foreign Application Priority Data

Oct. 7, 2013 (IN) .......................... 3173/MUM/2013

(51) Int. Cl.
*A47J 27/00* (2006.01)
*A47J 27/04* (2006.01)
(Continued)

(52) U.S. Cl.
CPC ............. *A47J 27/002* (2013.01); *A47J 27/04* (2013.01); *A47J 27/0802* (2013.01);
(Continued)

(58) Field of Classification Search
CPC .... A47J 2027/043; A47J 27/002; A47J 27/04; A47J 27/08; A47J 27/0802;
(Continued)

(56) References Cited

U.S. PATENT DOCUMENTS 5,832,814 A 11/1998 Nakatani
6,552,309 B1* 4/2003 Kish ..................... H05B 6/6441
219/413
(Continued)

FOREIGN PATENT DOCUMENTS

EP 2767197 A1 8/2014

*Primary Examiner* — Dana Ross
*Assistant Examiner* — Joseph W Iskra

(57) ABSTRACT

The present invention is a portable fully automatic cooking system which can automatically prepare food items as per the user's demand 'by using recipes files, data and cooking centric algorithm software stored in user interface device or by downloading the needed recipe from remote server. This machine unit of system can be controlled by any kind of computation device, laptop, tablet, computer, smart phone etc for cooking, recording, managing which satisfies hardware and software requirement standards of system which user can control and command through physical presence or from remote location. Machine unit stores various ingredients inside it and demands for chief ingredients and cooks recipes in accordance with recipe using custom developed artificial intelligence. The scalability and flexibility of machine design, structure, components and positioning makes automated cooking possible, efficient and most practical. The capability to add custom vessels, modules and attachments adds extended efficiency in automated cooking.

20 Claims, 30 Drawing Sheets

(51) Int. Cl.
*A47J 27/08* (2006.01)
*G05B 19/042* (2006.01)

(52) U.S. Cl.
CPC ..... *G05B 19/0426* (2013.01); *A47J 2027/043* (2013.01); *G05B 2219/2643* (2013.01)

(58) Field of Classification Search
CPC ........ A47J 27/0804; A47J 27/09; A47J 44/00; G05B 19/0426; G05B 2219/2643
USPC .............. 99/325, 326, 423; 711/154; 705/15
See application file for complete search history.

(56) References Cited

U.S. PATENT DOCUMENTS

| | | | | |
|---|---|---|---|---|
| 6,949,729 | B1* | 9/2005 | Ishikawa | H05B 6/688 219/702 |
| 7,060,953 | B2* | 6/2006 | Ishikawa | B65D 5/42 219/506 |
| 7,304,275 | B2* | 12/2007 | Chun | H05B 6/6441 219/497 |
| 8,145,854 | B1* | 3/2012 | Lee | G06Q 10/06316 711/154 |
| 8,835,816 | B2* | 9/2014 | McIntyre | G06Q 50/12 219/412 |
| 9,702,858 | B1* | 7/2017 | Minvielle | G01N 33/02 |
| 2003/0037681 | A1* | 2/2003 | Zhu | A47J 27/62 99/325 |
| 2004/0099144 | A1* | 5/2004 | Kudo | G06Q 30/06 99/325 |
| 2004/0173103 | A1* | 9/2004 | Won | A47J 27/62 99/326 |
| 2005/0193901 | A1* | 9/2005 | Buehler | A47J 44/00 99/468 |
| 2009/0092723 | A1* | 4/2009 | Flynn, Jr. | A47J 36/32 426/523 |
| 2010/0057540 | A1* | 3/2010 | Tanaka | G06Q 10/087 705/15 |
| 2011/0132201 | A1* | 6/2011 | Richardson | F24C 7/08 99/325 |
| 2012/0114815 | A1* | 5/2012 | Wolfe | A47J 36/165 426/231 |
| 2013/0074062 | A1* | 3/2013 | Arnold | G05B 19/0426 717/171 |
| 2013/0092032 | A1* | 4/2013 | Cafferty | F24C 7/08 99/325 |
| 2013/0226716 | A1* | 8/2013 | Balassanian | G06Q 30/00 705/15 |
| 2013/0265159 | A1* | 10/2013 | Durian | F24C 7/08 340/540 |
| 2014/0170275 | A1* | 6/2014 | Bordin | G09B 19/24 426/233 |
| 2014/0278936 | A1* | 9/2014 | Fescenmeyer | H05B 1/0261 705/14.45 |
| 2014/0370167 | A1* | 12/2014 | Garden | G06Q 50/12 426/233 |
| 2015/0187027 | A1* | 7/2015 | Lowe | G06Q 50/12 705/15 |
| 2015/0260699 | A1* | 9/2015 | Minvielle | G06F 16/00 426/231 |
| 2016/0150915 | A1* | 6/2016 | Yu | A47J 36/32 99/327 |

* cited by examiner

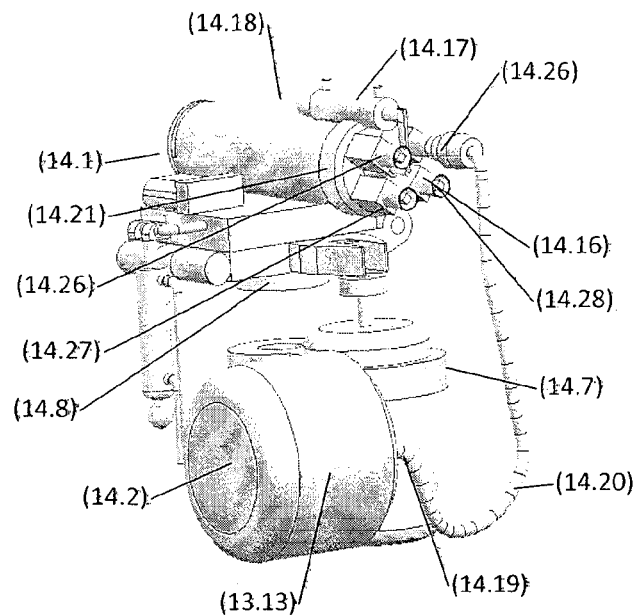
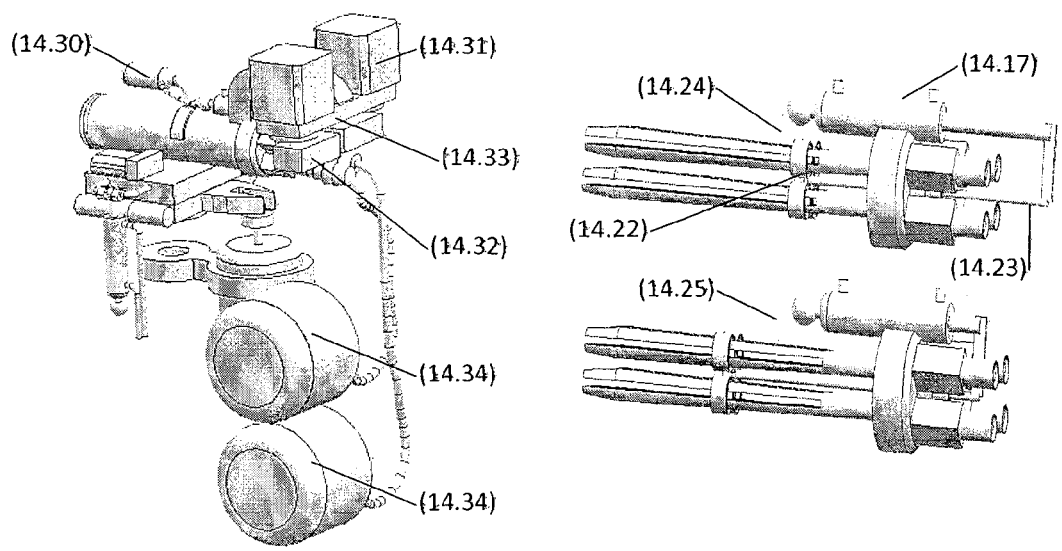
FIG. 14 (b)

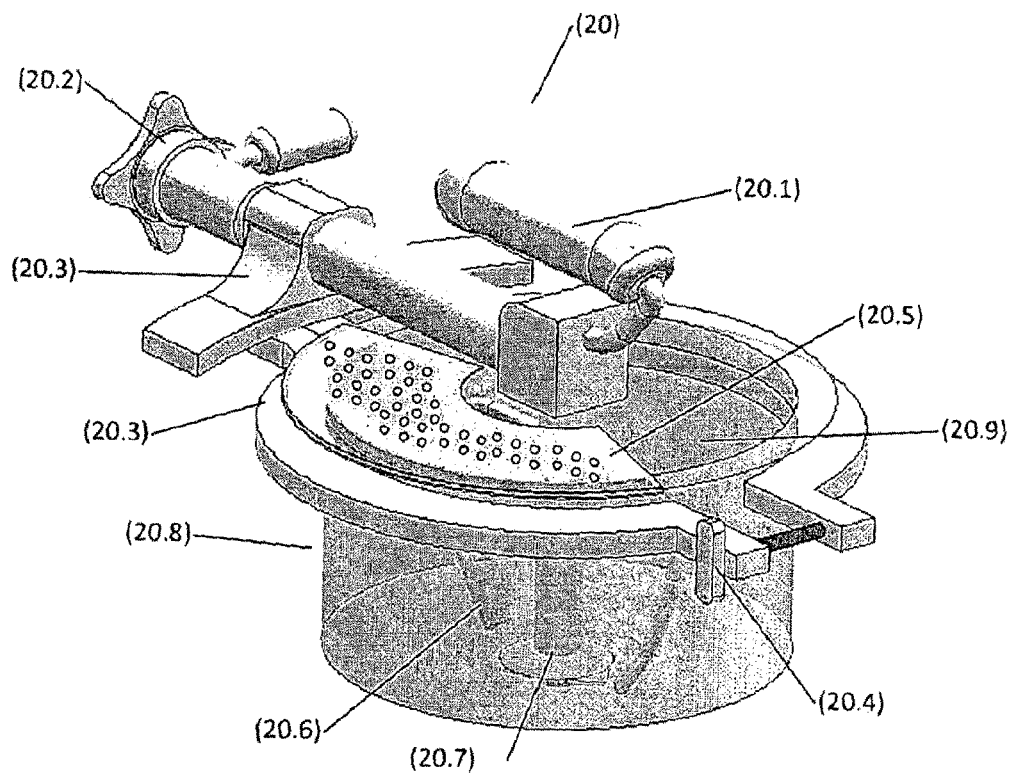
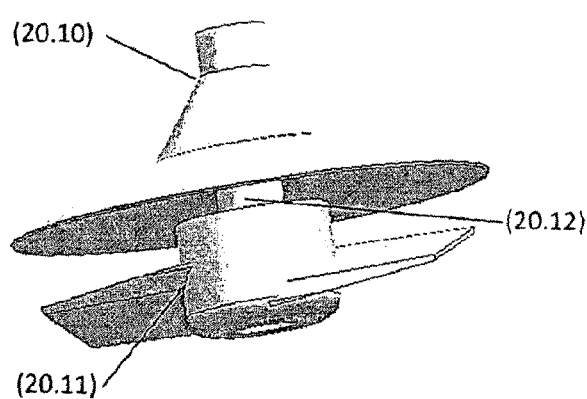
FIG. 20

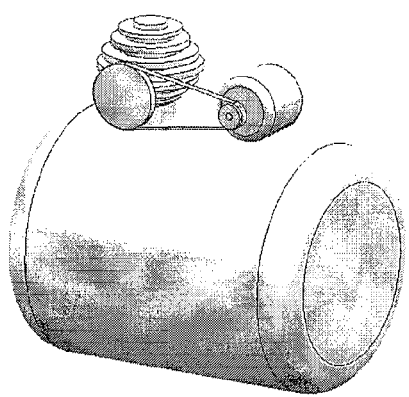
FIG. 24.1
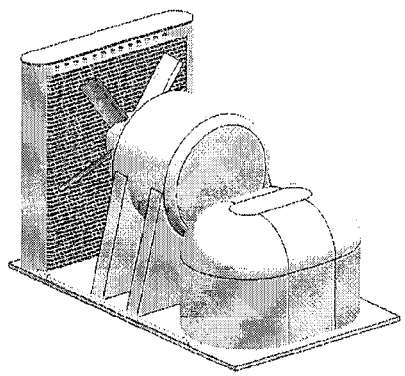
FIG. 24.2
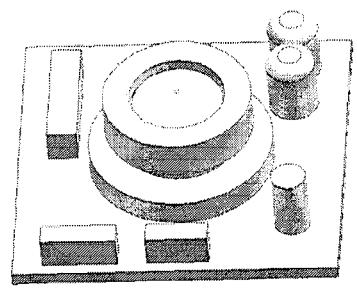
FIG. 24.3

| Remote Server details | | | |
|---|---|---|---|
| Remote Server Hardware specifications | | Remote Server software specifications | |
| CPU (High speed multi core, Multi tasking) | High speed Internet connection | Internet/Server centered Operating System | Web server software, and prerequisites libraries |
| Memory (RAM Min. 16 GB) | Input devices: Keyboard, mouse | Database software (RDBMS) with prerequisites | Custom Web application software and prerequisites |
| Hard disks storage (Min. 500 GB) | Output visual devices: HD monitor | Security and safety & Admin Panel | Application Framework environment |
| Network/Ethernet Adapter | Network related hardware components | Support prerequisites softwares/firmwares related to machines, devices and modules | |
| External media/disc reader/writer unit | Additional slots for up gradations | | |

| Web Application | | | |
|---|---|---|---|
| Recipes database management | User/ User profile management | Web Services, Recipes, data management and serving | Machine and Interface Device Validating mechanism |
| Custom database management | Updating/troubleshooting and support | | Recipe validation system |
| Firmwares and Softwares Management | Forum and user assistance programs, tools, videos | UID Interaction and management API | Virtual Recipe preparation tool & emulator |
| Communication Services / Application programming Interface, modules & vessels Management | | Monitoring, managing and guiding monetary incentive structure | |

| Master Database & data store/data file system | | |
|---|---|---|
| Multi cuisine Recipes | Users and profiles | Each component's (Modules, vessels, attachments etc) technical, non technical details |
| Ingredient technical details | Best cooking standards, best mixes data | Firmware/software's version, documentation, technical details, adaptability, troubleshooting, forums etc |
| Ingredient life cycle | Ingredient's cooking cycle | Scientific analysis of ingredients' characteristics, nature, appropriate favorable ingredient's, nutrition table, cooking constraints, tips, pre-mid-post ingredient queuing, adding strategies etc |
| Machine virtual shadow /backup | Syncing and sharing details | |

FIG. 26

User Interface Device details (Laptops, tablets etc)

Hardware specifications

| Input: Multi Touch, mouse, Keyboard, Voice, gestures devices etc supportability | Multi Core, multi-tasking CPU (processor) | Multi protocol communication support Like Serial, USB, Wi-Fi, Ethernet, Bluetooth etc | High speed Internet, High Gen. Mobile carrier connectivity technologies additions Support (Min. 3G) (direct or indirect) |
|---|---|---|---|
| | High capacity RAM (Min. 4 GB) | | |
| | External Data storage/sharing medium support | | |
| Media: HD video & display panel, audio, Microphone, Camera, extended video etc support | Hardware up gradation support | High upgradable Memory/Data Storage capacity, basic features &functionalities | Various sensor support like multi axis gyro, proximity etc |
| | Battery backup | | |

Software specifications

Operating System

| Operating System with Upgrade support | Custom applications & libraries support | Database Framework support, SQL, RDBMS | (Shell/Kernel) Core Drivers, Additional drivers' installation framework support |
|---|---|---|---|
| | Security and safety features& control panel/settings | Multi protocol communication support code libraries | |
| Updatable Application/ Software Framework | Multi language support | Application runtime environment | Media: Streaming, multi codec/format support, accelerated 3D Graphics support |
| Multiple Internal/external memory type Adaptation support | Custom hardware management Libraries | Memory management | |

Master Controlling software

| Auto multi cuisine cooking | Recipes Management | Custom developed Business Intelligence and artificial intelligence logics and libraries for efficient auto cooking |
|---|---|---|
| | User & Profile management | |
| Manual Cooking, Recording & testing | Maintenance, management Updates and troubleshooting | |
| Sharing, sync, uploading and downloading | Multi layer secured Communication, sync, mediating management and support | Modules Bridge Interface: custom Module's/vessels' virtual/digital and physical connectivity |
| Simultaneous optimum cooking recommendations and audio visual suggestions | Custom, Efficient cooking logics, and computations | Very easy, informative, least effort centered User Interface and design |
| Online, Offline and remote Operating Modes | Encryption/Decryption, packing and unpacking, compressing and extracting support | Multi lingual HD audio & video support and guidance |
| Stock maintenance, refilling and ordering | Custom protocol for efficient and scalable System to/from machine communications | Live visuals of operations support |
| Shop and ecommerce support | | File/Data management/sharing/sync |
| Computing sensor inputs, direct output to hardware, Processing / computing appropriate executions | | Data conversion custom logics |
| Custom logics, formulas, standards, practical implementation data, computations for efficient and auto cooking; Cleaning module's management | | |

Custom cooking Local Database/files

| Multi cuisines Recipes' relational structured Data |
|---|
| Ingredient's life cycle relational structured data |
| Ingredients cooking cycle relational structured data |
| Scientific calculations, analysis, best combinations of ingredient usage etc |
| Custom data formation for efficient usage, communication and execution, i.e. structured data formats and packets |
| User Profiles data & other data |

FIG. 27

| Microcontroller (Device/Machine Controller unit) |||
|---|---|---|
| Hardware || Software |
| Analog Input / Output Ports/Pins | Digital Input / Output Ports/Pins | Base Firmware/Mini Operating System |
| CPU - Controller & Processor | Debug & programming interface | Core Utility and Programming Libraries \| Upgradable Firmware |
| ADC & DAC | Power control | Communication Protocols \| Programmability |
| RAM/SRAM/NVRAM | EEPROM | Custom Active Core Program |
| OSC/CLK control | Flash memory | Indefinite Running Program \| Events and methods handler |
| PWM & Frequency generator | Timers/Counters | Adv. Encrypter/Decrypter \| Interrupts and timers Handler |
| Process/status Indicators | Video and Audio support | Communication manager \| Data Converters, command stacking / queuing |
| (Multi)Serial, USARTs, TWI, I2C, SPI || Custom Code extractor \| |
| External Bus Interface \| Watchdog || Multi tasking Master Command Handler \| Custom Utility Functions & Libraries |
| Multiple communication modules || Slave command Executor \| Signal & Data Processing |
| Data Cards \| Wi-Fi, Ethernet, USB || Hardware Controller \| Analog and digital Signal Processing |
| External Controlling modules support & Peripherals support || Custom Hardware Libraries \| Configurability, reusability of Code |
| || Sensor Input and process management \| Electronics/motors/actuators etc management |
| || Multiple Industrial microcontroller inter control communication and management, multiple microcontroller and IC task manager |
| || Dedicated electronics components/hardware management and control |

FIG. 28

PORTABLE FULLY AUTOMATIC COOKING SYSTEM

FIELD OF THE INVENTION

The present invention relates to an automatic cooking system which is portable, can be used in both single and Multiple phases of cooking methods/techniques, has compatible modules, vessels and attachments, adapting capabilities, and is user friendly in usage and controlling.

BACKGROUND OF THE INVENTION

Mankind has a requirement to eat food for its growth and survival. In ancient days, man used to pick up the fruits and vegetables directly from plants or used to hunt for animals and eat them. With the discovery of fire, ancient cooking started in which man used to roast his food before eating. Today cooking of food has become a necessity for mankind.

Cooking or cookery is the art or practice of preparing food for consumption with the use of heat. Cooking techniques and ingredients vary widely across, the world, reflecting unique environmental, economic, and cultural traditions. Preparing food with heat or fire is an activity unique to humans. There are many methods of cooking, most of which have been known since antiquity. These include baking, roasting, frying, grilling, barbecuing, smoking, boiling, steaming, and braising. A more recent innovation is microwaving. The said methods are generally used by majority of people for cooking food. The cooking devices available today are compatible to these methods of cooking. These devices provide cooking method and consume cooking, materials compatible to each other which result in faster cooking rather faster meal preparation. But they do not cook meats using fresh ingredients which are typical to home cooked food which is both healthy and hygienic. These devices mainly shorten the period and complexity of cooking which mainly involves the usage of frozen or stored food which isn't quite healthy.

Although cooking is essential, it can't be done by all as it requires basic knowledge as well as skill of cooking. One should know the art of cooking to cook food. Moreover, in today's world many people face various obstacles in cooking food like time, dedication, knowledge, mastery etc. So they depend on others to cook their food, outsource their requirement or go to restaurants or hotels for eating. But in such cases one has to compromise on the quality, taste, quantity, health & hygiene, availability, cost etc. So with the help of technology, man has developed machines for cooking food based on his needs and requirements.

U.S. Pat. No. 4,450,757 describes an automatic machine for cooking food such as soup-paste, rice or pot herbs, in which a support structure with a base and an upper working plane is provided with an open cooking tank contained within the support structure above the base and below the working plane, a water entry duct and an exit overflow duct is provided, water is supplied to the tank at a predetermined temperature, and a water circulation is associated with the tank and housed within the support structure for circulating cooking water at a predetermined temperature through the tank for intermixing with the water supplied by the water supply to the tank, and the temperature of the water in the tank is maintained at a predetermined temperature while the level of the cooking water is maintained at a predetermined level and the water is forced to exit through the overflow duct for the removal from the cooking water in the tank of particles suspended in the water such as starch and scums through the overflow duct.

U.S. Pat. No. 4,548,130 discusses an automatic food cooking, machine comprising, a frame supporting, a housing having an unobstructed opening with an adjustable heating surface at the bottom thereof. Mounted in the opening of the housing are a pair of spaced parallel endless conveyor chains supported on sprockets connected to a pair of spaced shafts—one driven by a motor, and one used for adjustment of conveyor chain tension. Mounted between these shafts are idler sprockets used to support the conveyor chain. A plurality of spaced angles are connected to the conveyor chains, and a retainer fastened to the spaced angle is used to secure each food basket comprised of a bottom, four sides, and a hinged lid. A sauce dispenser is supported by a bracket fastened to a slide rail at the top of the housing. As the actuating tab fastened to a retainer moves slowly toward the sauce dispenser and makes contact, it automatically rotates said dispenser 90 degree allowing sauce to drip directly on the food product. As the actuating tab travels, past the sauce dispenser, said dispenser automatically returns to an upright or "off" position. A heating surface located at the bottom of the housing is supported by four cables passing through guides to a central guide where they are swedged to a main cable that is fastened to a hand crank.

U.S. Pat. No. 5,833,295 discloses a lightweight mobile kitchen which has the capability to be transported to a remote food service site by a small prime mover and quickly, be placed in operation by a minimal crew. The kitchen is self contained on a wheeled chassis and is moved as a closed wagon, then the sides and end are opened for cooking. Accessory flexible enclosure material is connected to the wagon sides to provide an enclosure for protection from the elements during service and consumption of food. The efficiency of the cooking operation results, from the layout of the various utilities to maximize the individual resources of the cooks. The kitchen has compartmentalized areas for sanitation, food preparation, grilling, convection baking, ovens, and warming. The kitchen is self contained and includes its own fuel, filtration system, potable water, fuel, electric lights, an automatic gas shutoff and a fire suppression system.

U.S. Pat. No. 6,598,514 discloses a kiosk (10) that enables pasta portions of the type forming the classical Italian first course to be prepared, the kiosk (10) including an automatic pasta cooking machine (18); a cooking hob (20) for amalgamating within a suitable container, by heating accompanied by mixing, the required sauces or condiments with the pasta previously cooked in the pasta cooking machine; and a heating element (22) for heating the sauces or condiments and/or for maintaining them hot.

US Patent Application 20040172380 provides an automatic cooking method and system, wherein the cooking process of a chef is recorded. Then, a program about the cooking process is obtained with information about amounts and kinds of main ingredients and seasoning materials used by the chef, timing of adding main ingredients and seasoning materials and movement tracks of the cooking container and shovel. Thereafter, manipulators of a mechanical operating system of the present invention imitate chefs cooking process according, to commend signal from the program to produce a dish. The present invention uses recording devices to record chefs cooking process and provide a program, then respective mechanical operating system accomplishes, cooking, tasks imitating the chef, which provides restaurants and households with dishes by the chef when using the program and mechanical operating system. The present invention not only made exceptional dishes widely available, it can also serve a large number of patrons at the same time.

US Patent Application 20130122166 gives an automated multi layered Poratta production process which is fully hygienic and automatic production system. In Asian countries multi layered Parotta/flat bread production is done by hand and its hard labour-ship. In this above mentioned process very thin 0.5 mm wheat flour dough is done by sheeter machine. This thin sheet is rolled and kept in freezer below 48 degree centigrade. After this rolled dough got rigid, its sliced and cooked by hot plate press cooking. This will deliver multi layered Parotta after cooking. This product is cooled below 20 degree centigrade with the help of the cooling system. After cooling the product is immediately packed.

WO 2010052301 gives a machine for automatically cooking foodstuffs in general, comprising a boiler, a compensation chamber and cooking means for multiple and differentiated doses of said foodstuffs, these means consisting of at least two cooking chambers, equipped with respective dosing units for the same foodstuffs. Each dosing unit is also provided with an upper conduit, adapted to selectively receive the food from a distributor hopper, arranged rotating above the same dosing units. Compared to known machines in this field, the machine according to the invention offers the advantage of enabling, to cook several doses of food, thereby overcoming the traditional need to have the same number of machines as there are doses to be cooked. Moreover the machine according to the invention offers the important advantage of being able to cook, simultaneously, several doses of reciprocally different foodstuffs (e.g. spaghetti, macaroni and other types of pasta.)

EP 1532902 discloses an automatic cooking, machine, especially one that can property control the duration and degree of cooking of cooked materials and can automatically perform various main cooking, techniques. The automatic cooking machine comprising a pan, a sensor system, an auto feeding system, an auto adjusting system for heating intensity by gas/electrical heating, an auto turnover system for the cooked materials, an auto taking-out system for the cooked materials and a computer control system. In the present invention, under the control of the computer control system, the sensor system directly detects the duration and degree of cooking of the cooked materials, the auto adjusting system for heating intensity automatically regulates heating power in a continuous manner or a multistage manner, the auto feeding system automatically feeds the cooking-material at the proper duration and degree of cooking, and the auto turnover/taking-out system for the cooked materials turns over and takes out the cooked materials at the proper moment under the requirements of cooking techniques. Therefore, the automatic cooking machine can perform various main cooking techniques, especially those for preparing Chinese dishes.

KR 20060121492 relates to a device for automatically cooking food to automatically process the cooking preparation steps in order after preparing for pans and supplying the water by mounting the pan supply units and the pan transfer units. A device for automatically cooking food having, pan supply units (20), where the loaded pans are discharged one by one by a separation cam (25) rotated by a motor (21), and pan transfer units for automatically transferring the pan to burners (14) is composed of: a body (10) having, plural rails (13) so as to place plural burners separated with a regular interval and to place the pans on the burners; the plural pan supply units corresponding, to the burners; the plural pan transfer units corresponding to the burners; and a control box (40) having an auto/manual switch (41) simultaneously operating or selectively/manually operating, the plural burners, pan supply units, and pan transfer units. A hot water tank (50) is mounted at the body to supply the hot water or gravy to the pans.

CN 1337203 relates to a full-automatic cooking machine, including cover plate, motor for placing material, material-placing, plate, stir-frying, pan, turning shovel and hopper. Said components are coaxially mounted in the cooking machine in turn from upper to lower. Between cover plate and material-placing plate several partition boards are set, and between the several partition boards and motor sleeve and machine shell a dish-holding basket is formed. The material-placing plate is a circular disk with notch, and can be driven by motor and rotated, and the turning shovel is mounted in the stir-frying pan positioned in the middle of machine shell, both are coaxially mounted, and fixed on the machine shell by means of left and right rotating shaft, its hopper is placed under the stir-frying pan, and a dish plate is placed under the hopper. The invention can implement whole cooking process, and can cook one or several dishes.

CN 1843272 discloses an automatic cooking device and the using method. The device comprises: heating device (1), pan (2), stirring device (3), addition device for solid condiment (4), addition device for liquid condiment (5), addition device for main condiment and findings (6), and controlling device (7) controlling devices mentioned above. The cooking procedure is imported into microcomputer in controlling device, the pan is detachably, installed in heating device, stirring device is foldably installed in the top of pan; and the addition devices for solid condiment, for liquid condiment and for main condiment and findings are controlled by controlling, device through electromagnet, electromagnet valve or electromagnet pump. The invention is characterized by simple structure and small size.

CN 102144745 relates to a cooking method which is completed in an automatic or semi-automatic cooking apparatus and can realize various cooking processes and a cooking auxiliary device, wherein the cooking method comprises the following, steps: firstly placing or putting materials for cooking in a certain cooking container or a heating position; secondly providing information of cooking, type and position information of the materials for cooking, and then calling a corresponding, cooking program according to the information of the cooking type; further judging the cooking container or the heating position in which the materials for cooking are located according to the position information; and finally running the called cooking program for performing cooking control on the materials for cooking or emitting, a cooking operation prompt when necessary according to the cooking process. By adopting the cooking method and the device, the same computer program or the different computer programs can be used for simultaneously automatically controlling or prompting the cooking process of two or more dishes for an operator, the cooking process of two or more dishes with different cooking types/cooking requirements and the cooking process of two or more dishes with different start/end times of cooking.

Indian Patent 234587 describes a two, in one cooking vessel with filter and valve which is a closed type of vessel (Nos. 8, 3 and 1 in the Drawing) with the safety features (Nos. 2 and 4 in the Drawing), easy flow type filter valve for residual materials (Nos. 9 and 10 in the Drawing), fixed partition plate within the main vessel (NO. 7), filtering plate with stand (No. 11), provision of safety holes with safety pressure lids on the upper vessel cover (Nos. 2 and 4) and with the necessary vessel handles including upper vessel handle (Nos. 1 and 6). In this vessel there is no necessity to tilt the vessel to filter the excess water in the rice cooking compartment. Further simultaneous preparation of more than one food items (Rice and Sambar etc.) is possible. Automatic lifting of the lids (No. 2) is provided, while the steam inside the vessel is excessive through the pressure holes (No. 4).

Indian Patent Application 1533/CHE/2008 provides an automated system of preparing dishes designed with the preparation of South Indian food In mind, the system can be adapted to whatever type of food is desired by the user. The system comprises of a single machine with all the ingredients stored In their respective docks. An Induction heating pan heats a cooking vessel to a desired temperature. The cooking pan includes a temperature sensing element to monitor heating of the pan and cooking of the food. The machine when needed does chopping vegetables and seasoning automatically. At last the pan ejects out with the dish cooked and Is ready to be eaten.

Although a number of automatic cooking machines are available in the prior art, they are mostly limited to or targeted at cooking specific types of dishes and most of them are semi-automatic i.e. in such machines, most of the work needs to be done manually. Such machines require the user's presence while cooking food. Those inventions in which manual presence is not essential, the machine cooks limited recipes and their working area is limited. Moreover, most of these machines aren't user-friendly in using, operating and cooking; and are bulky and so haven't got much market exposure. So a portable, fully automatic cooking machine, compatible to all cuisine and food preparation methods, having assistive attachments, compatible vessels and modules adding capabilities, is user-friendly and is controlled using latest technologies is the need of the day.

OBJECT OF THE INVENTION

The main object of the invention is to provide for a portable fully automatic cooking, system consisting of multi layered hierarchical units i.e. Top layer—remote server, Middle layer—user interface device units and Bottom layer—machine unit; where a machine unit that performs cooking automatically, along with heavy support of interactivity, and ease in usability and precision in commands, control and communication executions wherein the system has a wide range of User Interface Devices i.e. laptop, desktop, tablet, smart phone etc. in its controlling layer i.e. middle layer which facilitates the user to control the machine in bottom layer and communicate with top layer i.e. the system guiding/controlling layer which is the Remote Server which holds master data and recipes, which will be used by User Interface Devices to fetch, interpret/understand, transform and execute to cook dishes as per the recipes provided directly in the machine which along with the system becomes a self contained kitchen designed to auto cook with the additional help of specially designed attachable/detachable vessels performing generic type of cooking tasks with automation and attachments which can stir/shake/blend/strain etc., modules that can perform specific tasks using or leveraging the major of brain power and muscle power of machine i.e. processing, movement, rotational, pneumatics, power etc. controlling from machines' mechanical, pneumatic, digital sockets, variety of regulated heat sources, options, procurer/carrier units of ingredients, storage containers and dispensers for temperature controlled liquids, semi liquids, powders, semi powders, flakes, special/odd shapes, compound mixture containers, carriers and dispensers etc.

Another object of the invention is to provide for a portable fully automatic cooking system which is highly efficient and effective in cooking, and cooking related tasks which requires greater level of efficiency which can be achieved only when a systematic structuring of the system is performed from initial design point for which multi layered data, command and control architecture has been designed wherein the top layer, holds the master brain of system which stores, monitors, updates, manages and provides various, types of recipe and non recipe data which is inclusive of but not limited to multi cuisine recipes file/data, technical information regarding food ingredients such as shape, format, additional metadata etc. food ingredients' life cycle database, food ingredients' cooking cycle database, user profiles, business intelligences, cooking constraints, tips, technical information regarding vessels, modules, attachments etc. in which the database/data store is regularly updated and only internal members/machines have an access to most of it for which a bridge/application programming interface is made available to communicate with the system.

Still another object of the invention is to provide for a portable fully automatic cooking system which has the User Interface Device to control the machine in the middle layer which is inclusive of but not limited to using of various computation devices which have to control the machine and also communicate with top layer i.e. Remote Server, which includes devices like desktop, laptop, tablets, smart phones, dedicated devices etc. any of which could be a right choice of this device, given that these devices contain minimum recommended characteristics in hardware and software wherein these devices contain a chief system controlling and cooking software application which performs the main tasks of cooking wherein this software is designed on the blue print of cooking multi cuisine dishes and controls the machine, vessels, modules, dispensers, etc. based on logics, business intelligences, custom work flows, constraints etc. which are designed and developed considering automated cooking wherein the application fetches a recipe file/data as selected by the user, performs required operations on it as per standards defined, interprets it, executes it on the machine and also makes sure that the command(s) has been successfully executed.

Yet another object of the invention is to provide for a portable fully automatic cooking, system which has machine controller/microcontroller(s) unit which is on the bottom side of layer hierarchy and situated inside the machine as a proxy of the System which communicates with the User Interface Device and its main tasks are to control all the hardware, electronics, other dedicated slave microcontrollers, integrated circuits, sensors, motors etc. based on the command(s) received, wherein the whole controlling electronic components make a executing unit in which the microcontroller(s) and related Integrated Circuits used also uses a custom developed program, which shares common code and protocol guidelines, and bench marks which makes whole system work fluently and efficiently.

A further object of the invention is to provide for a portable fully automatic cooking system which has the capability, adaptability and scope of supporting wide ranges of vessels, modules and attachments wherein the vessels are further capable of using attachments like stirring, blending, shaking, straining, chopping, mixing attachments etc. while the modules operate on totally different stage and are designed and developed considering single/multi dish preparing, as they have mastery in it i.e. they can create special dish multiple times, and these modules are easily attachable and detachable to the machine making it highly portable wherein these modules use/share existing processing, rotational, movement, sensing, and feedback controlling platform etc. of machine and cook their mastery dish on a large scale and for its adaptability feature, the machine offers various types of digital, power, pneumatic, mechanical transformation/communication/controlling sources through respective sockets to get itself connected with various modules, given that software version/driver of provided modules is available to install, as all operational and other details and logics are inside the software version/driver. The machine plays a role of platform provider for these vessels, modules, attachments etc to work on.

A still further object of the invention is to provide for a portable fully automatic cooking system which supports high level of interactivity and usability in functionality and features in User Interface Device layer which include but are not limited to auto cook, manual cook, record, recipe management, share, upload to, system, maintenance etc. which are available with high level of multi lingual audio visual multimedia interfacing, software application and control panel which provides complete interactivity, and on demand assistance in the best possible manner wherein the sharing, of newly created recipes also provides, an opportunity to earn monetary benefits as per system defined modifiable standards.

A yet further object of the invention is to provide for a portable fully automatic cooking system which provides a platform for creating special dishes multiple times with special dish creation mastery modules and various, hardware compatible with the device as well as which is cost effective and can be easily relocated from one place to another.

A still another object of the present invention is to provide for a portable fully automatic cooking system which has higher compatibility for commonly or regularly made food items used on day to day basis as a large number of people eat regular food on daily basis, and not junk food or fast food for which this feature provides them healthy and hygienically cooked food.

A yet another object of the present invention is to provide for a portable fully automatic cooking system which supports stock management/maintenance feature in User Interface Device in which information like current stocks, expiry dates, current freshness point/staleness information, best before, depleting ingredients etc. are gathered and provided to the user and the systems' business intelligence for further processing along with the presence of the feature to order required ingredients online and/or offline to choose for the user wherein the system uses the required ingredients with utmost precision and lowers per dish cost and wastage while increasing taste and nutrition.

A still further object of the present invention is, to provide for a portable fully automatic cooking system which is compatible for both online, remote and offline usage and has enhanced security features for the user as well as for the machine.

SUMMARY OF THE INVENTION

The present invention is a portable fully, automatic cooking system which can automatically cook food with respect to the instructions provided. The system holds enormous recipe data files which include complete technical information and instructions, compatible for the machine to cook food automatically from multiple cuisines. Along with this, the system also holds assistive database related to life cycle of cooking items and cooking cycle of ingredients to support cooking skills, techniques and shortcuts to perform cooking of food automatically and more efficiently. This information gets stored in the remote server which is the head component of the system. The software and algorithms present in the system controls this data, monitors and auto updates the remote server's data as and when needed. The software understands the technicalities/details of the recipe file and commands the hardware while performing cooking or non cooking operations. This system of the present invention has a control structure hierarchy, wherein top stake is taken by remote server, middle place is held by user interface device which actually controls the machine and interacts with the user and the system while at the bottom place is occupied by microcontroller(s) unit inside the machine which has all the hardware required to cook. This whole hierarchy controls and communicates in wired and/or wireless ways. As an extended feature, the system has capabilities to attach to various customized cooking, modules, which perform specialized tasks efficiently. This system has specially customized vessels like fryer/steamer, multi ingredient dropper vessel, various types of stirring vessel, generic/special types of stirring, blending, mixing, shaking, straining attachments etc. Again the vessels provided herein are few basic vessels, while the machine/system is capable of adapting vessels with further more complex operations in auto cooking, given that the vessels comply with the system governed standards to work on. These vessels, attachments and modules reduce the users' interaction in cooking thus performing auto cooking with least involvement from users. The user selected recipe/non recipes commands are converted into machine commands by the software application inside User Interface Device and sent to microcontroller/device controller unit which controls various hardware like selector and/or dropper, masala boxes, masala changer/changing, digital heat regulator, cereal dispenser unit, item holder/dispenser, item holding, chamber, liquid dispensers, heating system, main and sub items procurer/carrier, holder, dispenser, dropper etc., paste holder/dropper, supportive hardware like refrigerator system and heating system, pouring system, stir/shake mechanism, jet exhaust system etc. to facilitate the automatic cooking process. Sensors, internal feedback system and security system are provided for a failsafe measure and to ensure that correct hardware is at the correct position at the correct time thus ensuring user and machines safety and smooth working. The system of the present invention is also capable of cooking phase oriented food items which include both single/multi phase oriented dishes/meats like the food items which involve phases/stages of preparation of parts of the dish which later need to be combined as per the requirement mentioned in the recipe to prepare the final dish, can also be cooked using, this system. This enables the system to cook multiple food items at the same time or food items which involve multiple phases. The recipes can also be customized as per the user's requirement as the user can enter the data related to his/her families taste/health priorities either while setting up the device initially or at any point of time i.e. profiles. This system also keeps a stock of the various ingredients present in it and notifies, the user regarding the depleting ingredients as well and if customized, can order the list of ingredients required online or offline as mentioned by the user.

BRIEF DESCRIPTION OF THE DRAWINGS

FIG. 1(a) displays the top view of the machine.

FIG. 1(b) displays the left view of the machine.

FIG. 1(c) displays the right view of the machine.

FIG. 1(d) displays the first 3 dimensional view of the machine.

FIG. 1(e) displays the second 3 dimensional view of the machine.

FIG. 1(f) displays the rear view of the machine.

FIG. 20 displays the generic cooking vessels.

FIG. 24.1 displays the compressor unit.

FIG. 24.2 displays the refrigerator unit.

FIG. 24.3 displays the iconic digital color sensitive camera unit.

FIG. 26 displays the remote server's minimum hardware and software capabilities and specification requirements.

FIG. 27 displays, the user interface device's minimum hardware and software capabilities and specification requirements.

FIG. 28 displays, the microcontroller's minimum hardware and software capabilities and specifications requirements.

DETAILED DESCRIPTION

Figure 1:
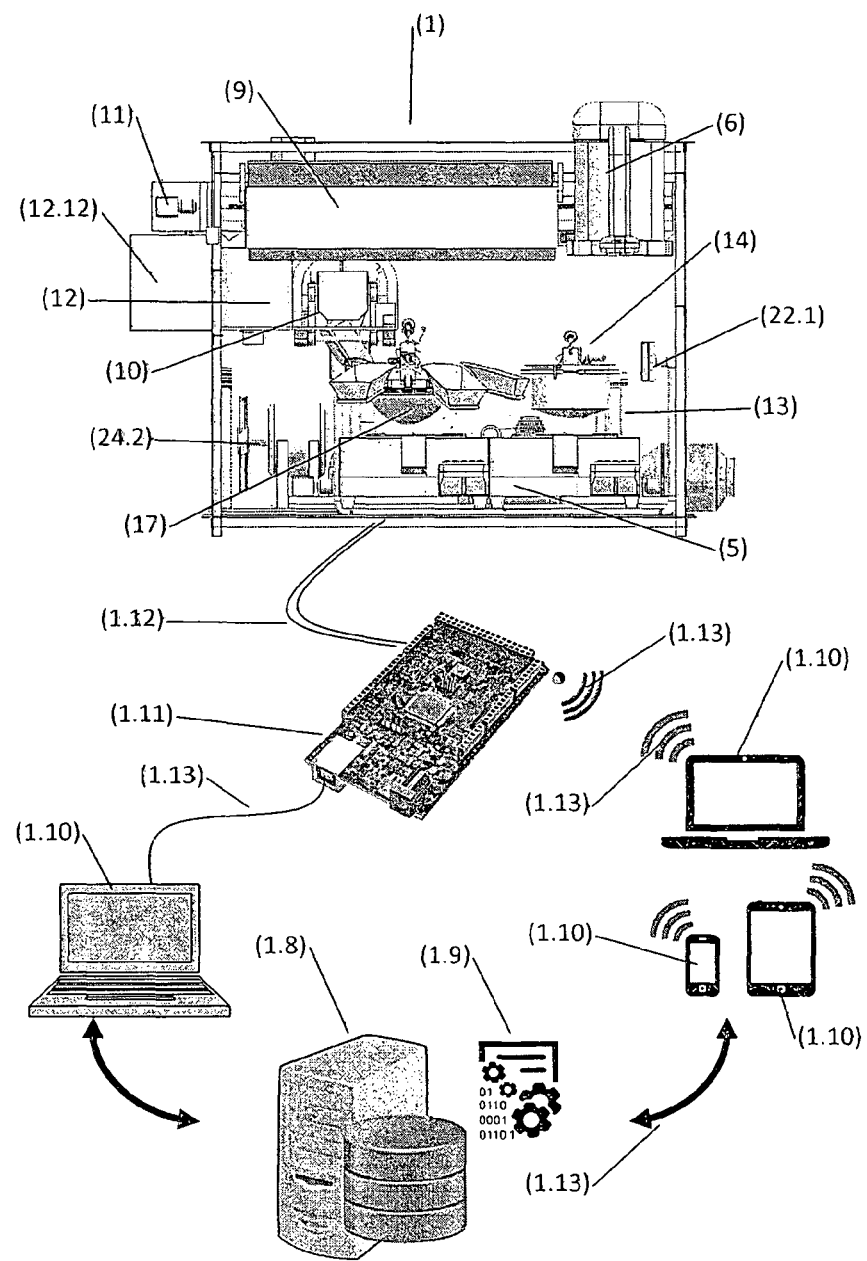
FIG. 1 displays the whole systems iconic architecture.
Figure 1:
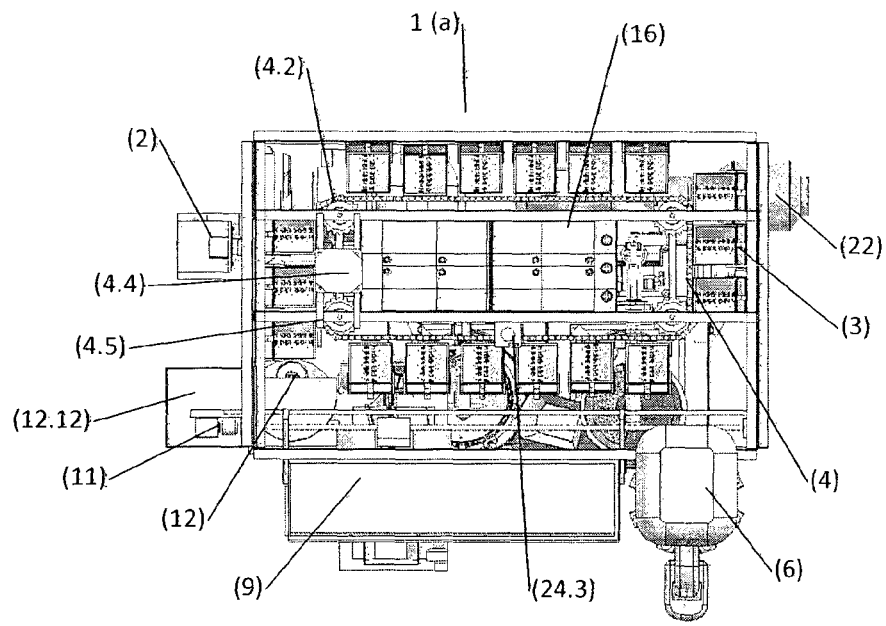
Figure 1:
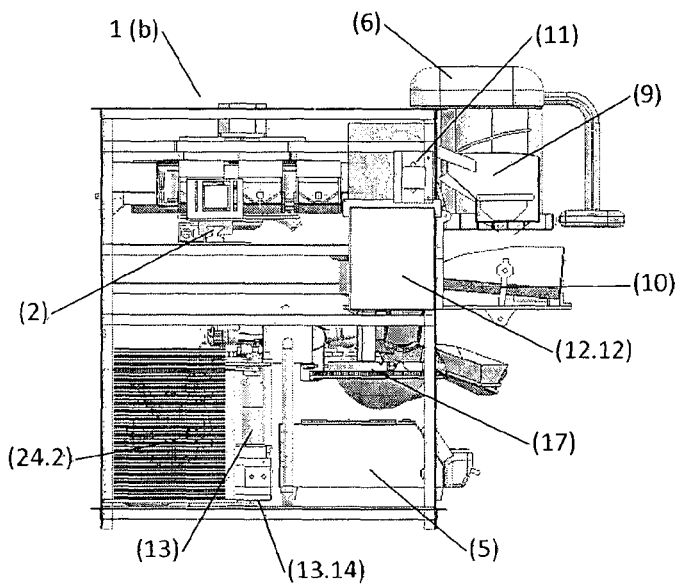
Figure 1:
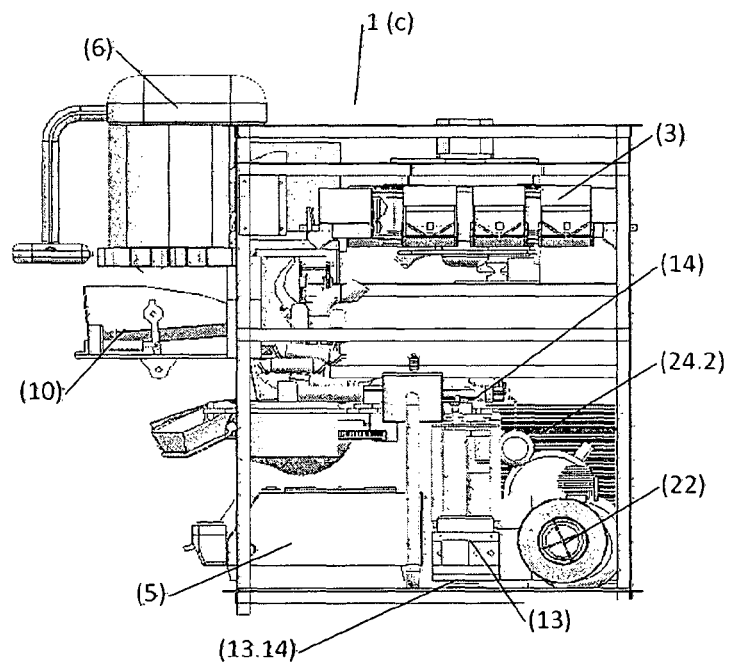
Figure 1:
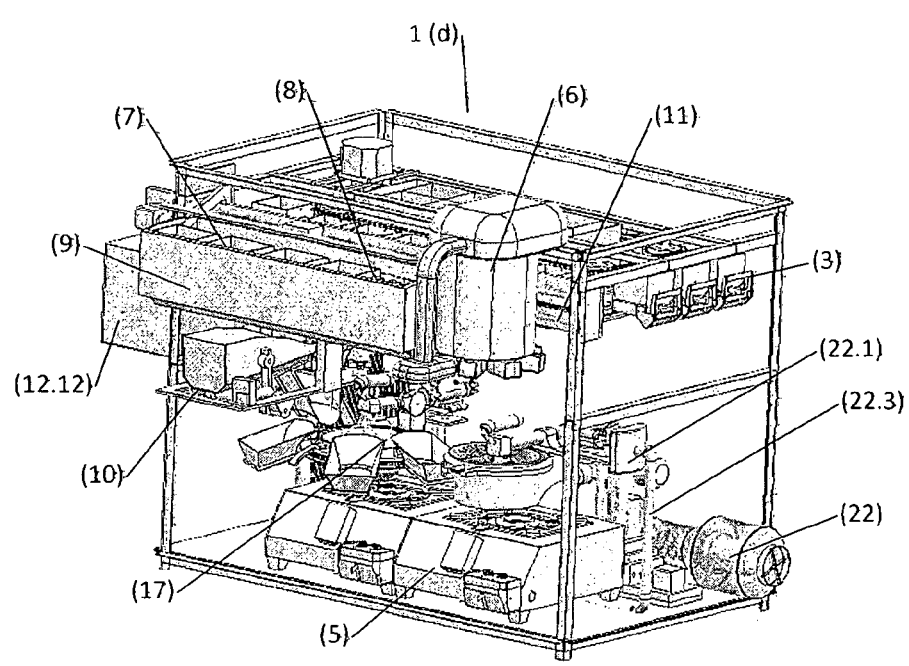
Figure 1:
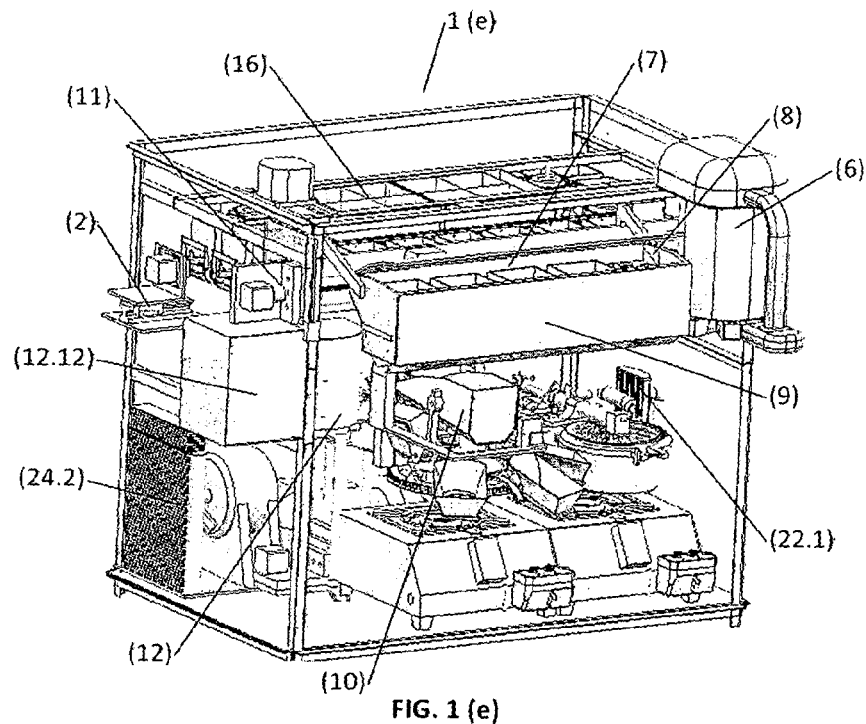
Figure 1:
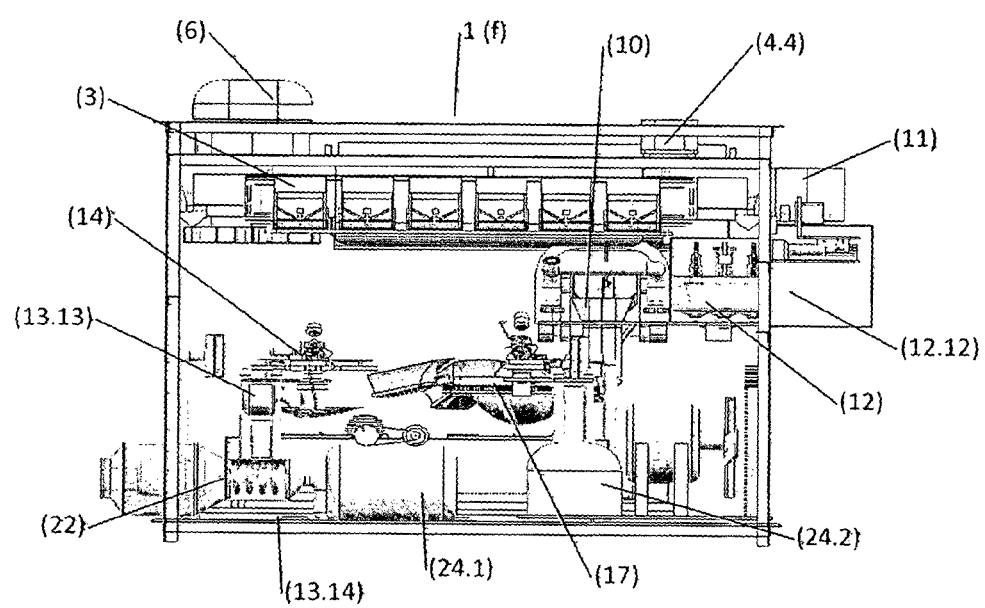

The nature of the invention and the manner in which it is performed is described in the specification. The invention has various components and they are clearly described in the following pages of the complete specification.

Food is essential for all living, organisms may it be plants, animals or human beings. Plants and animals directly take in food which is available in nature but human beings prefer cooked food. Cooking of food requires its knowledge and expertise as well as is time-consuming. In this jet age people do not have much time and so can't dedicate their time for cooking. Moreover, cooking isn't everyone's cup of tea and so can't be done by all. Those who do not know the basics of cooking or don't have much time, due to incapability or any other reason have their food in restaurants, mess, roadside vendors etc. during which they have to compromise in the taste, quality and quantity of food which may or may not be healthy or hygienic as well as may prove to be costly.

The present invention provides a portable fully automatic cooking system which can store innumerable recipes of different kinds of food items in its internal memory and/or can download recipes from predetermined online/offline source(s) i.e. Remote Server, and/or can be recorded by the user himself based on requirements. When System receives the command from the user, it can cook the selected food items automatically. It is a system which can be controlled by a dedicated computation device/laptop/tablet/smart phone/computer etc given that its hardware and/or software specification should be compatible to system. Also the benefits of computing devices, network and internet are available in this system. All the common raw material required for the preparation of food items are stored/provided within the cooking device of the present invention and dish specific ingredients are demanded on runtime based on dish selected, and in accordance with the recipe, it adds the different ingredients as and when required and cooks for the predetermined time at predetermined temperature, and performs other automated cooking related tasks to prepare the food item. The system also considers various cooking related intelligent logic usage in ingredients gathering, cooking constraints, rules/standards for better cooking, ingredients' characteristics computation strategies, tips etc. which are helpful during cooking by self computation and customization of artificial intelligence.

The present invention works on the command and execution method wherein the command can be given either in physical presence of the user or through a distant/remote location. The functioning, controlling, of the system can be integrated with various data/command communicating options like manual direct controlling from its default control panel or from laptop/computer or from devices compatible to its communication protocol & system, which are able to adapt with its software requirements and are able to communicate with the system via remote/distant controlling from internet or by default control panel options, by giving single direction to start even by SMS, from wired or wireless ways of communication given that ways have to be compatible to the system.

In this invention, number of recipes of food items can be downloaded, prepared and/or stored in the system's memory. These recipes can also be downloaded from free or paid online/offline sources. These sources are predetermined and compatible to the systems protocol and software applications installed on various system's compatible computing devices. The system's, user interface device's and microcontroller(s) unit's software, firmware, communication protocols, etc. can also be updated as and when required or suggested by the user or the system itself. When the user needs some recipe he/she just has to connect to the respective sources and save/download the recipe from, the source to system's memory according to laid down standard procedure. When the user wants the food item to be prepared, he has to give command to the system either personally or remotely and the device in the system starts preparing the food item as per the recipe. E.g. it will dispense, mix, stir, blend, strain, pour, add, hold, store etc. ingredients mentioned in the recipe at the predetermined time, way mentioned in the recipe computed with intelligent algorithms, in the required quantity depending upon the quantity of the food item required. Dispensing of various ingredients is done by various dispensing methods like Masala/Seasoning are dispensed by screw conveyor or spiral conveyor, liquids are dispensed by pipes-solenoid valves, pieces shape of ingredients via item holder and dispenser, cereals via cereal dispenser, gravies/semi liquid pastes via paste dispensers etc. or specially designed dispensers based on shape, size, quantity, mixture etc.

Suppose the recipe stored in the system is for preparing 200 gm of the food item and the user requires 1000 gm, the system will multiply all the ingredients by 5 and then add them as per the steps mentioned in the recipe, but the artificial intelligence doesn't multiply every element by 5 for example heat providing, time is calculated based on algorithms and heat is just provided for an adequate time till System recommends. The cooking files'/recipes' ingredients' master data etc. are procured from the system's remote server unit, as well as the system itself includes various general/specific information related to all the applicable ingredients' unique characteristics in mini replica database of master database, for example boiling points, cooking points, default weight loss of raw material while cooking, liquid absorption rate, taste absorption rate, taste leading, characteristics, loss of characteristics, change in structure of the ingredients like softening of the ingredients while or after cooking, change in shape of materials, change in taste, default or buffer time taken to cook depending on various quantities, taste, quality etc. are stored in detailed database of ingredients and other supportive data stores. All these information are considered with recipe file/data technicalities and then machine commands are formed, and sent for execution. This information provides the statistics of taste, nutrition, qualitative number of dishes' score, a probable computation platform, virtual evaluation platform for dishes and various criteria etc. All these information are related to cooking of the food item and are considered in computing the devices' working for cooking the food item, these predetermined data relating to self computation is stored in systems memory and updates as and when needed by various methods, hence it enhances the accuracy of cooked food. The system will follow all the steps of cooking mentioned in the recipe file to cook the food item at the predetermined temperature for the predetermined time in predetermined quantity with other required operations. The recipe of the food items can also be customized as per the user's requirements. Custom made dishes prepared by the user in this device can also be uploaded or shared by the user to gain monetary benefits or for free. For e.g. if a housewife or any other person is good at cooking or has prepared a new food item, then he/she can upload her customized recipes which have been recorded and tested earlier, although the system itself evaluates and tests uploaded recipe in various aspects and only then it is made available for other users. When other users download that recipe, they can get it for free or they will have to pay a predetermined amount as per payment structure specified in/by the system to the user who has recorded and uploaded the dish. This way the present invention enables users to communicate and share recipes of food items and cooking information.

The system of the present invention has various sub modules, which are arranged and inter synched such that the system becomes more reliable, adaptable, feasible etc. The system initiates its process by a wakeup call made by the User Interface Device, which performs all operation since from start to stop and sleep. While most of the time, the system is in sleep mode saving power, its vital modules are stilt working. When the user needs the machine, he/she is just needed to provide initiating command to the User Interface Device and this device starts the waking up sequence/routine of the machine. This user initiative/command starts the machine which initially evaluates the various hardware components and repositions them as and when needed. After the initiation of the machine, it is ready for the cooking process. When the user wants to use the machine, a number of options and menus are provided by the machine from which he can select one or many dishes to be cooked and the time he wants the machine to start cooking the dishes so that they are ready when the user wants them. The system has standard user interface devices for controlling/interacting with the system which also gives the output as and when requirement is ascertained.

The system of the present invention has sub portions/units namely remote server/cloud data repository with custom algorithmic software and master database, user interface devices again with interactive software containing different custom algorithmic logics and mini master database replica to communicate and cook and machine itself with advanced controlling and high end microcontroller(s) unit. FIG. 1 gives the whole system iconic architecture which shows the structural communication and command/data flow hierarchy and diagram. This fig. displays the front view of the machine (1) with a view of its various parts described later which is connected to the remote server (1.8) through user interface device (1.10) which may be computer, laptop, smart phone, or any other dedicated devices, which interact with the microcontroller (1.11) present with the machine. The remote server has the recipes and other technical and non-technical data in the raw data formats and/or structural data formats (1.9). The microcontroller is connected with the machine by controlling and communication cables (1.12) as in wired controlling-scenario. The various user interface devices communicate with the machine as well as with the remote server through wired or wireless means (1.13). The cooking machine has microcontroller(s) unit with various features compatible to the system such as programmability, communications, ports, processing etc. and other required electronics components, sensors, feedback devices, motors etc.; features which have been described in detail later. The basic but important features of the system are as follows:

Automated Cooking wherein the user just requires to select the food item to be cooked using the User Interface Device's easy interface, which is then mainly accomplished by the System's unit i.e. User Interface Device and Machine unit, although Remote server's assistance is taken as and when needed. The user does, not require to understand all the complexities in cooking as he/she can just perform cooking while providing inputs to User Interface Device's interactive interface. The user is just needed to provide main ingredients, as common ingredients are stored inside machine only. Usability is the key point taken into, consideration in the machine, hence the easy approach in each user to machine interaction has been developed in such a way that user can easily use the machine. For example, the highlighting and notification approach makes the process of user to machine dealing even easier i.e. while the demand comes from recipe, the User Interface Device's auto cooking routine ascertains its time, quantity, material availability, location etc. and prompts the user from the User Interface Device through multi lingual audio visual notification capabilities and even highlights the machine hardware providing location through a series of audio visual beeps and lighting points which can attract the user's attention. Again all these settings are highly configurable to make the cooking process easy and comfortable through the machine.

Multi Cuisine Cooking wherein the system has multiple recipes belonging to multiple cuisines of different tastes and cultures. All favorite cuisine recipes are either preloaded in the machine or made available in the system's remote server which can be used by the user through User Interface Device as and when needed. Along with this famous dishes from restaurants may also be added to general downloadable dishes.

User Friendly wherein the controlling of machine is done from well known and generally accepted devices thus making, the system user-friendly as well as easily refillable, attaching and detaching modules and dispensers are made available. Moreover the shapes and sizes of these modules and dispensers are designed such that there is no scope of wrong placements inside their respective holding chambers. The machine proves itself assistive in almost all dishes preparation by providing its help in one or other way, and tries to reduce human effort and time by machine's efficient usage.

Portability wherein, the system is a portable and single unit having all the necessary main hardware and additional supportive hardware such that there is least requirement of adding any other supportive hardware or additional hardware. Hence most of the recipes can be prepared using the base machine only.

Cost & Monetary effectiveness wherein the system takes care of complete stock and provisionary maintenance and monitors stock usage statistics and addition in ingredients quantity etc. during cooking as well as effectively uses ingredients to bring the best taste and healthy combinations in food items, hence avoiding ingredients' wastage. Moreover as the users have an additional facility of sharing their best and new dishes based on system governed payment structure, this is how users can gain monetary benefits from this system. But before sharing the recipe, the system performs the cooking of the recipe for predetermined number of times in physical and/or in virtual testing scenarios in accordance to comply with the standards provided by the system, following which the taste, nutrition, human interaction factors etc. are calculated, ascertained and then made available for general public's usage.

Online, Offline and remote usage wherein the system offers various controlling features/modes and options in accordance with which while working in the online mode is used for searching and acquiring new recipes from the remote server, uploading new recipes along with suggestions of new hardware modules and other network related issues while the offline mode involves the cooking process without any network support and the remote usage helps the conducting of these functions from a remote/distant device i.e. initiating any machine related/cooking related routines/commands from a distant place while in return viewing real time video of machines executions and logs.

Controlling adaptability wherein the system/machine can be controlled by desktops, laptops, tablets and even smart phones. This high level of adaptability provides user an extra edge over the usage of machine to its optimum level. Although there are standards defined by the system itself as to how other components in hierarchy can be allowed to get fitted with the system i.e. minimal hardware requirements and software requirements will have to be satisfied first in the system's Remote Server, User Interface Devices and Device Controllers designations.

Updatability wherein the system ensures that new cooking dishes get added to its main database and the new hardware and/or software modifications or creations required by the new dishes or updates in various layers found important are updated by the system. These updates are included in recipe database, technical database, backing good cooking and better use of ingredients, reducing time of cooking and enhancing nutrition and taste out of cooking, software applications and firmware, maintain all hardware's, vessels', modules', attachments' virtual dimensions, drivers and properties up to date because each newly added vessel holds a virtual object model, and the machine understands how to deal with it only due to software updations. The system also recommends its users and ensures that all users' machines' run on the latest and compatible software suggested by the system.

Modularity wherein the system lays down a standard protocol so as to govern all its hardware modularity and usability requirements. Hence the system has a modular way of providing ingredients to the machine in certain form an type, through specially designed mini modules like gravy ball holder, item holder, sauce dispenser, masala/spices holder etc. all of which are easily attachable and detachable such that no expertise is required to use this system.

The system of the present invention has various modules and sub-modules which have been specially designed for the accurate functioning of the system. All these modules and sub-modules are as follows:

1. Remote Server (a) System's Remote/Cloud Data Repository:

This is a very important module of the system as it is a centralized data, command and control unit which creates, maintains, provides and updates information in various forms. The remote server/cloud data repository controls/monitors/overlooks all the aspects of the hierarchical layers of the present invention and its machine. A server having powerful hardware and software capabilities to successfully serve its clients/users (User Interface Devices), perform routine processing tasks, provide updates and manage all the instructions and activities of its clients/users can function as the remote server. This remote server possesses the current status of each of its machine's hardware as well as the status of its user interface device thus maintaining a healthy link of relationships. FIG. 26 gives a flow-chart/block diagram providing the details of the remote server which includes but are not limited to the remote server hardware specifications, remote server software specifications, remote server/web applications as well as the master database & file system data store.

As shown in FIG. 26, the remote server requires minimum of hardware requirement specifications. Its Central Processing Unit is a high speed, multi core, multi tasking capable for performing tasks at ultra high speed and serve users better. The system in accordance with its CPU also requires memory (RAM) in high capacity. Moreover higher capacity of the permanent storage capacity is also required i.e. minimum 500 GB or 1000 GB. In order to store user's data and giant database this range of capacity capability is required. The remote server also needs to remain online 24/7 i.e. all the time, and hence it is required to stay connected with internet so the users can get connected at any time from any part of the world. Along with the present hardware specifications the server should also have the capacity to upgrade hardware capabilities.

The minimum specifications of the remote server's software also need to enable the remote server to allow and install custom web applications and communication interfaces. Network/Internet centered operation system with web server software and database software are prerequisites.

The remote Server's main tasks are fulfilled by the web application running on the server. This application's main tasks include management of recipes' database, management of ingredient and other related databases, firmware and software management which includes support and upgradation, user and user profile management—creating, new user, linking machines with user profile, other machine and user related tasks, syncing user interface device with repository etc., providing, support and troubleshoot information, online forums; user assistance programs tools and videos to enable user to understand the machine and interact efficiently with the server and the machine. The web application can be accessible via web browser, custom software applications in User Interface Device, communication services/application programming interfaces etc. The Web application also makes sure that unauthorized data access is not allowed, as a validation system validates machine with user, recipe validation system verifies, tests the uploaded recipes according to standard process of the system, provides tools for virtual recipe creation and emulator for testing. Along with these features the web application also monitors, manages, updates and guides monetary incentive structure policy and extends availability on various platforms via web services APIs. The master database and data store/data file system is the most crucial data which includes:

(i) Recipes: Recipes are the system's Central Data Repository. This repository stores the multi cuisine recipe data in a centralized manner and provides it to the users as and when required. All the technical data required to prepare the user's selected cooking dish is present in recipe file and supportive database. These files get stored in the repository, as well as the tasks related to management of recipes are done here. All the recipe files present in the repository include details like, the name of the dish, cuisine, nature and characteristics of the dish, nature and degree of user interaction required, approximate sufficiency for number a persons, place of origin, general taste, sweet and spice ratings (other taste ratings), cost of preparation, period of preparation, active period of usage, versions, needed ingredients with their quantities with their availability in machine, ingredients' activating time/dropping/adding/mixing, time and/or event, up loader/creator of recipe, recommended and best suited vessels, best suited modules, externally required ingredients, ratings, comments, nutrition table, business logic for execution, scientific analysis of ingredient's characteristics, nature, appropriate favorable ingredient's, cooking constraints, tips, ingredient adding strategies, ingredient grouping strategies etc. All this information may or may not be available as a single file on the server but may be present as one or more files, bundled, stored in database protected via encryption depending upon the requirement. This information is queried by the User Interface Devices and web application, validating and other features. This information can be provided in a variety of ways like structured data packet, data packet file, streaming data by web application and communication APIs etc. The user doesn't need to know how and where this data is stored and the internal working of the machine and the server. He just needs to select the food item which will get cooked automatically. Options like syncing are also available with the user wherein he can sync existing data with that of the server and hence remain updated with latest recipe data and software version changes. The system by default holds optimum quantity of recipes which are used in day to day life like vegetables/"Sabzi", cereals, curry, "daal"/cereal soups, vegetable rice/"pulavs", various salads, medium cooked vegetables, sambhars, items prepared using special modules etc. These common recipes are present in the system itself so that if the user isn't able to connect to the network and access these recipes from the server, then too he can complete the routine cooking tasks without any problem. The user can also cook recipe by manual over riding machine also.

(ii) Food ingredients' & their life cycle database: The server by default has full featured database which involves updatable information regarding generally and specially used cooking ingredients, their shelf-life, their detailed characteristics and their scientific information. This information provides full knowledge regarding the ingredients' nature, taste, nutritional values etc. These ingredients can be categorized in different categories, although some of them sharing multiple categories each of which define the ingredient's characteristics for procuring nature, storing system, dispensing mechanism, cooking metadata; self changing, characteristics which include changes appearing in the ingredient while undergoing any kind of cooking process etc. These details help the system to handle these ingredients mechanically from machine and technically from system while cooking. The system also tries to optimize the database to reduce cooking time, enhance cooking dish's flavor, nutrition and taste and enhance the dish's overall characteristics by applying various customized business/technical logics. The main target of the system is to provide better and healthy full meal cooking. Some of machine's hardware has been modified for easy adaptation with ingredients/group of ingredient/mixes/forms of ingredients while in other case the ingredients' nature, form and using techniques have also been modified for easy adaptation with the machine and the cooking system. These modification and adaptation techniques in either part result in efficiency in automated cooking. All these logics follow the rules, and protocols laid down by the concept of better automated cooking. These logics are based on the kind of virtual neural networks wherein each value of each property of each characteristic of each ingredient is interlinked with standard updatable benchmarks, other values of sibling ingredients, atmospheric environment conditions and variety of other related factors. These logics are self updatable and provide better output as and when required. These all algorithmic factors are bundled in the form of controlling software and firmware and executed at various levels of layers throughout the system i.e. web application software, User Interface Device Software & database and Microcontroller(s) unit software as per best execution results. For e.g. when a user has recorded his customized recipe and tries to upload it, the system evaluates various factors about the recipe's ingredients and suggests correct input measurements if it finds any ingredient which has been excessively or insufficiently used. This systems measurement is done through a rigorous usage way applying on those ingredients and determining a feasible quantity considering other ingredients quantities and nature of that recipe.

(iii) Food ingredients' cooking cycle database: The server by default has a very comprehensive database regarding the cooking cycle of various ingredients used in day to day life. This data helps the system to ease the automatic cooking process.

E.g.—pieces of potatoes being, fried, steamed, half fried, fried with salt, steamed with salt, steamed and then fried with and without salt and other related ingredients etc.

Usage of cooking soda; cooking soda is used in many dishes in which the system considers other ingredients and change occurrences in the form of softness, tastiness, healthiness etc. This set of data is processed and updated in the rules of cooking and stored for future use in computations in conjunction with recipe file/data, and in other required area.

Moreover, when a particular dish is being cooked or recorded, the system monitors various added ingredients based on its metadata and updates the cooking cycles and process, cooking phases and interactivity of these ingredients and establishes a relationship of cooking time taken, characteristics change of the ingredients and the dish as a whole. This helps in creating, a generic database of cooking cycles wherein the system is able to help the user by suggesting few of its own understanding and cooking standards on taste and ingredients or their quantities to be added or removed to ensure that the dish is cooked better.

(iv) User profiles: This is an important aspect of the system, which is centered around the users, his/her cooking skills and preferences. The system holds information relevant to its user which is related to the system. This information includes:

Personal data wherein the system holds all required personal data of its users and uses it as and when needed like the users' account type, personal information data, contact information, social networking communication, emails, profiles, eating habits of other users etc.

Ratings wherein the system holds star ratings about the user's performance and skills in cooking and also ratings of posted/uploaded recipes. This helps the user in ascertaining his skill level and promoting good and healthy cooking. These ratings also help other users who are willing to download the recipes because better ratings mean better recipes.

Professional data The System has various types of accounts which provides information of the type of users. Here in the professional data, information is stored about those users who have a professional account in the system. These users have mastery in cooking using the system. These users include chefs who use their knowledge to prepare various cooking dishes using, this system.

Points wherein each user is allocated points based on their active participations in cooking using this system.

Machine data in server wherein the user's machine data-present in the system is stored in the server as a backup copy. This ensures that the users get best hassle free output of their machine, and machine smooth working. Any complications arising in the user's machine are identified and resolved. Moreover other required synching operations are also performed here. The system has complete information about the user's machine in its remote location.

Active reviews of authorized users for betterment of functioning of system, wherein active, objective and detailed types of reviews/feedback of users are taken and the required modification and up gradations are carried out.

(v) Self updating: Self updating is done of the system, user interface device, device controller's software and firmware. This feature is useful for existing users, who are provided with new and updated firmware and database replicas, for making their machines work on the latest techniques applying better procedures.

(vi) Technical and Non technical details: Wherein all required information related to each component such as vessels, modules, attachments etc. like weight, dimensions, unique smart scan id or RFID etc., their type, communication related mappings, driver details, version details, applicability and compatibility details, attachment/component details etc. are stored. Also additional details related to recipes may be stored in server's file system or data storage structure.

(b) User Interface Device/Human Machine Interface:

FIG. 27 displays the flow chart/block diagrams (which displays structural and virtual inclusiveness and groupings of various requirements) of the user interface device which is the human machine interface. It includes all the hardware specifications as well as the software specifications. The user interface device is a generic term which is inclusive of but not limited to desktop, computer, laptop, tablets, smart phones, dedicated devices etc. The main task is to be able to control the machine and communicate to the system, for which either of the devices could be used, given that they possesses minimum hardware and software capabilities as briefed in FIG. 27 block diagram. The user interface device is segregated into two main segments which are the hardware and the software which are described in detail in the following description:

(i) User Interface Device Hardware: This device is made for users to control the machine and for easy interaction with the system. This device has been created keeping in mind normal users who don't have much exposure to such systems. So the device has been made easy to use, providing, local language support in textual format and having multi lingual audio visual support so that it becomes simple and effective for any user to deal with the system. The hardware of the present invention possesses latest techniques of input, processing and output requirements like the touch screen support for input, latest processor for processing and audiovisual support, ports for digital/other communication and various other modules which are adaptable to the system. This device has the following, characteristics which are recommended by the system:

Latest input devices support like keyboard, touch, voice, gestures etc.

Latest computation capabilities i.e. multi core, multi tasking, CPU, and flexibility of adaptation with other modules Media support: HD video display screen, audio, microphone, camera, extended video support etc. are required High capacity of Random Access Memory is required External Data storage/sharing medium support Communication capabilities with external wired/wireless devices support on various protocol and platforms like Serial, High speed USB, Wi-Fi, Ethernet, Bluetooth etc. Moreover for mobile devices and non mobile devices internet connectivity with best speed is required.

Various sensors-support like multi axis gyro, proximity etc. would be an added advantage.

Upgradable operating system, upgradable application and software framework

Core system drivers, and additional driver installation framework support

Custom applications and libraries support

Security and safety features and control panel/settings configurability

Multi language support

Programmability & database storage capabilities like SQL, RDBMS or other standard modes wherein open source programmability platform is preferred Multi protocol communication support code libraries and application runtime environment Advanced memory management capabilities Multiple memory type adaptation support both internal and external Media: streaming, codecs support with 3D graphics support Good amount of Battery backup.

A device authorized by the system as User Interface Device/Human Machine Interface as described in FIG. 27.

Tablets or smart phones with Android OS, iOS, Windows OS or laptops and computers with Windows and Macintosh OS; Linux are mainly used for controlling machine in the present invention.

(ii) User Interface Device Software: This is the controlling software which is an interface between the user and the machine and which enables the users to communicate with the whole system. This device with software mediates between the cloud repository and the machine hardware which holds a mini replica of cloud data repository's relative and respective information regarding cooking, customized cooking techniques, logics, algorithms and main controlling and commanding applications. This software application provides various features and functionalities to the user for controlling the machine in a better way, like:

a. Automated multi cuisine cooking and recipe cooking assistance b. Manual Cooking, recording and testing, also virtual cooking is possible c. Sharing, syncing, uploading and downloading of recipe and non recipe data d. Simultaneous optimum cooking recommendations and audio visual suggestions e. Online, offline and remote operating modes allowing user to connect with machine from any where f. Shopping and e-commerce support enables user to directly order the depleting item for machine g. Recipes management like Add, Update, Delete, Review etc.

h. User and profile management feature enables user to manage his/her profile i. Control panel options like maintenance, management, updates and trouble shooting j. Multi-layer secured communication: means User Interface Device to microcontroller unit and User Interface Device to remote server communication, syncing and mediating management and support k. Module Bridge Interface: a pathway to add and control additional modules with machine virtually and physically, again this interface could also be leveraged for additional vessels.

l. Easy user interface design, with real time/live video display of machine activity m. File/data management and sharing, syncing with remote server n. Technical algorithms, business and artificial intelligence and custom developed logics for efficient cooking, least amount of hardware executions, data protection techniques like encryption and decryption, compressing and extracting, scalability and high level of configurability in communication protocol, logics spread in various layers of hierarchy in form of code, libraries, data formats, data conversion custom libraries, real time command execution rating and failure analysis and rectification, background feedbacks processing and logging, logics and algorithms in overall controlling of machine etc.

In the options like auto cooking, manual cooking, recording, uploading, downloading, sharing, troubleshooting, updating, feedback etc., all the type of communication and controlling is done by this device wherein the hardware could be any device which possesses the recommended standard benchmark as displayed in FIG. 27, but the software is the key component, and all the chief processing/brain storming related to machine is done by this custom developed software application. This device provides an easy interface for the user to control the machine as well as communicate with the rest of the system. This controlling software has been created with a generic approach which is compatible with various operating, systems and has been used to ensure easy and well defined standard control of the system. The various chief and detailed features of this device include:

Business Intelligence: This is the key of cooking using, the machine. Traditional cooking techniques are made compatible to machine by using Custom Business/technical and artificial Intelligence Techniques. These techniques may be custom molded in hardware design, programmed and provided in code/libraries, ingredient's form determination, procuring, holding, mixing, dispensing, cooking etc techniques of ingredients with a variety of shape and form. These techniques have been developed, designed, created, molded, programmed etc considering the core idea of Automated Cooking. The gap between cooking and users' involvement has been automated and reduced via this business logics/intelligence. Various Business Intelligence factors/forms apply directly to System whereas others affect indirectly. But all these factors have only one target, i.e. to automatically cook nutritious and healthy food for the user.

This business intelligence includes programming concepts, database repository related concepts and database creations, relational concepts relating to inter ingredients' relation, logics and algorithmic concepts silently added in programming and core code libraries, specially designed hardware holder, storage and dispensers, adaptation of form and other characteristics determination of ingredients, for better use. Again as it is a multi-cuisine cooking technology, all necessary measure are taken care of in usage of applicability of these standards, e.g. when Chinese cooking is being carried on, Indian cuisine standards are not suggested until specially demanded by users. All these concepts although executed virtually, keep the machine and rear cooking on the same situation and so at any point of time the system knows the position and status of each hardware, components, vessels, modules and cooking process. The raw data required for cooking is downloaded from Central System Repository and stored inside User Interface Device/Human Machine Interface, so that it can be used as and when required without need of network connectivity. The core details and the least required details are present in the recipe data itself, while other algorithmic details are present in custom developed core libraries inside various layers of hierarchy like User Interface Device—code/libraries section, Remote server validation and recipe creation section, Microcontroller(s) unit firmware section etc. These details are required in the cooking process by the machine and the device controller unit/Microcontroller(s) unit. So if by chance the User Interface Device is not able to connect to a network, then too the cooking process is not affected. Some important features of Business Intelligence usage include:

Fast, healthy, hygienic cooking wherein the business intelligence techniques ensure that each and every means, i.e. hardware and software work in proper direction for fast cooking. All appropriate measures taken including specialized hardware creation, software modification and configurability and adaptability, specialized vessels and its attachment creations, modules creations, ingredients' form creation, ingredients' packaging i.e. system compatible packaging etc., ensure fast and methodized cooking. Presently the raw materials are available in the raw form of packaging. But as per the system's requirement these raw ingredients can be available in packaging that is directly attachable to machine's various input sources without a direct human touch with ingredients. Business intelligence also ensures healthy standards for making the recipe a healthy one. It suggests best cooking ingredient mixes for any given recipe. It also suggests ingredient's quantity and ingredient's quality calibrations to adjust in ingredient's properties and characteristics while considering the ingredient's use. All food items prepared by this system include participation of the hardware and the software of the system, both of which maintain complete hygienic conditions while cooking as there is no human participation in the cooking process. Also auto cleaning with pressurized air and steam can clean various components of machine keeping, the machine hygienic.

Cooking Science: The science behind cooking each and every recipe is provided in the database which possesses the technical details of cooking using the system of the present invention with fully featured user interaction. This database stores various cooking standards, properties' and characteristics' changes of ingredients while undergoing any cooking process which include basic taste, unit to measure the taste, minimum and maximum of taste in predetermined unit of weight, color, odor, smell, edible and/or only addable criteria etc., best adaptable with cuisine type, recipe type, recipe operation type, best adding scope etc. These details help the system to process, the recipe in a realistic and appropriate manner which is similar to conventional cooking. The system defined standard neural algorithms monitor each recipe, their ingredients used, machine hardware components used, time taken etc. and prepare a blueprint of the standard usage of ingredients, usage of components, their success rates, taste and nutrition related human factors and lay down a strong layer of updatable recommendations which allow the system to understand cooking science more technically and suggest probable new components design that would yield better, faster and efficient results.

Internal Management: This includes various factors of management and maintenance which ensure the smooth working of the machine and provide live status of various machines' components and ingredients position in data, statistics and audio visuals to the user. The user can use this information for knowing any problems arising in the machine or to plan the refilling of depleting ingredients' stock in the machine. For this various bench marks can be set and minimum quantity of depleting ingredients can also be predetermined. After each action while cooking, the used quantity of each ingredient is monitored and the reduction of the same is updated in the database so that the depleting ingredients can be monitored. Again the virtual display of real time stock in the form of virtual jar, crock etc. and other kitchen related items is provided in virtual kitchen shelf/cabinet segment/feature of software which would give a feel of interacting with kitchen itself. Even before initiating the cooking process of a dish selected by the user, the system checks for the required ingredients and available resources, and only after sufficient ingredients and resources are found available, the cooking process is initiated. But if the system finds some ingredient or resource not sufficient for cooking the dish selected by the user, it first informs the user and only if the user confirms to proceed with the cooking with the available ingredients and resources, the process of cooking begins.

The system of the present invention also monitors the cost of cooking with the help of continuous monitoring of usage of various ingredients. This way it can provide the cost of any stored recipe in monetary form to the user. Moreover as the process of cooking is monitored and controlled by the system, no wastage or over usage of cooking ingredients takes place. The user is also provided with an additional option of recording his customized dish preparation in the system and offering it to other users to try and taste the dish by following, a system controlled predetermined payment structure.

Moreover during, the cooking process, the system knows which user is going to eat the dish and accordingly manipulates its taste and nutrition like for children, aged, and users with acidity etc., less spicy meals are required and so after temporary modifications to relative properties and characteristics, the selected dish with the user's profile is prepared. The user can also provide inputs for specific diet meals.

The system also provides an extended feature of linking the machine/user's account with provision store/mall. This way the system updates the ordering quantity at regular intervals and manages stock for the user. If the user selects this feature, the system automatically orders the required ingredients.

User Interface and Controller Software Application: The user interface is the primary source of interaction of the user with the system. This interface is kept as simple and interactive as possible to make it user friendly. It enables the user to cook the required recipe with ease and with least amount of input commands or efforts. In this interface, the user comes in contact with the various options, below listed are few important of them:

Manual control option—is used to control the machine manually in which the user needs to satisfy various kinds of requirements. This option is used for preparing a dish without automatic cooking support directly from user interface device, modifying any automated dish, recording of a new recipe; manual cleaning of machine and internal hardware and other utility options. Again preprogramming or timely execution is made possible in this option too.

Auto Cooking—is used when automatic cooking or automatic utility options is needed. This is the main option of the cooking, process using, this machine. Auto cooking enables user to cook the specified dish easily by giving fewer commands. In this the user just requires to search, sort list and select cuisine and recipe via User Interface Device/Human Machine Interface. As soon as the user selects any recipe, the system performs various internal technical workflows which includes self awareness, stock detailing and sufficiency check routines, external help requirement degree or amount of user interaction requirement, change in taste, recommendation for applicable vessels and/or modules, internet connectivity requirement, Remote Server/Mother System's assistance, user's involvement, its nature, proportion etc. Once these factors are satisfied, the system initiates the machine to start the cooking process and cooks the recipe selected by the user. It also suggests post cooking options to the user like garnishing, finishing etc.

Auto cleaning feature allows the user to get the machine's various parts and modules automatically cleaned. In this cleaning, process, thin sprinkling of pressurized air and/or pressurized hot water/steam mixed with cleaning solution, takes place on various parts. Those parts of the system which can't be auto cleaned, are easily detachable such that the user can detach those parts, clean them and attach them back.

Recipe Management—is a full featured application module which enables the user to manage recipes in User Interface Device/Human Machine Interface. This includes management options like add, create, modify, arrange, download, upload recipes, modify its properties etc.

External Feedback System—is a feature in which when the user cooks the food, the system constantly togs the process being carried out more specifically for newly recorded items which are being downloaded and cooked. After the food item gets cooked, the users are offered a feedback form in a very easy and intuitive manner, wherein various ratings, optional answers are framed and asked in such a manner that it creates a new important opinion about that recipe. A number of such opinions displays the mood of the audience about that recipe and prompts the system to modify the recipe in certain manner after taking appropriate inputs from the uploaded recipe or the system's working process.

Settings—which have various features including upgrade management, communication management and troubleshooting. In upgrade management, the user is provided with the systems base version of software and firm wares. The system gets updated from time to time basis which allows the users' Device Controller, User Interface Device etc. to get updated and become fully functional with new Operating System, Database and Application Software as suggested by the system. Communication Management is a highly configurable utility option for the user which enables the user to select and calibrate with latest and more advanced communication options such that the user can control the machine and communicate with the system in a more advanced manner. E.g. the user can select communication medium from wired or wireless, its internal settings etc. The Troubleshooting feature provides the users with self identifying problems and repairing capabilities for the system up to certain basic level. Here the user can perform a fully automated software and hardware diagnostic test. The system checks the machine's various features based on standards and provides report to the user. These diagnostic checks include sensor data checking, and calibration, motor movement checking, hardware movement's precision checking and any other details checking which are considered important for the machine's healthy working, default vessels and available modules checking and calibration and checkup.

(c) Communication: Communication plays a very important and crucial role in completing any information and command oriented system's life cycle. In the present invention, right from the initiation of the system up tilt the completion of cooking as well as cleaning of the system, each and every set of instruction passes from one point to the other point of execution. These set of instructions use a very comprehensive and well established set of communication links, protocols and mediums. Very important information is passed from machine to system and system to machine via user interface device as and when needed.

Communication medium: The system of the present invention is able to adapt and use almost all well known wired and wireless medium for communication. The user selects the medium and its available resources for communication. The system holds capabilities to accept all well known standards for communication. Here in current domain, the term communication is used for two sets of junctions i.e.

System (Remote Server)<==>User Interface Device
And
User Interface Device<==>Machine Hence respective standards need to, be applied in applicable case. Again what matters most is what is communicated; far which either or multiple modes of communication mediums can be used.

Wired—In wired communication, machine uses network (RJ45); high speed USB and/or serial cable connection(s) from said User Interface Devices. Other wired connection systems can also be used as per the requirement. The communication from system to machine, User Interface Device relies on user's available resources for communication. As the machine unit contains microcontroller unit with multiple sub controlling units, hence multiple ways of wired communication can be also utilized simultaneously.

Wireless—In wireless communication, the system uses Wi-Fi, Bluetooth, Radio Frequency modes etc. as medium of communication from user interface device to machine unit. Whereas in wireless means EDGE, 3G, 4G or higher, Wi-Fi modes could be used from user interface device to remote server communication. There are hierarchy of modes to be used, which are set according, to priority and availability. These are technical algorithmic decisions taken by software installed in User Interface Device and the system.

Figure 25:
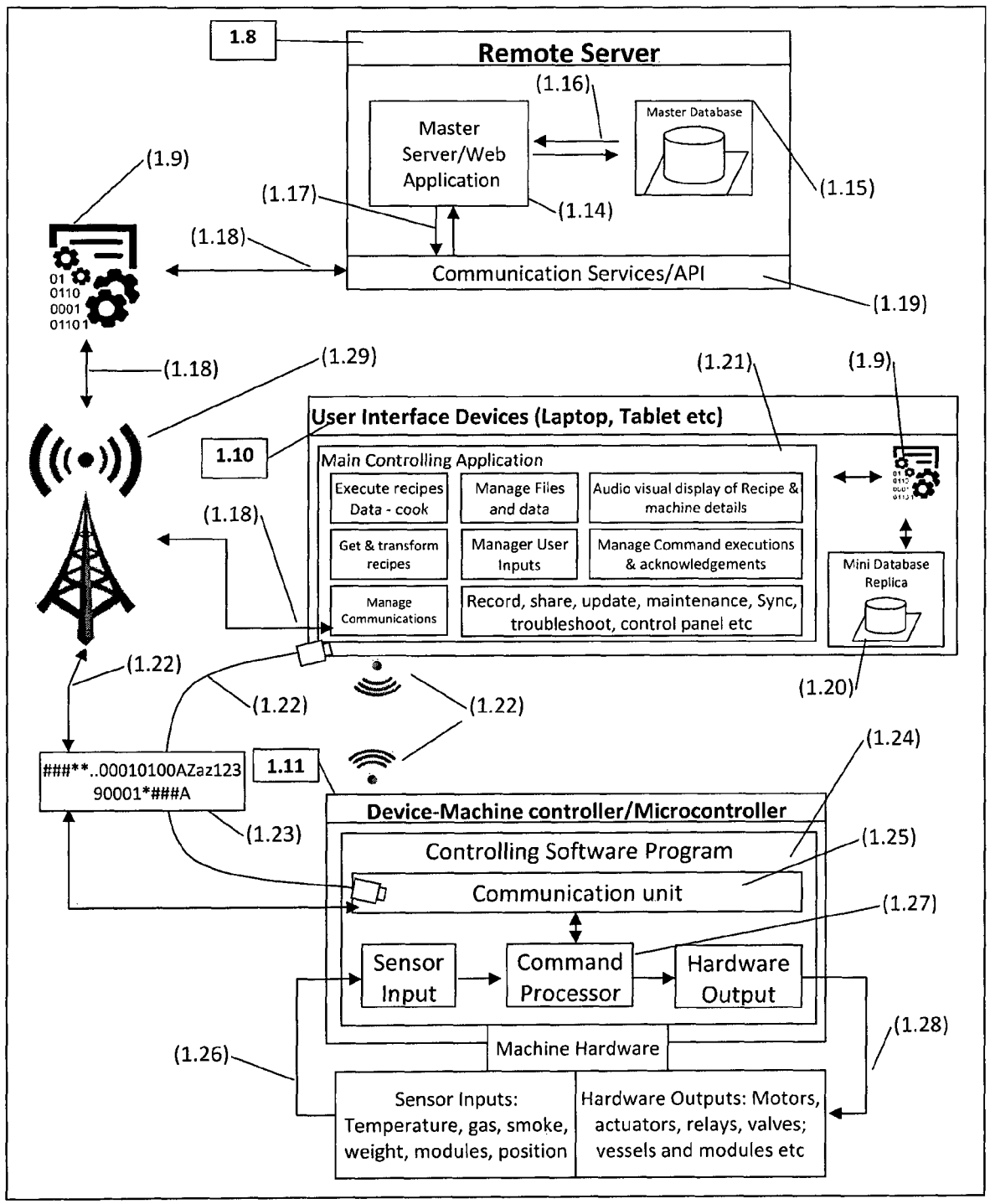
FIG. 25 displays the systems' command, control and data flow diagram in brief.

Custom Communications Protocol & Architecture: A specific and specially created set of dynamic instructions have been defined for communication, which make the systems' communication protocol. It has been designed, defined and programmed in such a way that it handles all simple and special commands with dynamic arguments. It also adapts any new hardware, given that new hardware driver details, i.e. the software instructions which allow the mother system to understand new hardware controlling and communication techniques, have been installed in the system. This eases communication flow throughout the system and newly added hardware. This protocol ensures easy and efficient communication between System<->User Interface Device<->Device Controller. The algorithms for Communication Protocol defines an architectural interface for software library to obey and lay a wrapper and/or core mechanism for System<->User Interface Device<->Device Controller/Microcontroller Unit to communicate. These commands are wrapped inside a custom developed virtual object to be able to follow the communication protocol from shake hand to all routines till good bye mechanism. These commands are then unwrapped and extracted inside the DC (Device controller), Microcontroller(s) unit to execute according to provided values. FIG. 25 gives the system's communication architecture. As shown in the figure, the remote server has the master server/web application (1.14) which has the master database (1.15) which can communicate through master database to/from Master Web Application communication (1.16) and offers communication services/API—Application Programming Interface (1.19) through the master web application to/from communication services API communication (1.17). The recipe and other technical/non technical data in file and/or raw data format (1.9) are communicated to/from server and User Interface device (1.18) through internet communication medium (1.29). The user interface device (1.10) which may be computer, laptop, tablets, smart phones or any other dedicated devices which has the main controlling application of the system (1.21), which executes recipes data, gets and transforms recipes, manages communications, alerts by visuals and audible notifications, provides current recipe & machine details, manages user input, manages files and data, manages command executions and acknowledgements, performs operations like record, share, update, maintenance, troubleshoot etc. and has a mini database replica (1.20) which has all the technical and non technical data; this mini database remains in sync with master database (1.15). For processing, these data/commands (1.23) are sent from User Interface Device to the machine controller (microcontroller) for command executions and receive acknowledgements/return data (1.23) through wired/wireless means (1.22). The Device-Machine controller (Microcontroller) (1.11) then controls hardware of machine. It has the Microcontroller Unit software application (1.24) in sync/accordance with System architecture, the Microcontroller communication unit (1.25) which receives the command and forwards it to respective routes for command processing/executions. The communication unit (1.25) handles full to and from data communication management between Microcontroller (1.11) and User Interface Device (1.10). The microcontroller has inputs from various sources like sensors (1.26) which give inputs like temperature, gas, smoke, weight etc., dedicated hardware inputs, feedback proxy inputs and other microcontroller inputs etc which are sent to the Chief Microcontroller Unit command processor. User Interface Device to/from Microcontroller mediator and executor i.e. command processor unit (1.2.7) which gives output in the form of hardware actions (1.28) of main machine modules like rotation of motors, movement of actuators, switching on/off of relays, valves, actions in vessels, actions in modules, starting/regulating/stopping of supporting hardware like compressor (24.1), refrigerator unit (24.2) etc.

The remote/cloud central data repository which is the remote server has all the recipes stared as Recipe Data files and/or recipe data. It also has all the users' profiles, and other required databases centrally located. There are also security arrangements like uploaded recipe verification mechanism and Generic access mechanism like APIs for others beneficiaries. This remote/cloud central data repository is connected to each user. When any user wants to cook a certain dish, initially he selects that dish from Central Data Repository if he doesn't have that dish in local data schema. Next he performs successive steps of acquiring that cooking recipe file and downloads it. This downloaded file is a data file or data packet and not a program, gets displayed in the User Interface Device's list of available recipes. Along with the recipe file the User Interface Device updates other local database as needed, based on the new recipe file's metadata. Then the user commands that dish data to be cooked by selecting its name from the list of recipes and performing, further sub selection if needed. The User Interface Device performs a full technical review by scanning updated stock information, hardware components arrangements, performs hardware repositioning as needed etc. When all the required check conditions are verified, the machine is commanded to perform cooking by performing logical, algorithmic and technical computations. E.g. User Interface Device's controlling software reads each and every relevant detail from the recipe file/data, passes these detail through technical custom algorithmic computations with database standards, results of which are executable commands, restructured depending on their priority and order of execution, although data's structured format helps in even adding very comprehensive and complex steps in data file. The data of recipe file is made compatible to get executed by the machine as the recipe file could be in encrypted and compressed state. Now from this structural format it needs to be converted to machine executable data, this gets done when user selects that data-dish for cooking. Further in the above said format various advanced data protection steps are also considered as well as proactive steps are also exercised to facilitate tight bonding between all communication links such that no loose junctions are found.

(a) Machine:

In the present invention, machine is the most important hardware unit and is the real executing device. The whole system architecture is designed for controlling the machine in best possible way. The machine can be considered as a self contained kitchen because almost all essential components have been considered in it. A task of fully automated cooking is made possible because of revolutionary design and development of hardware components of machine and relative transformations in kitchen related equipments which are used by the machine. The design that facilitates user to auto cook, contains in itself highly configurability in vessels handling, machine controlling, and ingredient managing and dispensing. The unity of various components, may it be essentials and/or additional, makes the hardware group, a machine best for cooking. The machine contains various sub units or sub components/mechanisms which get integrated in the machine in such a way that, together it allows users to auto cook in most efficient manner. Units like multi ingredient procurer and dispenser, seasoning (masala) dispenser and its selecting and changing mechanism, capacity to add dedicated task modules, various types of vessels with types of attachment to fulfill enormous tasks like stirring, shaking, blending, chopping, mixing, etc., provisions/platform to add additional vessels, cereal dispenser, sauces/semi liquid dispenser, gravy ball dispensers, premixed packet dispensers and droppers, regulated heating unit, hot and cold liquid storage and dispensing unit, highly efficient and intelligent regulated exhaust system, sub-systems like compressor and refrigerator unit, dedicated interactive control system, and intelligent communication hierarchy facilitating, high level of cooking and assisting support etc. The placement and arrangement of all these units makes the machine perform in most optimum level of efficiency and yields best possible auto cooking experience. All these units, components are controlled by device controller unit under governing of computations, intelligence from user interface device's software application.

FIG. 1(a) gives the top view of the machine which displays the masala selecting mechanism (2), the masala box (3), the masala changing mechanism (4), the cereal dispenser unit (6), the item dispenser's holding chamber/freezer unit (9), the procurer slider (11) and the paste dispensing mechanism (12) along with a few other parts all of which are described in detail later.

FIG. 1(b) displays the left view of the machine which shows the masala selecting mechanism (2), the heating unit (5), the cereal dispenser unit (6), the item dispenser's holding chamber/freezer unit (9), the procurer unit (10), the procurer slider (11), the pouring mechanism (13) and the multi ingredient dropping vessel (17) along with other parts all of which have been described in detail later.

FIG. 1(c) gives the right view of the machine which shows the masala box (3), the heating, unit (5), the cereal dispenser unit (6), the procurer unit (10), the pouring mechanism (13), the pouring unit (14) and the jet exhaust unit (22) along with a few other parts all of which have been described in detail later.

FIG. 1(d) gives the first 3 dimensional view of the machine which shows the masala box (3), the heating, unit (5), the cereal dispenser unit (6), the item dispenser (7), the gravy ball dispenser premixed and shaped ingredient dispenser (8), the item dispenser's holding chamber/freezer unit (9), the procurer unit (10), the procurer slider (11), the multi ingredient dropping vessel (17) and the jet exhaust unit (22) along with a few other parts all of which have been described in detail later.

FIG. 1(e) gives the second 3 dimensional view of the machine which displays the masala selecting, mechanism (2), the cereal dispenser unit (6), the item dispenser (7), the gravy ball dispenser (8), the item dispenser's holding chamber/freezer unit (9), the procurer unit (10), the procurer slider (11), the paste dispensing mechanism (12), the liquid dispensing and heating unit (16) and the jet exhaust unit (22) along with a few other parts all of which have been described in detail later.

FIG. 1(f) gives the rear view of the machine which shows the masala box (3), the cereal dispenser unit (6), the procurer unit (10), the procurer slider (11), the paste dispensing mechanism (12), the liquid dispensing and heating unit (16), the multi ingredient dropping vessel (17) and the jet exhaust unit (22) along with a few other parts which have been described in detail later.

As shown in the different views of the machine mentioned in the FIGS. 1(a), 1(b), 1(c), 1(d), 1(e) and 1(f), the machine is composed of different units used for various purposes. The perishable ingredients or the ingredients which are later needed in the process of cooking are contained in the perishable/delayed input item holding and dispensing unit. This unit stores these ingredients at proper temperature till those ingredients are needed i.e. refrigerated. The needed ingredients are dispensed in the procuring unit; the procuring unit transports them to required vessels' dropping point. These figures also show the supportive equipment for the machine's cooling/freezing requirements, the sauces dispenser, cooling chamber etc. These chambers are temperature controlled containers so that by the time the ingredients are not in use, they are stored in here and the cereal holding and dispensing unit. The machine also contains an air compressor for supporting various air controlled hardware devices like cylinders, blowers, cleaning valves, pressurized steaming devices etc., wherein these cylinders control the movement of the pneumatic cylindrical components attached to their ends. It also has a refrigerator unit to provide cooling solution for items that are of perishable nature which have to be used later in the cooking, process. Similarly for liquid items which have to be stored at a higher temperature to keep them in liquid form, separate heating arrangements are provided.

Many cuisines use various types of gravies and sauces while cooking. The machine provides ways to deal with premixed semi liquid group of ingredients i.e. gravies. In primary way the gravies which are more feasible to manage with are used using paste dispenser while the ones which cannot be dispensed with paste dispenser, are pre formed in spherical kind of shape which makes them easy to be used in cooking. Hence the gravy ball dispenser and the sauce dispenser have been provided to dispense any forms of gravies and any size of balls in a better way. In the gravy ball dispenser, the gravy is made in a spherical shape by freezing it and/or by adding few more edible ingredients which maintain the shape of the gravy/mixed ingredient(s) ball. This gravy ball dispenser drops the gravy balls as and when required depending on the commands given by the system in accordance with the recipe. The procurer transports the balls from its location to the vessel in which they need to be dropped white the dropper helps in dropping these balls in the vessel. The sauce dispenser drops some quantity of drops when activated. The sauce dispenser is present in the procurer itself which helps in procuring the gravy balls and so it directly drops the required sauce in the cooking vessel. The figures also display the procuring and dropping, mechanism/procuring unit (10), the masala/seasoning holding and dispensing/selecting mechanism (3) & (2), the various vessels positioned on the stove burners/heating, source with the help of pouring/vessel holding mechanism i.e. pouring mechanism (13). The color sensitive camera unit provides secondary feedback of movement of majority of components moved in area of focus. These components have been marked with special highlighting color tags so that it can be easily identified/spotted. The jet exhaust unit transports the vapors and other gases outside of machine and the stove/heat source used for cooking the dishes. This machine uses unique and most feasible way to transport the seasoning (masala) to its destination i.e. masala changing mechanism (4). It uses sprocket and chain based approach whose details are provided later. Hence this machine has a chain with attachment and sprockets to move the required ingredients towards the cooking vessel, the masala/seasoning sprinkling mechanism, the freezer holding the sauce to be dispensed, the refrigerator unit, the pouring mechanism and weight sensor mechanism which allows the pouring only of the required quantity of ingredient, the procuring and dispensing unit with various sauce holders and dispensers and the supportive equipment for air/pneumatic controlling requirements.

Figure 29:
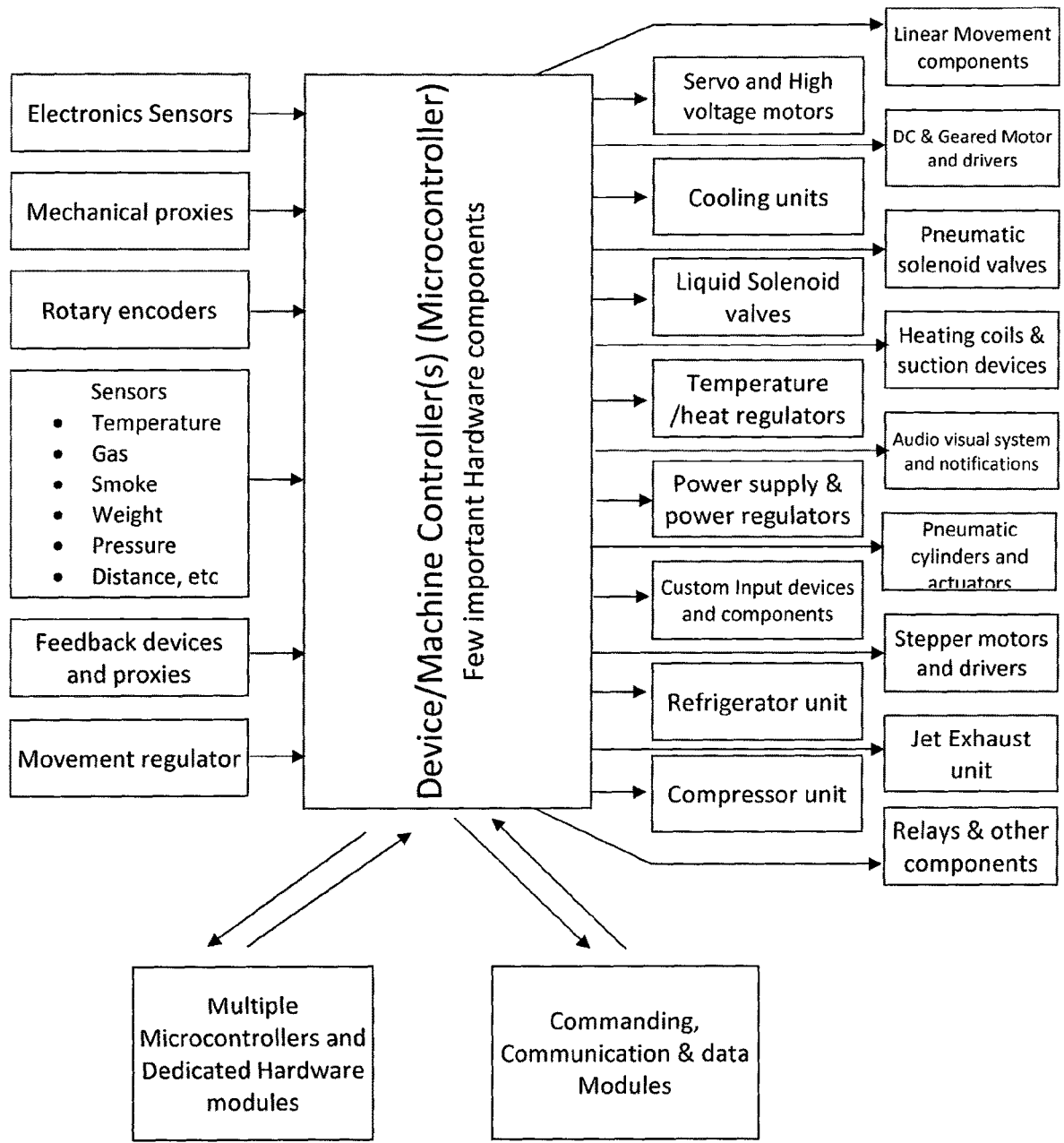
FIG. 29 displays the microcontroller unit's block diagram with input and output.

The machine of the present invention has various sub segments which are as follows:

(i) Device Controller/Microcontroller(s) Unit: The device controller/Microcontroller(s) unit as shown in FIGS. 28 & 29 is the mediator between the user's User Interface Device and the machine i.e. it understands commands and performs machine component's hardware executions. The user commands from User Interface Device (1.10) are converted into machine commands/hardware control commands (1.23) by interpreting all commands in the recipe details and processing, computing them with standard algorithms and logics by following. System/Communication Protocol as programmed in Controlling application (1.21) of user interface device and communication architecture. It provides easy user interface in the hands of the user. When the user selects any recipe for cooking through the User Interface Device, it controls the rest of the operation and provides necessary commands to the Device Controller. The device controller or microcontroller(s) unit is a group of electronics components as block diagram FIG. 29 displays which performs all hardware execution related tasks in the machine. One of the main component(s) is microcontroller which is mounted on a circuit board. This circuit board also includes various other essential components like integrated circuits, transistors, resistors, capacitors, diodes etc. Other necessary electronics and hardware controlling components are also installed in this board which when connected with microcontroller and other dedicated ICs (integrated circuits) extend task performing area of the Microcontroller(s).

(a) Device Hardware Technology (Microcontroller unit): The microcontroller unit of the present invention has capabilities like programmability, debug and storage, digital and analog input/output ports, taking input from various types of sensors, CPU, various types of memory adaptability, RAM, EEPROM, OSC/CLK, timers, interrupts, feedback providing mechanism, PWM/frequency generator capabilities, portability, multiple communication capabilities internal and external etc. Dedicated ICs (integrated circuits) allows task decentralization and increase efficiency and speed when used with the unit. In Microcontroller unit, multiple microcontrollers and Integrated Circuits handling dedicated tasks are used, while a master Microcontroller handles task assigning work. The software programmed in these hardware are very important as it works in sync with the rest of the system. This software performs operations on commands received from User Interface Device/Human Machine Interface, reads these commands and performs relevant executions of that command. FIG. 28 gives a flowchart depicting the various features, including both the hardware and the software of the microcontroller which is the device/machine controller unit. FIG. 29 gives a flowchart of few important components of the microcontroller unit and hardware controlling sections, which form controllability in important parts of the machine of the present invention. This microcontroller has various communication features like USB and/or serial communication to PC or dedicated devices/smart mobile phones/tablets or similar devices in wired or wireless medium.

(b) Device Software/Microcontroller unit software application(s): The device software are one of the most important aspects of the machine. These software have been custom developed for communicating with the User Interface Device, and inter device communication and controlling with other ICs and controllers. The Device Software accepts the commands from User Interface Device and executes them on the machine. The output of these commands may be actions like movement of motor, reading values, from sensors, push pull of actuators, hardware positioning, switching, of relays, regulating various hardware controls, sleeping mode in specified unit of time etc. which are performed/executed by the machine. The core of this software is Assembly language, C, C++ and/or java programming language, in which the programs are written. The Microcontroller(s) unit uses custom developed libraries in said language, which help in bringing modularity and reusability of the software and also reduces software firmware's foot print and enhances efficiency of code in these micro devices where resources are in scarce. These software programs, routines are designed, prepared, tested in computer and then burned/transferred into the device for execution. The said micro software are used in centralized and/or decentralized way based on requirement. In said unit the software has two main parts; like 1) the mini Operating Software/Real time operating system, which resides in microcontroller unit and is provisioned to provide basic framework to main active core program to run. This mini Operating system has some basic features like core utility and programming libraries, upgradable firmware/OS, communication protocol support, programmability etc. 2) The Custom Active Core Program which performs main task in this machine layer. This program has various salient features like Advance Encrypter/Decrypter routine, communication manager, code extractor, task handler with multi tasking, capabilities and multi microcontroller task manager, command executor, hardware libraries which corresponds to relative hardware used, sensor input and process management, events and methods handlers and routines, interrupts and timers handlers, data converters, command stacking/queuing manager, signal, data processing, hardware management wrapper routines, multiple industrial microcontroller management, inter controller communication, multiple microcontroller and IC (integrated circuits) task manager, dedicated electronics components/hardware management and control. When the device starts, the burned software also starts, when the command is received by this device/unit, it is executed immediately or added to queue of commands to be executed and during this process each required feedback is provided to user interface device.

Figures 2, 3:
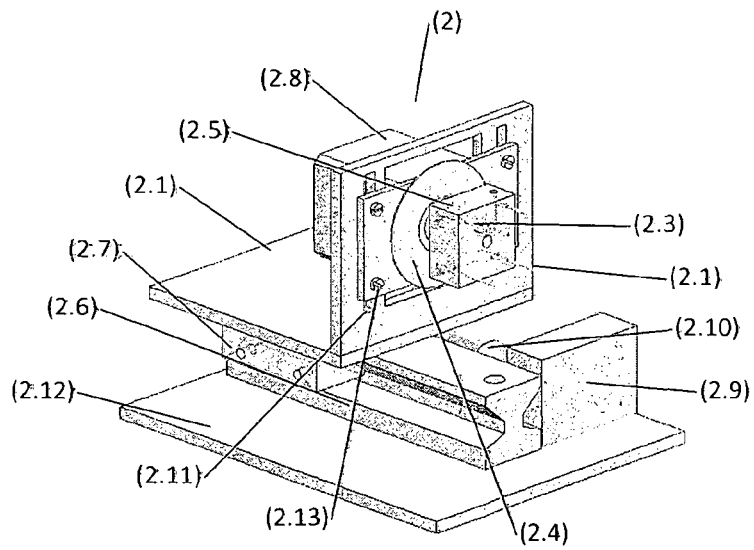
FIG. 2 displays the masala/seasoning selecting/picking mechanism.
Figure 3:
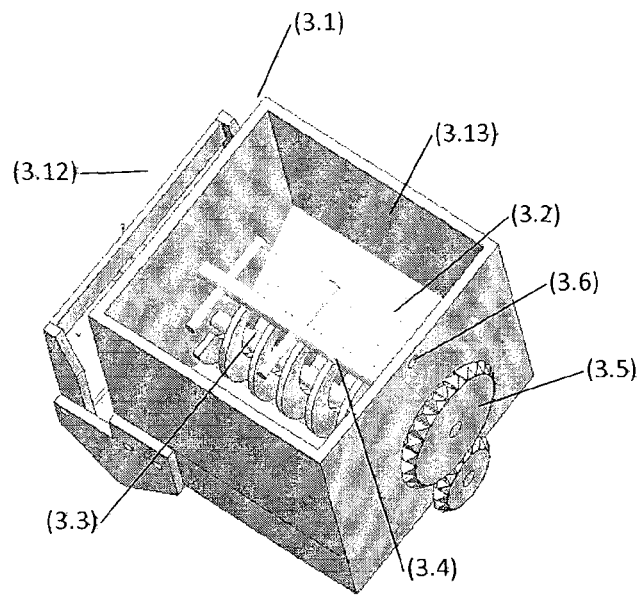
FIG. 3(a) displays the masala/seasoning box first 3D view
FIG. 3(b) displays the masala/seasoning box 3D top view with screw conveyor
FIG. 3(c) displays the masala/seasoning box detailed view with attached masala selector/picker.
Figure 3:
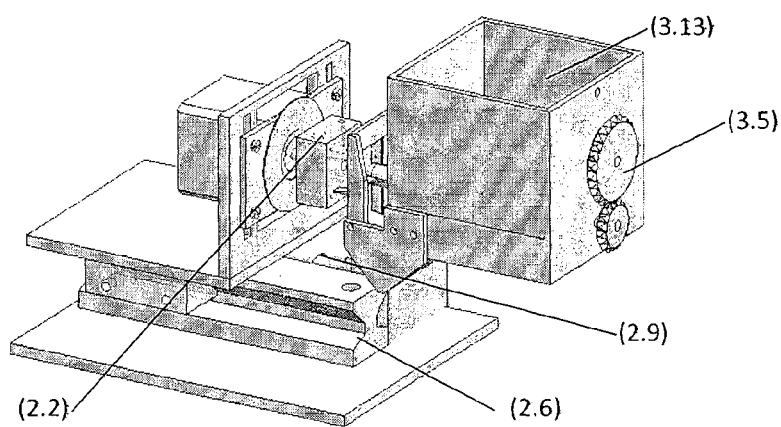

Machine Hardware:

(c) Executing mechanical system:
   Masala (Seasoning) Selector/Picker: This mechanism executes main task for the system. It is loaded with rotational components with gears and shafts, rotary grippers/couplers, movables with push arm, guideways etc. and electronic components with position recognizing, signaling etc. components to execute its tasks. Its main task is to pull out or forward and gather seasoning from its holding box to its primary dropping area and hold the seasoning there as the dropping of that seasoning is done by another mechanism. This mechanism is controlled by the Central Device Controller/Microcontroller unit under governing of user interface device computations. This mechanism executes the feature of selecting and adding adequate quantity of spices and seasoning of powder and/or mini pieces of ingredients to the recipe while cooking. FIG. 2 gives a closer view of the Masala selector/picker which has top housing (2.1). The whole unit is installed on base housing (2.12) on which the main mechanism for seasoning selecting is mounted. This mechanism is by default on detach position activated by actuator (2.9), when the need arises to bring it to attach position, actuator (2.9) brings it to that position sliding on guideway (2.6) with the help of slider (2.7). Now this slider (2.7) has three main stops within guideway (2.6) i.e. detach position, sensing, position and attach position. The detach and attach position are the extremes points, located at both ends of allowed movement area of slider (2.7) whereas sensing, position is the position where sensing wire (2.3) is in the range of touch range of sensible proxy (3.14) of female coupling counterpart (3.7). Once sensing position is reached the male coupler/rotator is rotated by stepper motor (2.8) until the coupling position is ascertained and sensed, now this signal received is transported by electricity conductive metal plate surrounding motors shaft. The sensing, proxy (2.3) is in constant touch with electricity conductive metal plate (2.4), and from there this signal is sent to Microcontroller Unit (1.11) and then Microcontroller unit (1.11) executes the sub code to set selector/picker mechanism (2) to attach position, as male coupler (2.2) is now in perfect position to get inserted inside counterpart (3.7). It can also use DC servo motor (2.10) instead for actuator (2.9) position. This unit also supports configurability and adjustability in height and movement area (2.11), the base housing for mounting (2.12) and uses the nut bolts like (2.13) to join the parts. The present technology utilizes screw conveyor technology in masala boxes for directing the required seasoning (masala) towards the dispensing point in masala box, and hence the selector mechanism first rotates the main screw conveyor shaft (3.3) from outside the box. Prior to this, the selector (2) is supposed to fit itself with masala box screw conveyor shaft's external connecting module couplings (3.7), just like male to female connection. For this it takes assistance of additional external rotatable proxy in the form of two high sensitive wires (2.3) originating from male coupling at (2.5) in the form of switch sensor or sensor proxy, installed in such a way that when minimal pressure is applied or sensed, it acts as a switch and provides a signal for "Rotating Male Module"/auto shaft coupling (2.2) to get fixed to the female coupling module (3.7) as displayed in FIG. 3(*c*). Any other electronics or mechatronics components could be also used to sense the position for auto grip. This mechanism ensures that male module is inserted in exact position to its counterpart in order to make sure the masala box's shaft rotates when external power is applied through selector. Yet another but important approach of dynamically gripping is seen here, in the form of auto gripping, for which collet has also been used, the same mechanism/technology which grips, shafts in handle of vessels, from pouring unit.

Masala Box (Seasoning Box): FIGS. 3(*a*) and 3(*b*) show the top view and the angular view of the masala box. The masala box (3) has a very unique work to do. It holds, directs, gathers, levels and drops the masala when it is directed to do so. Figures display the external housing (3.1) in which the female counter part to rotating coupling module (3.7) with sensible proxy (3.14) is used which gets attached with shaft coupling mechanism (2.2), which is displayed in the front bottom, is responsible for rotating the screw conveyor shaft (3.3) as well as getting gripped from external motor via female coupling module (3.7). While the shaft gets rotated, the seasoning gets dropped through masala exit point/dispensing point (3.8) into the closed primary dropping space (3.11) which holds the seasoning till it gets added to the main recipe. This dropping shall be activated by an external force applied by actuator/cylinder i.e. masala dropping, arm (10.12) situated in procurer unit (10). These figures also display the screw conveyor with shaft (3.3) which pushes masala/seasoning towards exit point (3.8) on each rotation, wherein these number of rotations are computed based on recipe file's instructions provided, and these instructions are further processed with standard benchmark masala dropping, of that particular masala on reach rotation. The rear gear mechanism (3.5) uses rotation power from main screw conveyor shaft (3.3) for leveling/proper mixing of masala on each rotation. The top view of the masala holding chamber displays masala box's internal view in FIG. 3(*b*), inside it the V shaped slope (3.2) is used for directing masala towards screw conveyor mid area. Now when the masala is gathered in primary holding area (3.11., masala box retains selected masala until masala dropper arm (10.12) pushes the masala box's lever (3.12) and masala gets dropped. This unit has the push mechanism joining point (3.10) and parent unit (3.9) which holds this temporary area of storage. FIG. 3(*b*) also shows seasoning, holding, area (3.13) which is coated with non stick material. The screw conveyor forwards the masala's, exact requirement to the dispensing points from where it gets dropped into the cooking vessel after being directed through an appropriate funnel. FIG. 3(*b*) shows the gears (3.5) on the back side, which rotates the masala leveling shaft with paddles (3.4) and helps the level to remain filled evenly after each use. At the back side, attachment sockets for chain fixing point(s) (3.6) are also created to fit this unit with chain. This mechanical entity is responsible for holding and dispensing the powder and mini pieces like seasoning, masala, masala mixture and other powder based or formed ingredients. It uses screw conveyor technology as the core to dispense seasonings. This screw conveyor technology is mounted on a shaft whose one end is attached with the female counter part i.e. coupling (3.7) for masala selector/picker module and other end is attached with gears (3.5). The gears (3.5) at back end of the shaft further rotates one more leveling shaft with paddles (3.4)

placed on top of base shaft at some distance, at reduced rotation which ensures that the seasoning, fills up the place which is emptied after dispensing. FIG. 3(c) shows the seasoning/masala box in attach position with the masala selector (2). Again special arrangements have been made to allow seasonings to get dispensed only when directed. Otherwise a small auto controlled door gets, closed at dispensing paint (3.8), which avoids unnecessary wastage of seasonings. And an overall housing will protect this box (3) and its mechanism from affecting in its proper functioning. This box (3) can hold up to 200 to 500 grams of seasoning which can be increases/decreased and customized as per the user's requirements. This dispensing of masala is based on computation and standards defined under the System's Database and in accordance with the selected recipe.

Figure 4:
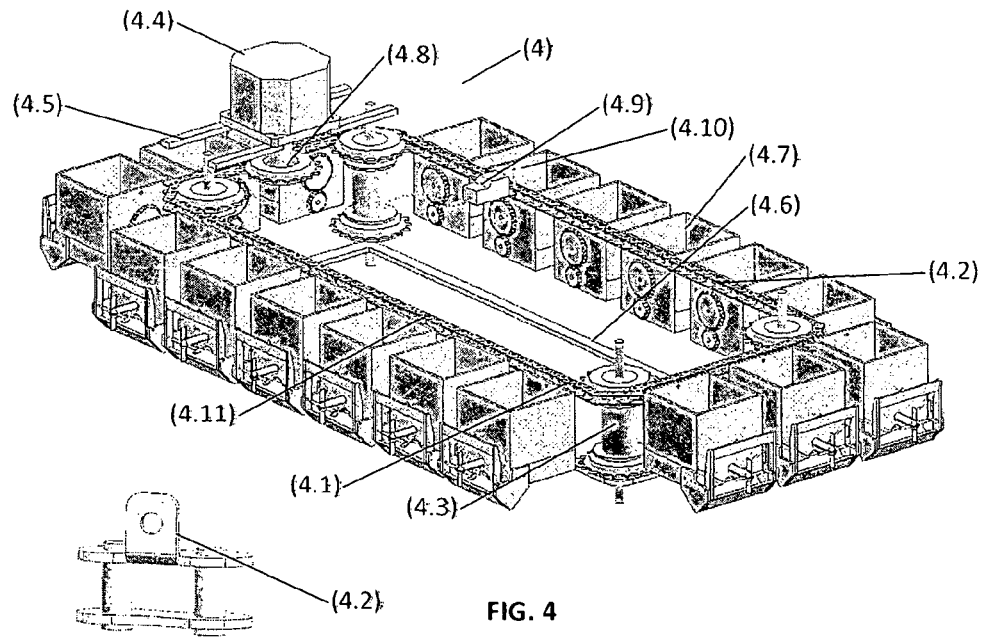
FIG. 4 displays the masala/seasoning changing mechanism.

Masala changer (Seasoning changer): The system of the present invention has a very comprehensive, most feasible mechanism for dynamically changing active masala boxes or positioning active masala boxes to the desired area in the machine. Accurate positioning of these boxes is crucial in order to position masala selector (2) module's male couplings (2.2) against its female counterpart (3.7) for selecting and/or sprinkling/adding seasonings. As shown in FIG. 4, the mechanism is based on rotational structure for its working which has chain with attachments and sprockets based approach. The chain mechanism (4.1) and group of sprockets (4.3) are controlled by accurate stepping by heavy duty stepper motor (4.4) which is mounted on a heavy base (4.5). The chain mechanism (4.1) could be multiplied to add more stability and strength i.e. a group of sprocket could allow more than 1 set of chains on its path. Again multiple layers of this seasoning changing mechanism (4) could be added given that its dropping areas don't interfere each other and seasonings holding capacity can be increased. The fig. also displays the sprocket bottom support (4.6) which provides stability to sprocket from bottom too, the masala boxes (3) get attached with chain (4.7) with use of chain attachment point (4.2) in chain and counterpart in masala box's fixing point (3.6), the chain gets rotated via sprocket module for motor (4.8), where as the zero position of chain mechanism is sensed by proximity sensor (4.9) when it senses the metal sensing proxy (4.10) in chain mechanism. The sprockets (4.3) distribute the total weight of mechanism by chain surrounding the sprockets (4.11). The rotation of this stepper motor is controlled by the Microcontroller Unit based on computations and processing of current position, required position, minimum position acquiring time etc performed by user interface device's software application. This Unit gets its commands from the Systems User Interface's computations and commands. As shown in the FIG. 4, this mechanism holds separate masala boxes at equal distance from each other. Although the masala boxes positions are changed frequently, at any point of time, the system knows details regarding its current active/positioned masala box. For refilling these masala boxes, the masalas (seasonings) need to be refilled from the top of the machine's refilling location as recommended/directed by the system. The emptied/emptying masala box gets itself positioned below the refilling, position so that the user can easily refill it.

As shown in this figure, the masala (seasoning) boxes are fixed in a closed attachment chain at equal distances. This helps the system in calculating the movement and changing of masala boxes. Whenever the user selects any recipe, the system first evaluates the required ingredients on the basis of various parameters like availability, stock quantity, and usage during cooking, calibrated settings, source positions etc. Then it collects the required masalas in the masala boxes' primary collection areas. Then when the actual cooking starts, the system drops the masalas in accordance with the recipe as and when needed. The chain mechanism. (4.1) changes the position of the masala boxes on top of the cooking vessel and the masala/seasoning pushing arm (10.12) on the procurer slider unit (10) pushes the drop control area's arm and hence drops masala from the primary collection area to the cooking vessel via funnel (10.11).

Figure 5:
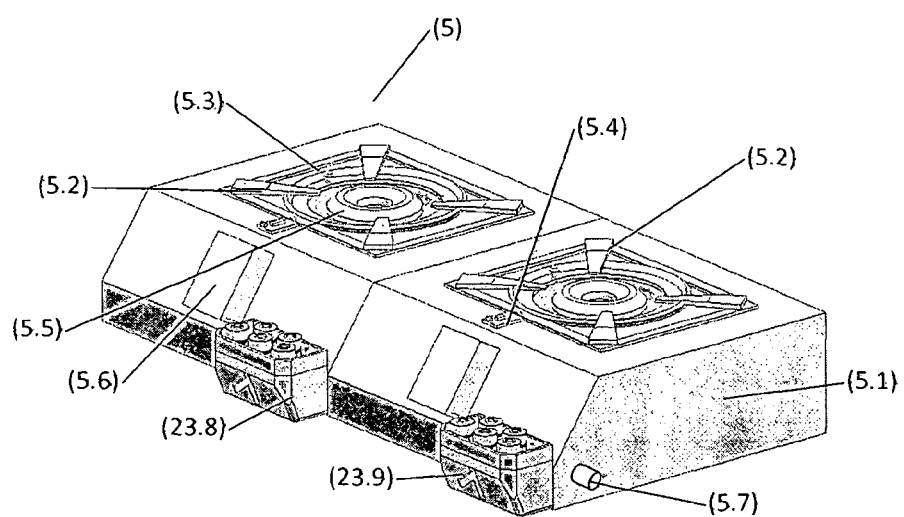
FIG. 5 displays the heating unit.

Heating, unit: Heat being, one of the important aspects of all cooking systems, needs to be controlled safely and efficiently. In the present invention, the heat is generated and controlled via custom developed designed gas burner/stove/electric/inductive heating unit (5) for heating vessels/ingredients. This digital heat regulator regulates the heat for stove—flame flow regulator (for gas stove) as well as for electronic heat controller for electric/electronic/thermal etc. types of heating units. As shown in FIG. 5, the heating system displays an external body (5.1) that surrounds the full heating unit, vessel base stand (5.2) for providing bottom support for attached vessels and modules in pouring mechanism (13) as bottom support, auto flame igniter (5.3) controlled from Microcontroller unit (1.11), which ignites the gas to start the flame in burner/heat source (5.5). However in electrical inductive heating unit igniter may not be there as in that case intelligently coded hardware control library replaces old library and new library related to electrical inductive heating unit controlling shall be considered. These settings are done in settings User Interface Device's (1.10) control settings section, a flame detector (5.4) remains in constant sync with Microcontroller Unit (1.11) and User Interface Device's background working task manager. This way it constantly checks flame status and temperature readings, and regulates the heat with digital heat/flame regulators (5.6), the stove gets fuel source from gas inlet point (5.7) being, a gas oriented heating unit. The heating, unit provides user friendly multiple pneumatic connection points (23.8) in easy user's reach, wherein user can connect the counterpart (23.7) from various vessels, attachments and modules and that way cane join listed those components pneumatically with the machine and provide pneumatic power to them for various operations. The user is provided with pneumatic connection attach/detach lever (23.9), with the help of which the user can attach or detach male counterpart (23.7) to/from machine. The heating, unit may have more than two burners/heating sources i.e. plurality of burners in linear or non linear mode of arrangement. This heating unit is controlled by the device controller/microcontroller unit. This custom developed digital gas and heat controller controls on, off and complete heat flame flow in accordance with the commands received from the User Interface Device which are interpretations of recipe data file and self computations.

Figure 6:
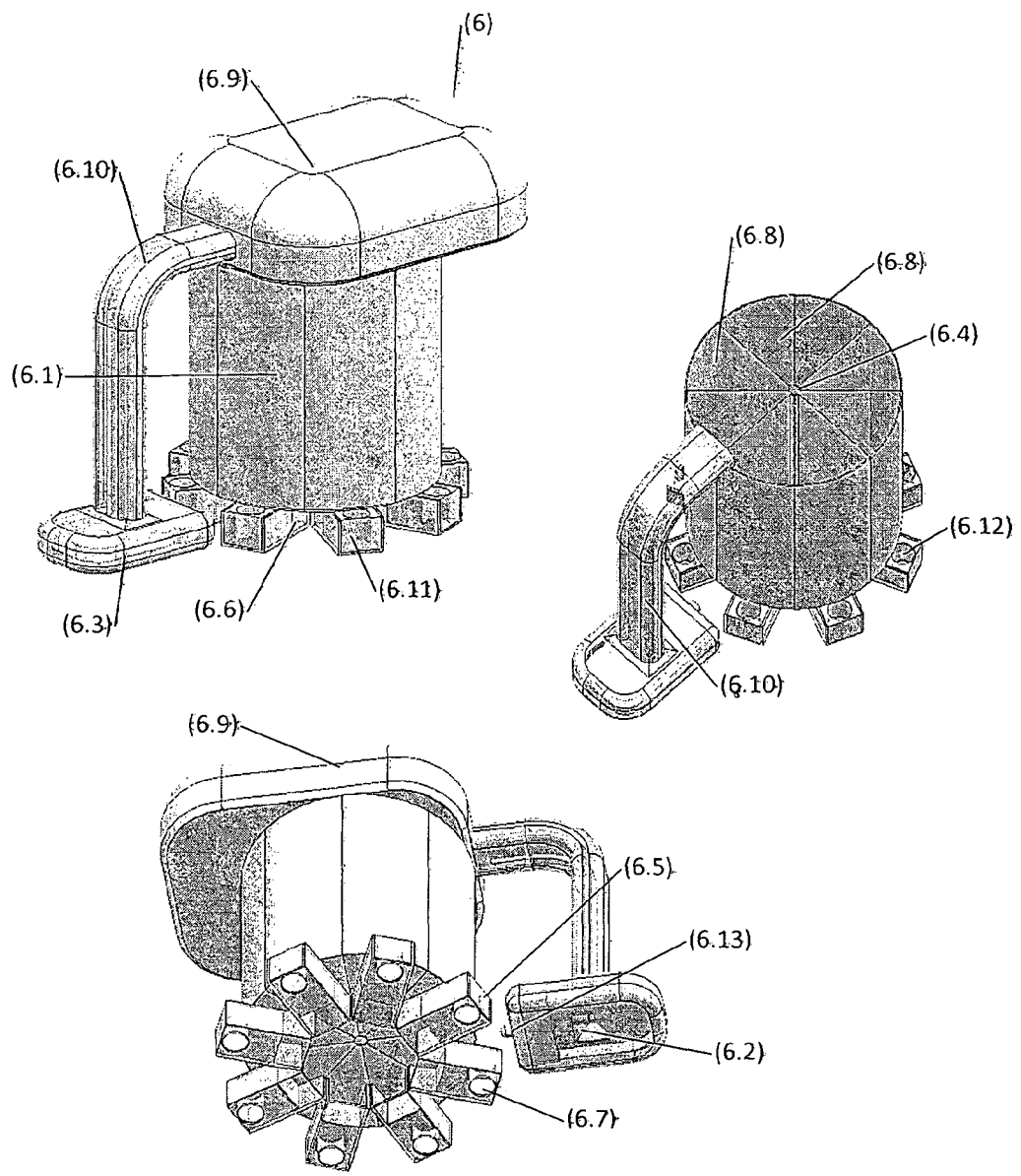
FIG. 6 displays the cereal dispenser unit.

Cereal Unit: The cereal unit has been designed considering the range of users eating dishes fully or partly made of cereals, and this also contributes towards preparing a fully meal dish. This unit's body (6.1) rotates and selects required cereals and drops predetermined quantity in the procurer unit (10). The procurer then transports the dropped cereals to the required vessel wherein further cooking is going to occur. FIG. 6 gives the different views of the cereal unit including the complete view, the angular view to display the interior of the unit and the top rotation unit. The cereal unit performs tasks like holding, multiple cereals or pre mixed cereals and dropping/dispensing these cereals as and when required. As displayed in FIG. 6 the centrally rotatable body (6.1) holds cereal/pulses in cereal refilling/holding area (6.8). The full body (6.1) gets rotated by precision motor or servo motor joined at motor connection point (6.4). This motor is mounted inside top rotation unit (6.9). The cereal unit has three main components, top rotation unit (6.9) responsible for rotating body (6.1) clockwise and counter clockwise and mounting external pushing mechanism section (6.10), external pushing mechanism (6.10) and cereal holding unit/external body (6.1). When the need arises the motor rotates the body (6.1) and brings required cereal's exit unit and external force application point (6.5) in front of pushing mechanism (6.3). The cereal pushing and fetching lever (6.13) gets activated by cylinder/actuator (6.2) and pushes the cereal fetcher (6.11) inside of its respective unit. When the cereal fetcher (6.11) is inside, the cereal gets filled into the top of dropping container (6.7) or cereal fetched quantity holding, area (6.12) from top directly from cereal section. Once the grains/cereal are filled the actuator/cylinder (6.2) releases the pressure and moves back and the spring mechanism (6.6) behind the cereal fetcher unit (6.11) which starts spreading and pushes the fetcher unit (6.11) outside of its holding section to its default position. This way the grains/cereal/pulses gets dropped from bottom of hole/dropping container (6.7) in fetcher unit (6.11) into procurer unit (10) and gets itself transported in appropriate vessel(s) by procurer (10).

Figure 7:
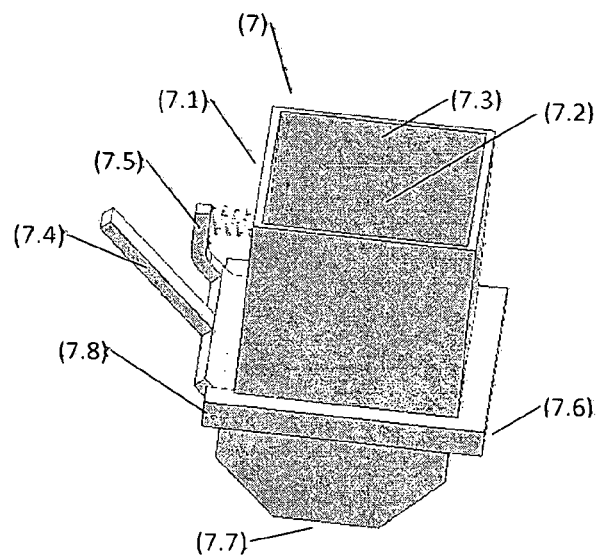
FIG. 7 displays the item dispenser/main/sub ingredients' dispensing unit.

Item dispenser unit: As shown in FIG. 7, the item dispenser (7) with its external housing (7.1) is the unit used for storing ingredients inside its container/storage area (7.2) which is internally coated with non stick material (7.3). This unit gets fitted inside the item dispenser's holding chamber (9) in plurality in predetermined position with its easy attachable detachable design (7.6) such that the activating/pushing levers (7.4) are joined in external housing (7.1) via joining, and rotating point (7.8). These can be activated/pushed from external lever (9.4) of holding chamber (9). This lever (9.4) gets activated from procurer unit's ingredient drop activator (10.2). When the item dropping, lever (7.4) gets activated, it opens bottom doors joined with dropping lever (7.4) of item dispenser (7) and also activates mechanism which will also open bottom doors (9.8). Thus the ingredients get dropped from dropping point (7.7) in procurer's (10) bucket (10.3). Once dropping is done, the spring mechanism (7.5) pushes the lever to its default close position. This unit can be easily detached from its parent unit for refilling, cleaning etc. After these operations, the unit can easily be placed back in its original position.

Figure 8:
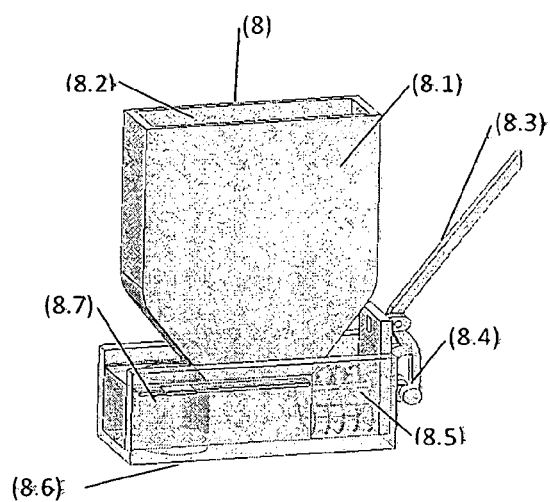
FIG. 8 displays the gravy ball dispenser.

Gravy Ball dispenser: The gravy ball dispenser displayed in FIG. 8, is kept inside the item holding chamber in plurality. The liquid gravies which are essential for cooking can be stored in liquid form. But there are some gravies or semi liquid mixture of ingredients that cannot be easily dispensed as liquids. Hence they are pre-formed in to small sphere like shapes, which could make its use and dispensing easier. Additional ingredients could be added to such gravies to make them into spherical balls and retain shape if needed. These ingredients do not change its base taste but proves helpful in retaining the provided shape. This shape helps in systematic storing, dispensing and acquiring right values of the gravies related to their taste. Various types of gravy balls are stored inside these holders. On activating from outside by ingredient drop activator (10.2) through external activator (9.5) through the lever/dropping handle (8.3) which is joined to fetching units gripper at (8.4), the gravy balls stored in holding chamber (8.2) get dropped to top of gravy ball fetching unit/filling section (8.7) and from there balls gets exited from dropping section (8.6) into procurer's (10) bucket (10.3). Once it gets dropped, the spring mechanism (8.5) pushes the fetching unit to its default state. Gravy balls could be stored in multiple ways like zigzag/sloppy line type guide way and/or normal container way downwards from top to bottom. These guide ways are in internal part of external housing (8.1) prove helpful in directing, gravy balls to exit point avoiding blockage. This holder drops gravy ball(s) from dropping point (8.6) of predetermined quantity.

Figure 9:
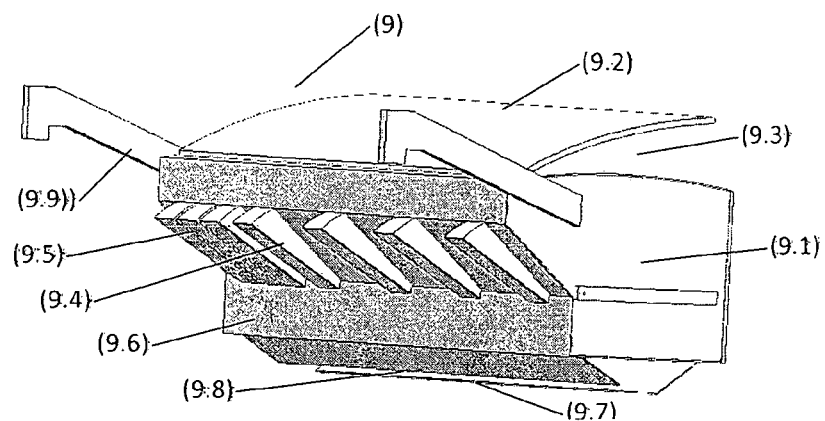
FIG. 9(a) displays the item dispenser's holding chamber/freezer unit with activating lever FIG. 9(b) displays the item dispenser's holding chamber/freezer unit with open window FIG. 10(a) displays the procurer unit 3D view with temperature sensor FIG. 10(b) displays the procurer unit 3D view form other side FIG. 11 displays the procurer slider.
Figure 9:
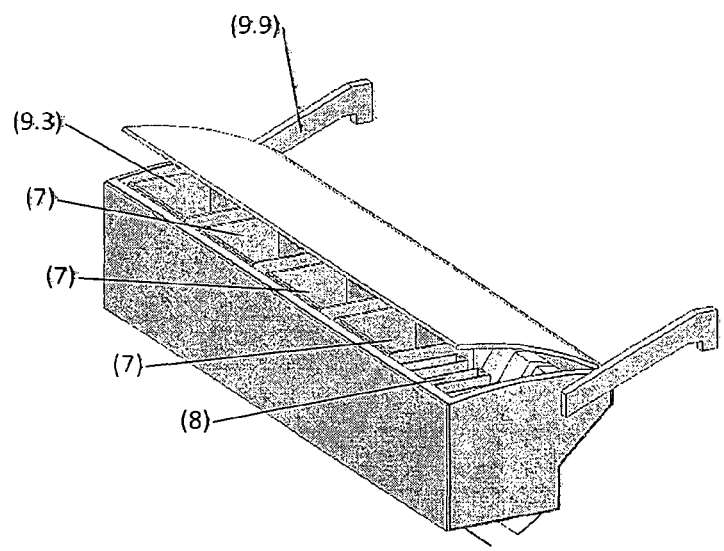

Item dispenser's Holding Chamber/Freezer Unit: In this machine, various materials/ingredients have to be stored inside controlled temperature. This refrigerated system helps in systematically storing and providing centralized mechanism/junction for other components of the system where it is required for systematically dispensing the stored item. This is a temperature controlled chamber for holding item dispensers and gravy ball dispensers. The items which are to be used in near future or items to be used without user interaction are stored in item dispensers. Item dispensers are attached/mounted in this chamber along with gravy ball dispensers. This chamber is temperature controlled i.e. refrigerator unit (24.2) keeps this unit cool, with the help of refrigerating pipes and other mechanism (9.6) inside its housing (9.1), in order to preserve the stored items. This item dispenser holding, chamber (9) is mounted at machine front top section as seen in FIG. 1 by the use of handles and joining mechanism (9.9). Therefore any item getting dropped from this unit via item dispenser shall get dropped directly in procurer unit's (10) bucket (10.3). This chamber (9) has been made highly user oriented as user can fill items inside chamber area (9.3) by opening, the top doors (9.2) and directly fills items in item dispensers (7) and gravy ball dispensers (8). The ingredient's dropping activator arm (10.2) moves behind external activator's handle (9.4) or (9.5) respectively as and when required by procurer unit (10) through procurer slider (11), and ingredient drop activator arm (10.2) pushes the external lever (9.4) or (9.5) as required inside, which again transfers that pressure to internal levers (7.4) or (8.3) and an internal mechanism simultaneously opens bottom doors (9.8) to allow exit of ingredients through material dropping area (9.7). The FIG. 9(*a*) shows back side arrangements of external activator handles whereas 9(*b*) shows the arrangement of the item holder/main/sub ingredient's holder unit and the gravy ball dispenser with the item/ingredient's holding chamber/freezer unit. Detachable ingredient's holders and dispensers—the ingredients holders are kept detachable so that further actions like cleaning, refilling etc can be easily performed on them without the need of any expertise.

Figure 10:
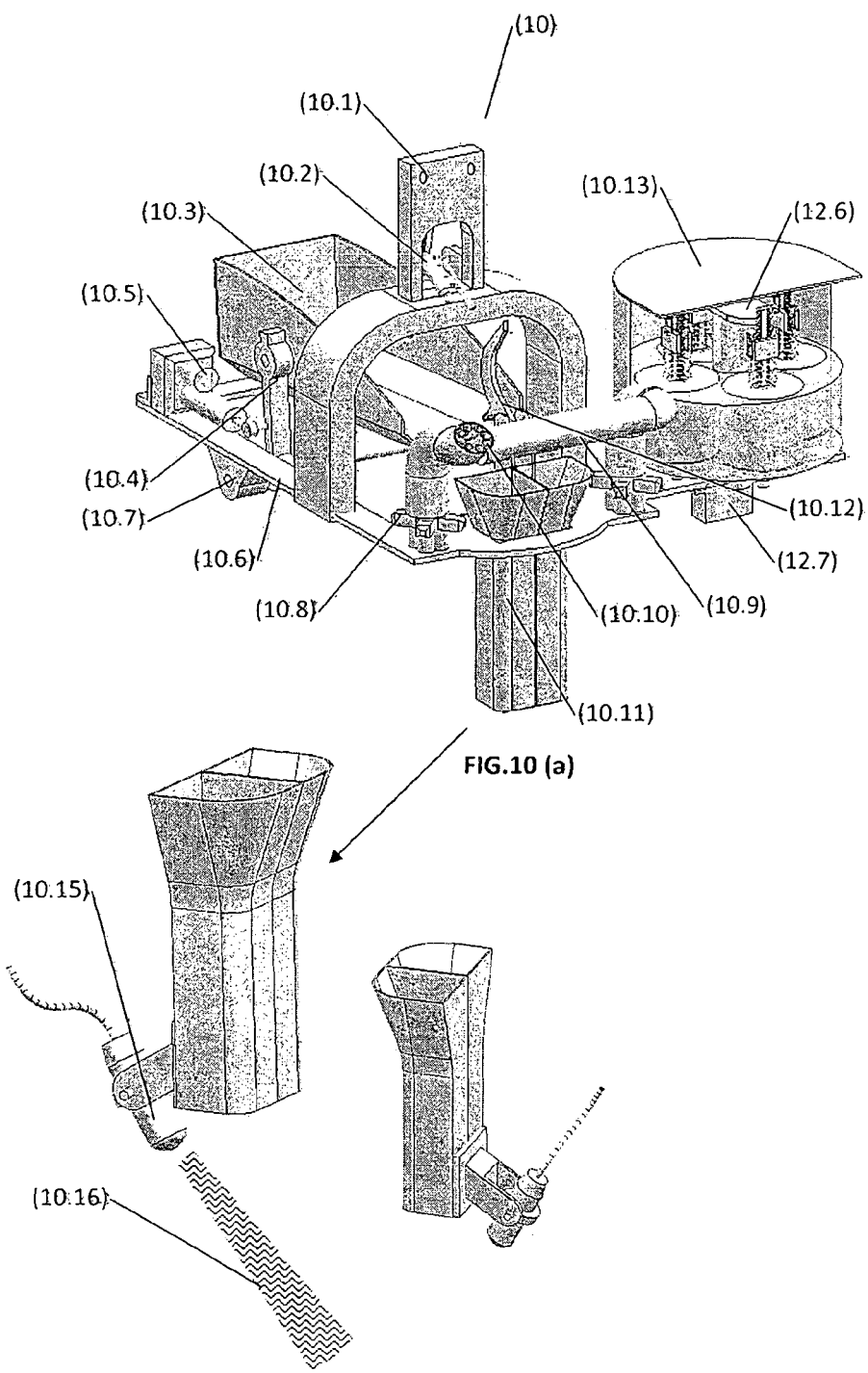
Figure 10:
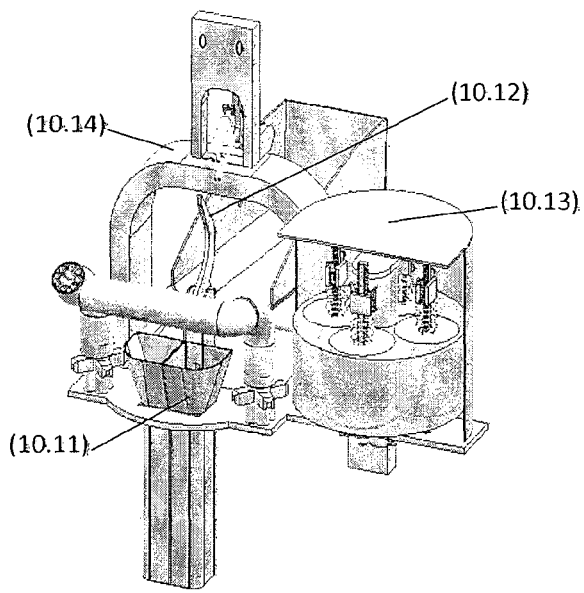

Procuring Unit: This is a very important mediator mechanism in the machine. It is a multipurpose mechanism, which accomplishes various important tasks related to procuring, transporting, hardware activating, sensing, directing, adding, dispensing etc tasks. FIG. 10(*a*) and FIG. 10(*b*) display the arrangement of various components, units and mechanisms installed on the procurer unit (10). This mechanism is located behind the item dispenser holding chamber (9) and cereal dispenser (6), and cover bottom of them in such a way that each item dropped from there, directly gets caught in the bucket (10.3) of procuring unit (10). This mechanism gets fitted to the procuring unit slider (11) via mechanism to slider joining point (10.1) which is joined with carrier structure unit (10.14) and whose bottom mounts base (10.6) in such a way that this unit's can contact almost all other units of machine in its range. Procurer unit (10) is multipurpose in its related activity for example; specially designed dual funnel (10.11) gets positioned below the area where masala/seasonings gets dropped from masala box (3), and masala dropping handle/arm's (10.12) lever is in touch range of masala box's push mechanism (3.12). This unit has been designed in such a way that it can perform multiple tasks from its position and movement range. This mechanism can activate item dispensers (7) and gravy ball dispenser (8) mounted in cooling chamber (9) via ingredient drop activator (10.2), and when main dropping bucket (10.3) gets activated by its actuator (10.5) by pushing bucket holding unit (10.4) which is mounted on bottom support/bucket moving mechanism (10.7) such that all the ingredients inside the bucket (10.3) get dropped in respective vessels. This mechanism also performs liquid ingredient dispensing tasks by controlling flow/drop of liquid through solenoid valves' (10.8) group(s). These valves are connected to a series of pipes (10.9), which are surrounded by a covering pipe as displayed in internal pipe view (10.10) connected with liquid dispensing unit (16). All droppings are directed to vessel cooking area by regulated and precise targeted movement of procurer slider unit (11) as procurer unit (10) is connected with it. The important task of sensing/reading of temperatures of vessels is accomplished by contact less distance temperature sensor (10.15) fitted with Dual Funnel (10.11) in such a way that it points wide range area in the centre of vessels and modules. It provides reading values of vessel's and ingredients' current temperature within its sensing/area range (10.16). These readings are taken by Microcontroller Unit (1.11) and from there it is routed to User Interface Device (1.10) for further processing. The dual funnel (10.11) is used to maintain integrity of two main ingredients chief leading taste characteristics i.e. sweet leading, tastes and spicy leading tastes. Because the machine can cook in multi cuisine, sweet related seasonings are not diverted from the funnel which is used for spicy related seasonings droppings. The procurer unit with paste dispenser housing and base (10.13) contains the dynamic paste dispenser (12) wherein base motor (12.7) controls the rotation i.e. bringing correct paste dispenser at the location where paste release activator (12.6) can release paste to targeted vessel. Now procurer unit with paste dispenser housing, and base (10.13) when not in use, is provided a special storing/container unit (12.12) i.e. a temperature controlled cooling unit where pastes can be preserved for a longer time. This auto controlled cooling unit is cooled by refrigerator unit (24.2). The user can decide to on/off this and other units from settings section of User Interface Device as and when needed.

This module is used whenever there is need of any external item, various types of sauces, or adding seasonings to active recipe vessel. For addition of external items, the system highlights audio visually, so that the users' attention is attracted towards the machine. It asks for the users' input directly in bucket (10.3) or from item dispensers (7) for providing special ingredients, selecting proper options in User Interface Device/Human Machine Interface etc. Once the user feeds the ingredient in this unit, it holds them until their next process is finalized and then performs the appropriate action.

Figure 11:
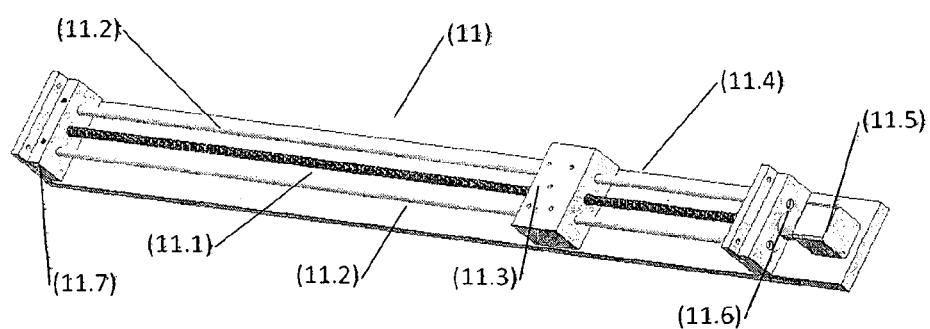

Procurer/Carrier slider: This slider transports the provided ingredients to various portions of the machine through procurer unit (10). It is controlled by User Interface Device (1.10) via Device Controller/microcontroller unit (1.11). The procurer/carrier unit (10) gets fit in the procurer slider's (11) procurer's ball screw unit (11.3) in such a way that it is easily attachable and detachable. FIG. 11 displays the procurer/carrier slider (11) which has threaded ball screw rod (11.1) installed on support structure (11.7) which moves the ball screw unit (11.3) in either directions as per requirement, the plain supporting rod (11.2) provides extended balance, weight and moving path stability to ball screw unit (11.3). The ball screw unit/carrier (11.3) which act as hanging/fitting points where the procurer's joining paints (10.1) gets fitted. The base stand (11.4) provides core area for mounting and installing various supportive devices and mechanisms. The threaded ball screw rod is joined to stepper motor/encoder motor (11.5) via coupler (11.6). This motor has the responsibility to move ball screw unit (11.3) in either way. This slider is mounted on a weight sensor (Load Cell Sensor) at the base of its fitting location in machine for getting better idea on live weight measurement of provided items. These weight readings are provided by appropriate device in the system for better cooking calculations and for providing better combinations.

Figure 12:
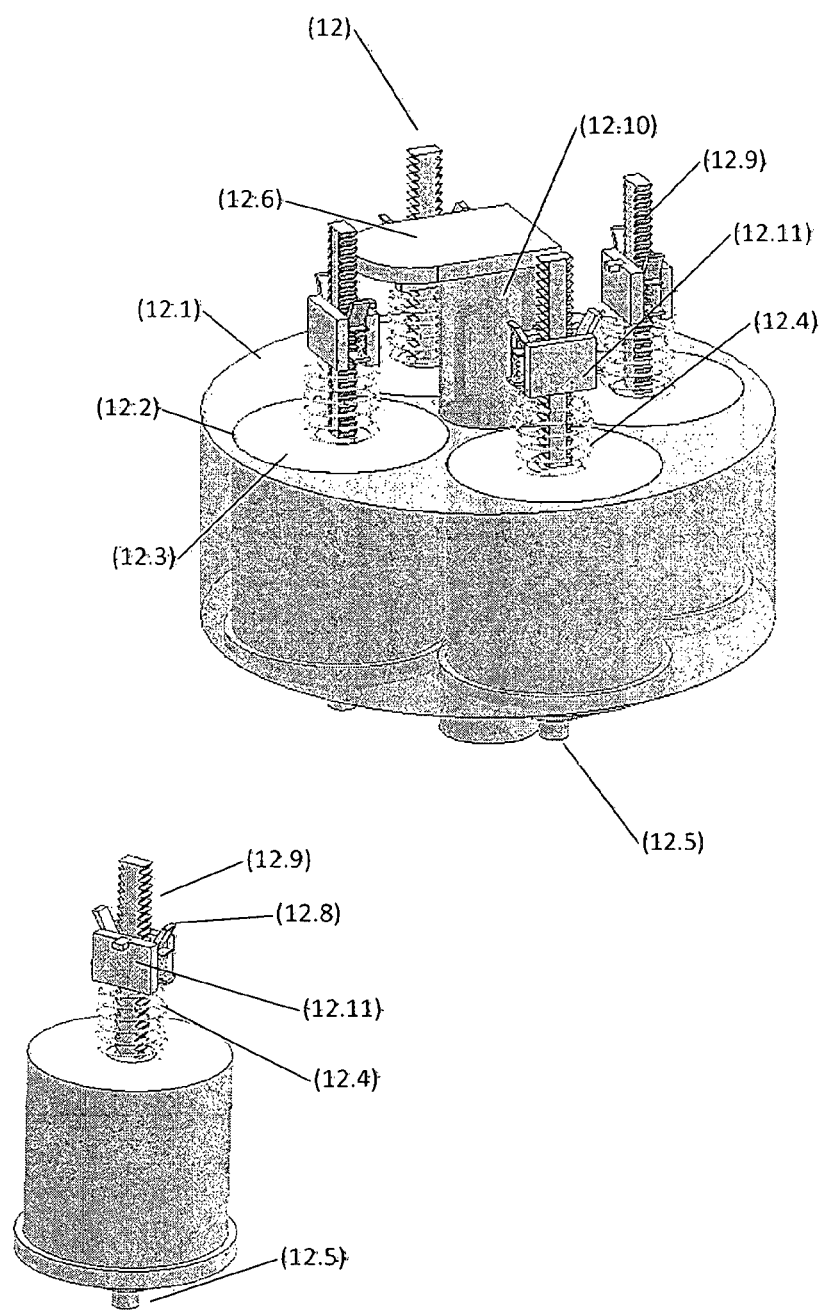
FIG. 12 displays the paste dispensing mechanism.

Paste Dispensing Mechanism: This mechanism is used for holding and dropping/dispensing various types of pastes and sauces in required vessels. As shown in FIG. 12 a circular housing (12.1) with holding sections (12.2) is provided to add separate paste dispensers (12.3) in to it. These paste dispensers (12.3) hold inside various types of pastes or semi liquids. When any requirement comes, first the motor (12.7) joined with housings/external body (12.1) at the bottom centre point rotates either clockwise or counter clockwise and brings notch/lever unit/paste release activator agent (12.11) of needed paste dispenser in range of paste release activator unit (12.6); which when activated/pulled down: by actuator/cylinder (12.10) also pulls the self locking, mechanism (12.8) on paste release activator agent (12.11) which then pulls square shaft (12.9)/plunger to a fixed number of unit downwards, which pushes the inner liquid to get released through dropping point (12.5). When actuator/cylinder (12.10) releases the pressure the spring (12.4) installed between top of paste dispenser (12.3) and bottom of paste release activator agent (12.11) expands and moves the paste release activator agent (12.11) back to its normal position, as the locking mechanism (12.8) is only allowed to grip the geared shaft in downward movement. When the spring (12.4) spreads, the self locking doesn't provide resistance and moves upwards to default position, leaving the square shaft (12.9)/ plunger & piston at bottom edge at its place only waiting for the next drop. This way the paste gets released from its dropping point (12.5). This arrangement is situated on procurer trolley (10). It has separate sauce dispensers (12.3) for various tastes and flavors. Whenever there is requirement of dropping a specific paste from the stored pastes, the selected paste is initially brought into position and then an actuator based mechanism pushes the paste hold/drop mechanism from the top directly into the cooking vessel. This mechanism releases a predetermined quantity of paste through its nozzle.

Figure 13:
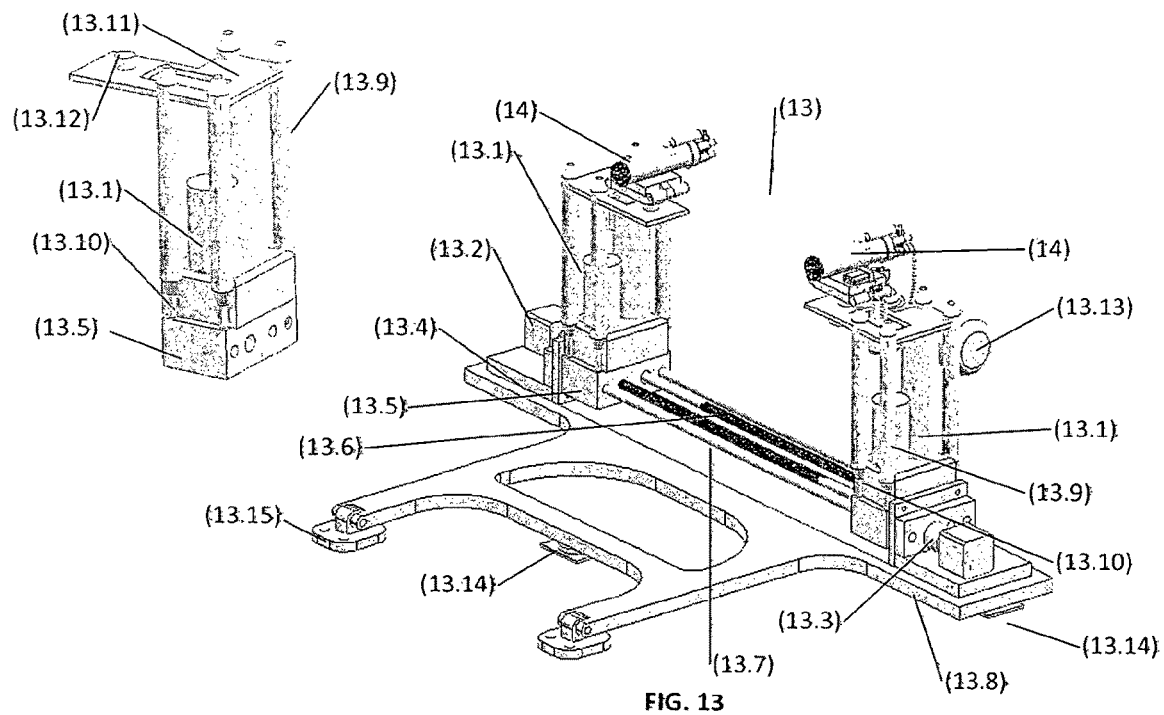
FIG. 13 displays the pouring mechanism.

Pouring mechanism (inter mixing/swapping of phases of recipe): One of the main mechanism of the system is the pouring, mechanism as—this system facilitates multi phased cooking which usually requires pouring, of one cooked item into another. The pouring, mechanism ensures dynamic controlling during mixing, of ingredients getting processed/cooked in/on multiple places/burners in any recipe that involves multiphase cooking. In multiphase cooking different parts of a recipe are prepared in multiple phases. After these phases are individually cooked, they need to be added to other phases, which require the pouring mechanism. It pours the selected vessel's ingredients to the main cooking vessel while ensuring that all the material has been poured to the main vessel which continues the further process of cooking. After dropping the ingredients in the main vessel, the pouring vessel is brought back to its default position and kept ready for further new tasks. For the pouring mechanism, the vessels/modules which are to be attached to pouring unit have a unique jacking/attaching/joining feature. Due to this feature not only the joining of the vessel with its counterpart is performed but the mechanism providing rotary powers to vessels, modules and communication cables related to sensors, switches etc gets attached. FIG. 13 displays over all views and scenarios of pouring mechanism for which the vessels/ modules are to be attached to the pouring unit (14). As the recipe data file provides information, the machine recommends the user to attach the vessels to pouring units (14), the intelligent system identifies each vessel from its smart tagging/unique RFID (21.12) provided in the vessels handle which provide information to the RFID scanner (14.30) in the pouring unit (14). This way the machine knows the type of vessel and its location on the machine. After the vessels are attached, the cooking begins and as the recipe file describes the pouring(s) from one vessel to other vessel and vice versa takes places; In pouring mechanism lifting, moving and dropping etc activities are performed, which are described as various components performs their tasks like for lifting pouring unit the heavy duty industrial pneumatic/electronic actuator (13.1) lifts the lifting mechanism (13.9), along with which the pouring, units' main base (13.11) gets lifted. The pouring unit lifting mechanism (13.9) and lifting unit's rods (13.10) are positioned in such a way that while lifting, only the pouring unit (14) goes up, as the heavy supporting lifting unit rods (13.10) provide fully stability. The pouring, unit (14) will get fitted in pouring unit's base's (13.11) joining point (13.12) via pouring, unit positioning point (14.10) of pouring unit (14) through motor housing (14.7). Now once the base unit (13.11) is lifted, the task of moving, whole unit is initiated, i.e. the stepper motor (13.2) mounted on motor mounting base unit (114) connected with respective threaded rod (13.6) via connecting coupler (13.3) and supported by plain rods (13.7) starts rotating, and along with it respective ball screw moving unit (13.5) on which the lifting mechanism with vessel is mounted starts moving, until the system reaches the appropriate position when actual pouring/transferring, could take place from giving vessel to taking vessel. This pouring, mechanism (13) is designed in such a way that it gets fitted appropriately with bottom of machine with help of hinges (13.15). The design and placement of extended base (13.8) helps to smartly ascertain the centre of mass of pouring mechanism (13). This also helps to balance the whole mechanism (13) when loaded with vessels, as well as ascertain the weight of added ingredients/weight loss of ingredients while cooking by weight sensors (13.14) installed beneath the mechanism. The unit also shows demo of how the motor with flexible shafts (13.13) and non flexible shafts could be attached with pouring unit (14). This pouring can be performed from either of attached vessel/module to other vessel/module in same way as detailed above. The special dish cooking modules are attached in the same way as the vessels.

Pouring Unit: Pouring, unit is the most complex unit in the machine. It is also power transfer junction where the power source is used as the generic provider but the use may vary based on the requirement. This mechanism is made highly configurable and adaptable, so that user can just attach their vessels and the remaining task will be taken care of by the machine with the help of this unit. This unit gets attached with pouring, mechanism's pouring, main unit joining point (13.12) and pouring unit's joining point (14.8)

through shaking, motor housing (14.7). This unit performs various tasks such as gripping vessels, controlling internal functions of vessels and modules, linking vessels and modules digitally (virtually), vibrating/shaking, vessels' ingredients, pouring the ingredients on other vessels etc. The step by step process is as follows:

A) Gripping of vessels/modules is done by this unit's vessel joining point (14.1). At the first point the vessel's controlling shafts (21.11) inside the handle (21.1) is fixed in pouring unit's (14) dynamic shaft gripping collets (14.2) inside collet housing (14.18); then fastening handle (21.10) is rotated to fasten the vessel in pouring unit (14). After doing so the vessel is physically attached. Now the grip of collets (14.2) gets tightened with the help of pneumatic/hydraulic collet housing cylinders (14.17) automatically. The shaft connected to circular gripping/tightening, mechanism (14.22) and collet housing cylinder (14.17) through joining (14.23), is moved inwards and the grip is tightened for vessels' shafts (21.11). Now when rotational movement is provided at back connecting sockets (14.21), the same is transferred to vessel via gripped collets (14.2). The gripping activated is displayed at scenario (14.25) and when the cylinders (14.17) are released then again reverse procedure deactivates the grip of vessels'/modules' shafts (21.11). The deactivated grip is displayed at scenario (14.24).

Figure 14:
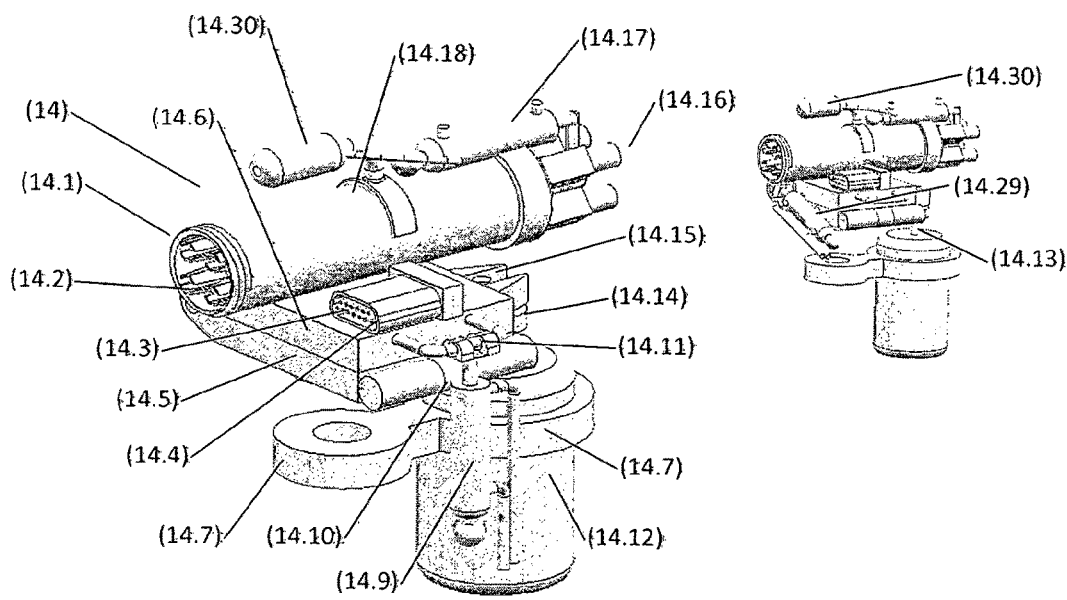
FIG. 14(a) displays the pouring unit with details
FIG. 14(b) displays the pouring unit with rear and internal details

B) Controlling, internal functions of vessels and modules; various types of motors are connected to sockets (14.21), the types of socket are Precision Control A (14.26) and Precision Control B (14.26), High speed motor socket (14.27) and Geared motor socket (14.28). The motor with geared rotation and/or motor with speed rotation are connected with flexible shafts (14.19) and these shafts (14.20) join the pouring unit's (14) sockets (14.16) at rear housing (14.21), powering stirring, blending types of operations in vessels and modules. FIG. 14(*b*) displays the arrangement scenario of various motors connected to pouring unit (14), wherein motor to blend and stir (14.34), stepper motors precision movement (14.31) which are connected via base housing (14.33), transfers the power through gear unit (14.32) to sockets (14.26). Again pneumatic controlling is also provided at socket (23.8) in heating unit (5), so that the vessels/modules internal movement is powered and controlled by pneumatic sockets (23.8), the vessels having pneumatic sockets (23.7) are attached with source pneumatic sockets (23.8).

C) Digital connections are done with the help of digital sockets (14.3) contained in housing (14.4). The vessels have their own plug (21.8) and extended cable (21.9) which have to be inserted in respective digital sockets (14.3). Once inserted the required data, power and communications & command sequences are initiated, and these routines go on tilt the cooking is done and task of vessel is over. Now RFID scanner (14.30) placed on top of pouring unit (14) automatically scans the attached unit/vessel/module unique identification from RFID chip (21.12) placed inside handle (21.1), user interface device reads this data from it.

D) Vibrating/shaking vessels' ingredients; this is done with the help of shaking/vibrating, motor (14.12) where in the shaft (14.13) is connected with circular attachment with lever (14.14). This lever rotates in higher diameter circle then shafts (14.13) diameter. This lever forces the rotating unit (14.15) on angular lifter (14.5) to move in predetermined angle of movement and this movement causes the vessels to shake/vibrate.

E) Pouring ingredients on other vessels; It, is a feature where the giving vessel is lifted and rotated till the extent when, ingredient inside it gets dropped on taking vessel and then angular lifter unit is brought down to normal position. This is done with the help of pneumatic/hydraulic cylinders (14.9) fixed in such a way that when lift begins it also moves at cylinder positioning base (14.10) so that proper lifting angle of cylinder (14.9) could be maintained. Now the cylinder shaft is joined at angular lifter's joining point (14.11) as shown in FIG. 14(*a*). When the cylinder is activated the angular lift slowly raises the top of angular lifter (14.6) and pouring unit (14). Once the ingredients are dropped/poured the cylinder brings down the lifter and pouring unit. (14) An alternate approach has been shown by placing the cylinder (14.29) at front of angular lifter joining, base (14.5) and angular lifter top (14.6). Again the pouring can also, be done on either side, in scenario of machine having more than 2 burners/vessel cooking positions, this feature can be utilized.

Figure 15:
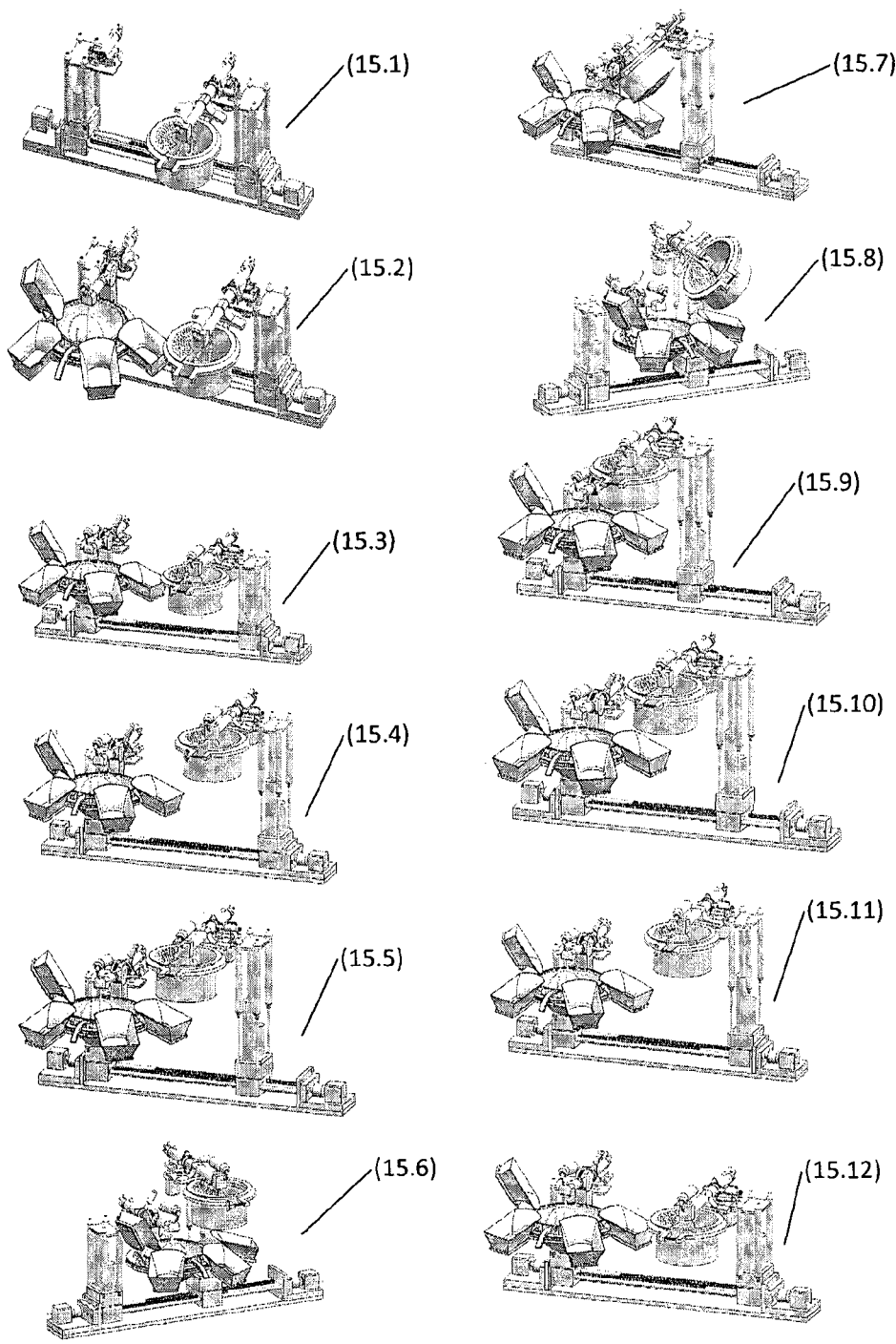
FIG. 15 displays the pouring actions.

Pouring, actions: Some recipes are multi phased recipes in which cooking/preparing is done in various phases in separate vessels and then these phases are mixed as and when required. Such multi-phased recipe needs a pouring mechanism because the system needs to perform various tasks as it is a complex mechanism. For this mechanism; two industrial heavy actuating units are fixed on top of the slider which can move in ways defined by conveyor units and hold the vessel to be lifted. This movement is controlled by stepper motors/motors with precisions. While cooking the recipe, when the need arises of mixing ingredients prepared/cooked in different vessels, arm 1 raises the vessel and moves forward towards other vessel attached to arm 2. When it reaches its position, the pouring mechanism raises the vessel in an angular manner so that its ingredients get dropped/transferred fully in the other vessel. After this, arm 1 goes back to its default position. This same action of raising the vessel and dropping the ingredients can be performed by arm 2 also. The whole pouring and sliding mechanism is situated on heavy weight sensor which provides a live reading of the weight of the ingredients and the weight of the newly added items. FIG. 15 displays the various steps of the pouring mechanism's actions, which are addition/joining of vessel 1 to pouring mechanism arm 1 (15.1), adding/joining of vessel to pouring, mechanism arm 2 (15.2), the position in which bottom of vessels are in direct contact of burner flames, i.e. normal position display (15.3), lifting vessel 1 (15.4), moving towards vessel 2 (15.5), moving more closer and achieving dropping position (15.6), first view of activation of vessel 1 by pneumatic cylinders rotated for drop/pour (15.7), second view of activation of vessel 1 by pneumatic cylinders rotated for drop/pour (15.8), deactivation of vessel 1 on reaching normal position by pneumatic cylinders (15.9), moving of pouring mechanism 1 towards default location (15.10), reaching of pouring mechanism to default location (15.11) and bringing of vessel and vessel holding pouring unit to normal position by actuators (15.12) i.e. on top of respective burner.

Figure 16:
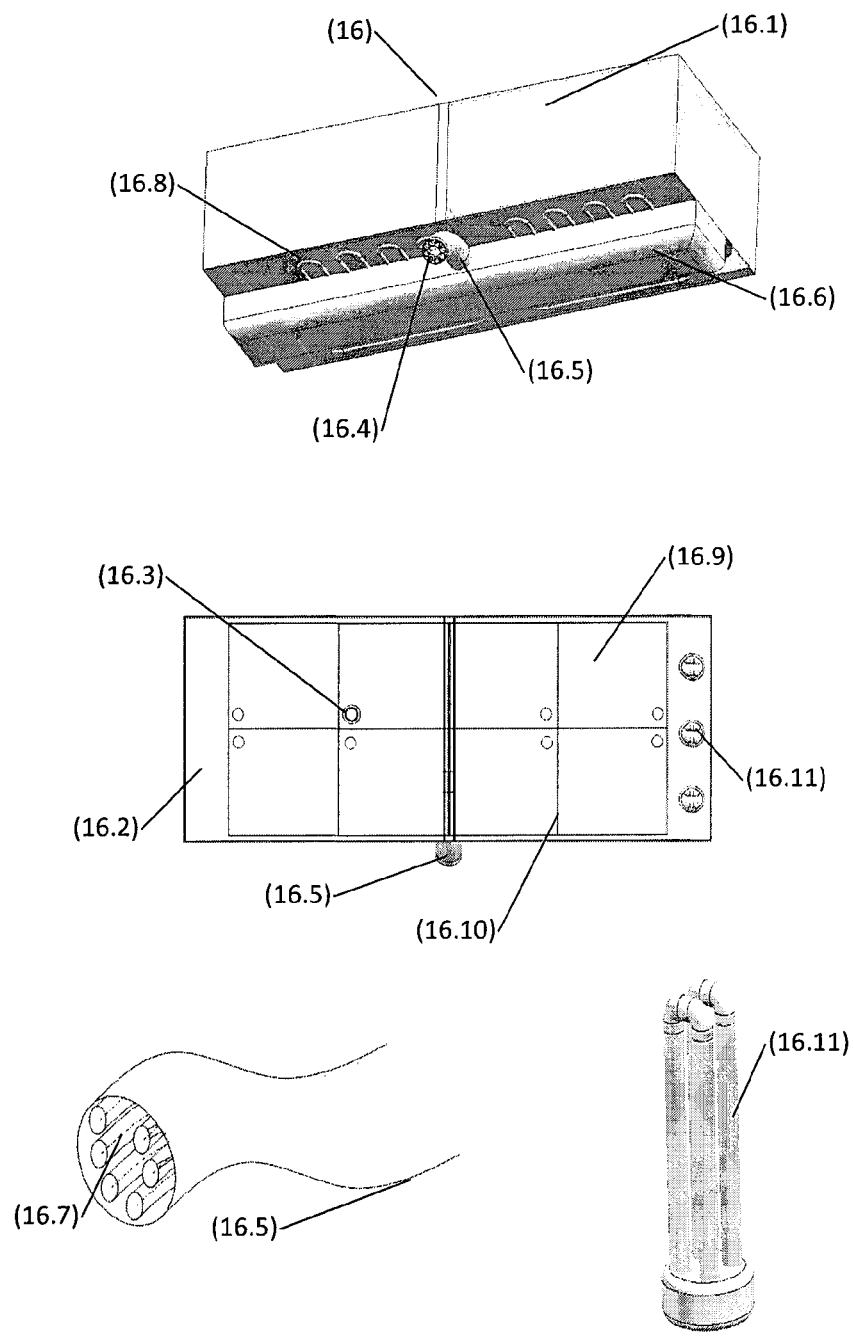
FIG. 16 displays the liquid dispensing and heating unit.

Liquid dispensing unit: Not only refrigeration, but a few items specifically liquid ingredients, need to be kept under warm temperature to maintain its base characteristics like the form of liquid. So the system of the present invention is provided with a specifically developed heating system and container which provides the required temperature to hold liquids. As an important feature, the liquids are required to remain hot till the end of their point of dispensing i.e. solenoid valves. Hence, this heat gets transferred at the end of the dispensing pipe with the help of heat conducting metal wires inside the pipe, due to which it is ensured that whenever signal is given the quantity determined will get released without getting blocked. This unit's temperature remains in constant monitoring and regulations. Hence at any point of time the temperature can be modified and referred. FIG. 16 displays a basic model of this dispensing mechanism. The design has been kept as simple as possible, which would en-able itself to get accommodated in the machine easily. Liquid holding sections (16.9) would store more liquid then circular design, whereas the separating food item centric food grade metallic sections (16.10) keeps liquids separated. The external housing (16.1) covers and insulates internal temperature controlled area (16.2) where as heating coils (16.11) and heating coil tubes (16.8) keep liquid temperature in control. Now the liquid gets released from sections via internal release points (16.3) through various pipes from external exit points (16.4) and they are grouped in container of covering pipe (16.5). Again if needed air pressure from compressor could also be provided to these sections to ease the flow of liquids through pipes. The pipes come out from containers and are inside housing (16.6). The covering, pipe (16.5) keeps internal pipes in line and protects them from other components. The metal wires (16.7) joined with heating mechanism transfers heat till the end of pipes. A similar liquid holder without heater is also available in the machine to suffice cold/normal temperature liquid. While procuring, the release and quantities of liquids are controlled by solenoid valves through the Device Controller/microcontroller unit (1.11).

(b) Modules and Vessels:
  (i) Modules: Modules provide ease, efficiency, speed, productivity and modularity to automated cooking. These modules can cook any food item(s) multiple times as they are specifically designed for that purpose only, even modules can cook multiple compatible recipes given that ingredients input, processing and output are of similar nature. The system and machine play the role of platform for these modules to work on i.e. the system and machine performs majority of controlling and computation related tasks, while tasks related to hardware execution is being done by modules. The modules are provided with Module Bridge Interface feature of software, where controlling and computation driver/code related to modules are adapted in machine and allowed a platform to execute on. The feature of system's Module Bridge Interface (MBI) is provided/executed through USB, Serial, Digital sockets, Wireless Connection(s) etc and mechanical and pneumatic power is controlled through respective sockets i.e. modules can leverage physical and pneumatic power of machine through either and/or all available pouring unit(s), pneumatic socket(s), digital socket(s) based on their need. A very comprehensive, modifiable and updatable protocol interface has been designed and developed to communicate with external hardware attachments, which are designed to use Systems. Internal hardware and software features for cooking specific items with extra precision, multiple outputs and specialized cooking modules which work on timer and/or command-control basis i.e. System's architectural protocol. These modules may have their slave controller inside their respective devices. But it gets controlled by the machine and commands are generated according to system's communication protocol and Module Bridge Interface (MBI) protocol. These modules also get executed on basis of Recipe fire/data for cooking related tasks, but their technical working details are incorporated in their respective drivers. These whole features are governed by Central System and User Interface Device through Machine.

Example: Water ball module creates water balls in large quantities, the dosa module can make dosas, pudla of defined shape in large quantities while the puri maker will fry purls on a larger scale. Similarly the ganthia maker module, salad maker module etc works in their respective fields and serves better quality and quantity of respective dishes.

Vegetable Cutter, Slicer: This module enables the user to cut various commonly used vegetables in pieces, in order to use those pieces in cooking. For example vegetables like carrots, Lady's finger, Drumstick etc. could share a similar cutting pattern, in same way potato, tomato, onion, sweet potato etc spherical shaped vegetables can also be categorized to cut in similar manner. Again in day to day life the shape of pieces with utmost precision wouldn't matter a most. But their pieces in fastest possible time and that too automatically would prove useful. Hence this module would prove helpful to users in cutting vegetables in one go in predetermined pieces.

(ii) Vessels: Vessels on the other hand provide generic solutions for multipurpose activities related to cooking. Vessels in terms and domain of present invention are vessels with extended task execution mechanism and high level of compatibility and adaptability with machine. The machine is capable of providing high level of support to various types of vessels. Following are a few vessels addressing common task of assisting and completing cooking capabilities.

Figure 17:
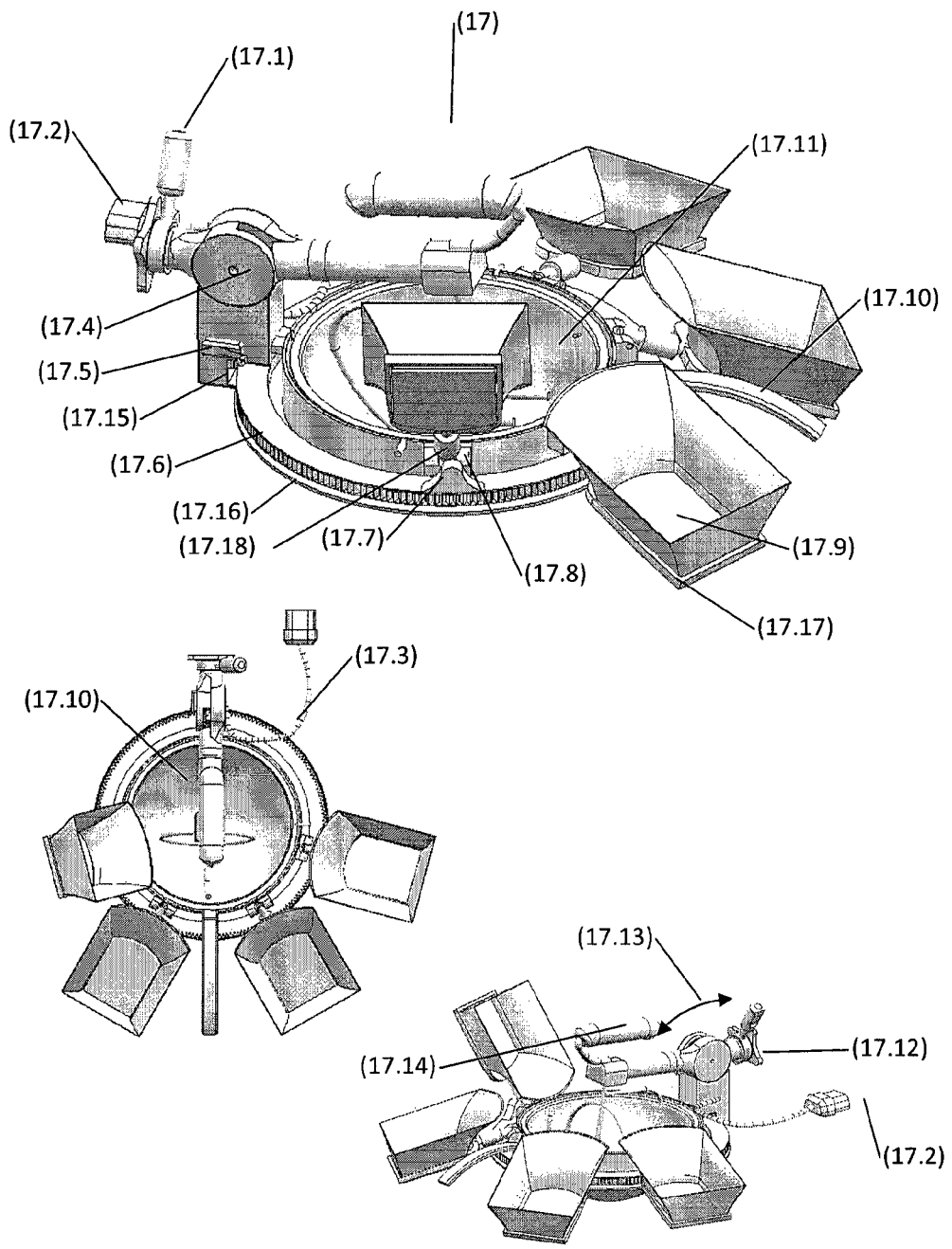
FIG. 17 displays the multi ingredient dropping vessel.

Multi Ingredient Dropper Vessel: This vessel has been specifically designed and developed to ease and fasten the cooking process. In many dishes, where cooking is complex in nature and which include multiple items to be added in the process of cooking the dish, this vessel eases the process and reduces the full time human interaction with the machine. This vessel supports multiple ingredients adding, multiple groups of ingredients adding mechanism inside the vessel. The adding mechanism inside the vessels holder adds each item such that after every N number of rotation steps of the gear unit or the rotating dial or bearing based mechanism, each item is dropped serially by applying, push/lift pressure upwards to buckets. These rotating and pausing points are fed inside technical detailing data file and driver of respective vessel in the system or the remote server such that when User Interface Device acquires data for the first time, all these essential and required information is downloaded in the form of vessel/module/attachment/hardware component's software driver details. The machine knows that at the first, vessel is needed to set in to the starting position, which it does by rotating dial backwards till starting switch/logic/signal isn't achieved, and then it would proceed further in dropping, buckets as and when needed, e.g. in order to drop first bucket it would have to rotate dial for e.g. 50 steps and for next bucket it would have to rotate dial to 15 steps. Other important constraints are also considered like the dropping of the next ingredient starts only after the addition of the previous ingredient has been completed. FIG. 17 gives a picture of the Multi Ingredient Dropper Vessel. This vessel has a attaching handle (17.12) to attach or detach, user pickup handle (17.14) for user gripping, handle (17.1), this attaching handle (17.12) will get attached at pouring, unit (14), a digital socket plug. (17.2) with a digital socket connecting wire (17.3) to let the vessel get connected with machine's controlling system i.e. the sensors, switches, feedback components etc get power and gets linked with controlling system, an angular stirring, attachment (17.4) which helps user to place the frying pan (17.11) by using frying pan handle (17.10) easily in main cooking area, as the gear mechanism inside angular stirring attachment (17.4) which can be angled up and down till the frying pan can be attached and detached, the gear mechanism (17.4) allows attachment to move in movement area (17.13) which can be viewed in images. The Multi ingredient dropper vessel works on view that user provides needed ingredients at beginning of cooking and rest shall be taken care of by the vessel itself. Items are required to be filled in buckets (17.9) as recommended by recipe file and machine. These buckets are fixed in its holding sockets (17.17). These sockets are mounted on base plate (17.16) through joining unit (17.8). Now the main concept behind this vessel resides in its gear mechanism and controllability through connecting handle. All operations related to dropping, sensing are done internally. When the vessel is connected with the machine, initially the geared disc/ring (17.6) is fixed at zero position with the help of proxy switch (17.5). Then stirring device's position is ascertained. All these digital/analog values are transferred by digital connecting socket (17.4 which gets connected at pouring units' digital socket(s) (14.3). The circular geared ring unit (17.6) is on freely mode of rotating on rollers, situated on base disc (17.16). This regulated movement/rotation shall be controlled and governed by either of precision motor/stepper motors (14.31) at back stage, while stirring shall be controlled by geared motor (14.34). This circular ring, geared unit (17.6) is rotated by a gear mechanism (17.15). When circular ring geared unit (17.6) rotates, the lifter (17.7) comes in contact with bucket's holding socket rotary unit (17.18) one by one, and this rotary unit (17.18) reduces traction and eases the lift of bucket. Gradually the bucket lifts and drops the ingredients into pan. Afterwards the lifter moves ahead and internal spring mechanism inside base joint (17.8) forces the lifted bucket down to normal position. This way the ingredients of all buckets could be dropped. This vessel has been designed to cater to the special purpose of adding separate and unique materials or group of materials to main cooking ingredients on specified time without need of human interactions. The whole action of addition of these ingredients is controlled by implicit routines of controlling application in User Interface Device/human machine interface, same way as it controls other hardware. Real execution of machine commands related to the vessels, get executed through these cables (17.3), digital sockets (17.2) and shafts (21.11). So commands like stirring, shaking, mixing, blending, adding of ingredients, suction, outlet control etc., which are to be performed in the main vessel, are controlled through these communication cables, mechanical shafts, digitally controlled valves, electro mechanical devices etc. This vessel also has the capability to add multiple main cooking pans which can be removed, cleaned and stored after the completion of the cooking, process, and same way buckets can also be easily attached and cleaned.

Figure 18:
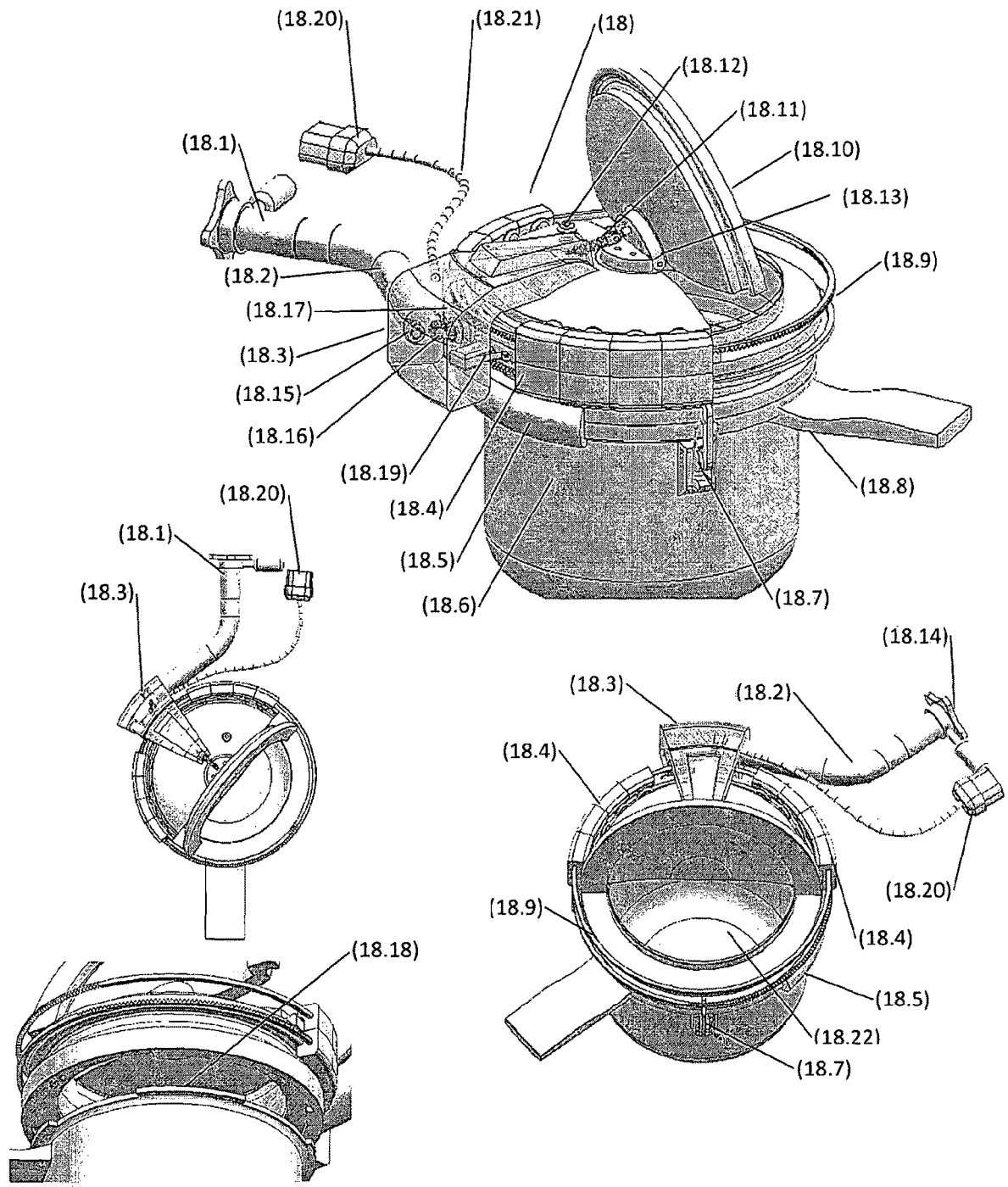
FIG. 18 displays the auto pressure cooker.

Auto Pressure Cooker: The auto pressure cooker has been designed and developed considering a very specific need of adapting a vast and fast cooking, technique, i.e. Pressurized Cooking. There are a considerable amount of cuisines and dishes where a part or full dish is prepared by pressurized cooking. This vessel has certain basic characteristics in order to get itself compatible with machine and System. FIG. 18 displays the complete design of the auto pressure cooker. This vessel is adaptable/compatible with system as it follows the physical, digital, mechanical, virtual etc protocols laid down by the system to ensure automated cooking. This auto pressure cooker is connected physically, mechanically, digitally and virtually with the machine and the system. The attaching handle (18.1) is the generic handle which gets attached with pouring unit (14). This helps in controlling the functions/features in the auto pressure cooker. The auto pressure cooker has various parts including the hollow/pipe shaped bended handle (18.2) joined with attachment handle (18.1) and gear and pulley housing (18.3), shafts inside of the holding bended pipe (18.2) which act as a rotational force transmission housing through the pipe and provides heavy base for the auto pressure cooker to get fixed with pouring, mechanism (14), these shafts uses flexible coupler, angled coupler, gear units, multiple universal joint to transfer their power throughout the pipe. The inner shafts (18.14) transmit the rotational force from the attachment handle (18.1) to the gears (18.16) and pulley (18.15). The mechanism backed by bevel gears (18.16) control the rotation/circular movement of circular geared ring (18.9). This ring, is attached/fixed with rollers (18.4), which moves on upper edge bottom ring of the top part of the auto pressure cooker and lower edge of the bottom/base part of the auto pressure cooker i.e. on outer diameter of edges of bottom base and top cover of cooker. The shapes of both edges are made such that the rollers (18.4) can move only on the rounded track of the circular way surrounding outer edges of the auto pressure cooker. This vessel has two rollers. All important mechanism present inside mechanism housing (18.3) is to automatically control opening and closing of auto controlled top window (18.10) and maintain closed position and retain internal pressure with the help of rollers. Firstly for closing the opened top window (18.10), the pulley (18.15) releases the holding cable (18.17) and spring (18.11) pushes the top window downwards till it gets closed, the reverse procedure of which would open the door. Now the gear units (18.16) are rotated which gradually move the circular gears rings which in turn moves the rollers on its track front its zero/default parking position, as the window is down and tracks are now on a common level where in the roller can easily move in. The position of circular gear rings is such that the main bevel gear is in middle and both rings (18.9) are in top and bottom of bevel gear. Now on every movement of the bevel gear, these rings moves to opposite directions and so do the rolling units (18.4). The rollers/rolling units will only be rotated/slided/rolled in, till a uniform grip over window and bottom cooker's (18.6) edge is achieved at a predetermined angle for both rollers. This grip ensures proper pressure inside cooking area (18.22), and this mechanism ensures no need of continuous push to window is required, during the time the cooking is in process. The rollers are again moved backwards as and when required i.e. to add any ingredient, perform pouring actions, finishing cooking process etc. These rollers are brought to its parking position with the help of digital sensor/switch, which is connected to machine via cable (18.21) and connecting socket/plug (18.20), when the sensor/switch (18.19) activates the machine/system comes to know about ratting units' position. The top and bottom parts of the auto pressure cooker are two separate entities. For easy cleaning, and handling, both of them are separated but while cooking they get joined. Firstly the user fits bottom part which is moved inside a half circular connecting socket (18.5). When the edges of both top and bottom parts, are made concentric/equal, the user then activates the fitting lever/latch (18.7) in both side of holding handle (18.8) which holds both parts till the lever (18.7) is deactivated. Again the top and bottom parts can also be attached as per normal circular gripping and locking (18.18). The window (18.10) is attached with top of cooker with the help of heavy duty hinges (18.13). A pressure release whistle (18.12) releases the over pressure while cooking. The pressure can also be regulated by digital pressure regulator with the help of digital socket (18.20).

Once any vessel/module is attached with pouring, unit(s) with the help of its attachment handle, all its rotational/controlling shafts gets inserted in to pouring unit's collet grippers teeth. After this process the cylinder controlling fastening and releasing of collets' via circular bearing mechanism is joined in such a way that all the collets are gripped and released in one go. As it gets activated all the shafts are tightly gripped. Now when arty motor rotates, the shaft also rotates and hence it rotates the collet via shaft connector sockets. Now this force rotates the shaft inside the handles to move respective cooking tool such as stirrer, blender and/or performing activity like opens window etc. When the cooking process gets over, the user is asked to grab the vessel one by one. When user gives green signal the pneumatic cylinder deactivates and user is asked to rotate the gripping handle to release vessel from the pouring unit.

Figure 19:
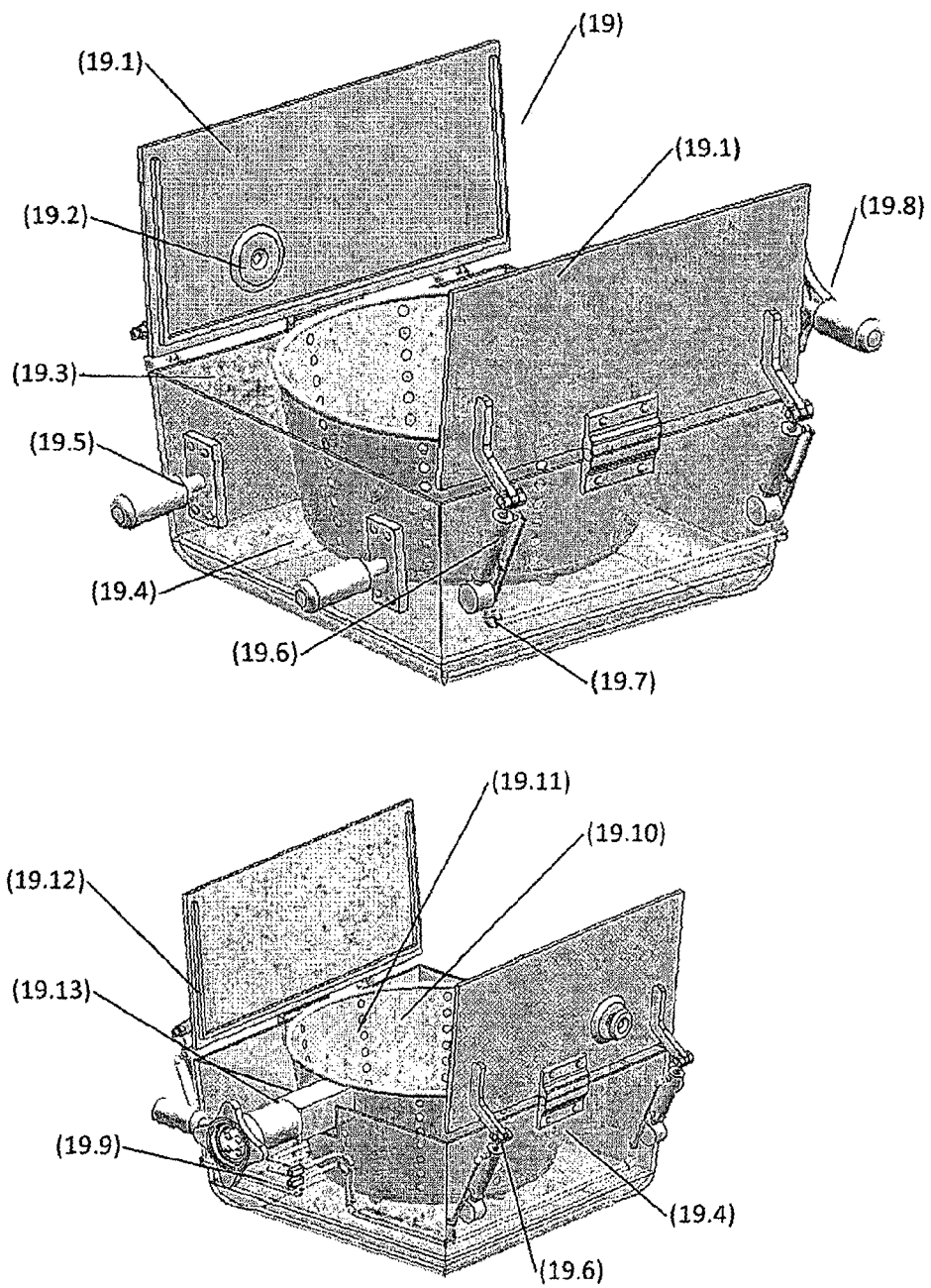
FIG. 19 displays the fryer/steamer/boiler.

Fryer/Steamer/Boiler: The fryer/steamer/boiler is used to auto fry or auto steam or boils the ingredients kept inside this vessel. This vessel also collects/procures items in multiphase cooking, which after frying or steaming, if required, are ultimately added to the main cooking dish. This or any vessel directly works according to the commands, and can work in isolation in single phased cooking or in team work in multi phase cooking. This vessel also steam cooks or boils ingredients and if required can pressure cook them with the help of auto closing doors as shown in FIG. 19.

The open and close operations of top doors are controlled with the help of air/pneumatic pressure cylinders which are powered by connecting nozzles/sockets available in respective heating unit. These sockets are connected to pneumatic connection module (23.8). FIG. 19 shows the fryer/steamer/boiler vessel which has pressure/safety doors (19.1), which are used for internal vessel's/spider's (19.10) task assistance i.e. to retain pressure inside of external body (19.4) i.e. liquid filling area (19.3) where water, butter, oil, liquid mixture etc. edible liquids are to be heated. The ingredients are placed inside the pan's/spider's cooking area (19.11). Auto pressure release valve (19.2) helps releasing extensive pressure in case of boiling or steaming from internal chamber. The user handle (19.5) helps users to place this vessel in top of burners. The vessel's (19) stand at bottom of it and top of heating unit (5) also assists in exactly placing, of this vessel. With the help of pneumatic cylinders (19.6) the doors (19.1) are opened and closed, while the sealing of pressure retaining material (19.12) also keeps the chamber air tight. These cylinders are powered by pneumatic cylinders' pipes (19.7), which again are connected with pneumatic pipe joining quick connection sockets (19.9) which would get connected with pneumatic connecting sockets (23.8). Attachment socket and handle (19.13) are used to attach pan/spider (19.10) with pouring unit (14) with the help of attachment detachment handle (19.8). The pan can also be used with stirring/mixing attachments. This module enables the user/machine to fry or steam or boil materials and also perform post fry/steam/boil actions like pouring, presenting etc.

Generic Cooking Vessel: This is a cooking, vessel used generally which can accommodate all kinds of pans and other vessels for cooking. As shown in FIG. 20, the generic cooking vessel has user handle (20.1) for attachment with pouring unit (14) via attachment socket and handle (20.2), circular frame (20.3) which adapts multiple types of pans/vessels (20.8), these pans could be tightened and released with the help of bolt with key (20.4), straining sheets with very small to big holes (20.5) helps machine to release liquid type material from pan while keep required material, or it can be used to take out liquid ingredients leaving non liquid in pan; in cooking any cases could be utilized, again strainer (20.5) with multiple straining capacity can also be added, stirrer (20.6) helps internal material to stir and mix, while blender (20.7) blends the material kept inside, all shafts are capable of simultaneous movement e.g. both these stirrer (20.6) and blender (20.7) can work simultaneously inside pan body (20.8). The ingredient area (20.9) holds ingredients while cooking process is going on. The blender cover (20.10), blender blades (20.11) and blender shaft (20.12) are blender mechanism for safety and efficiency of blending type of tasks. This vessel can grab any recommended pan (20.8) in its frame structure (20.3) whose grip is fastened with the help of bolt (20.4) at the end of the structure and can be adjusted as required. This vessel can perform three valuable processes namely blending, using the blender (20.7) which has blades (20.11) similar to the hand blender, stirring using the stirrer (20.6) and straining/filtering, using the strainer (20.5). When a cooking, process involves any or all of these three processes, these attachments prove useful. E.g. while preparing "daal" (spicy/non spicy soup both made from cereals, pulses etc.), initially the cereals are added to the pan followed by the addition of hot water from the liquid container. After some time when water is to be removed, a specific container is placed beside this pan and the pouring mechanism strains the liquid to that temporary container. Again water is added in predetermined quantity and the cereal is cooked for some time with required seasonings. This cereal is then stirred using the stirrer and blended using the blender all of which are present in the same vessel. During this time, the cooking of the other part is also in process and when it reaches a particular predetermined position, the cereal liquid is added to it through the pouring mechanism using the pouring actions.

Figure 21:
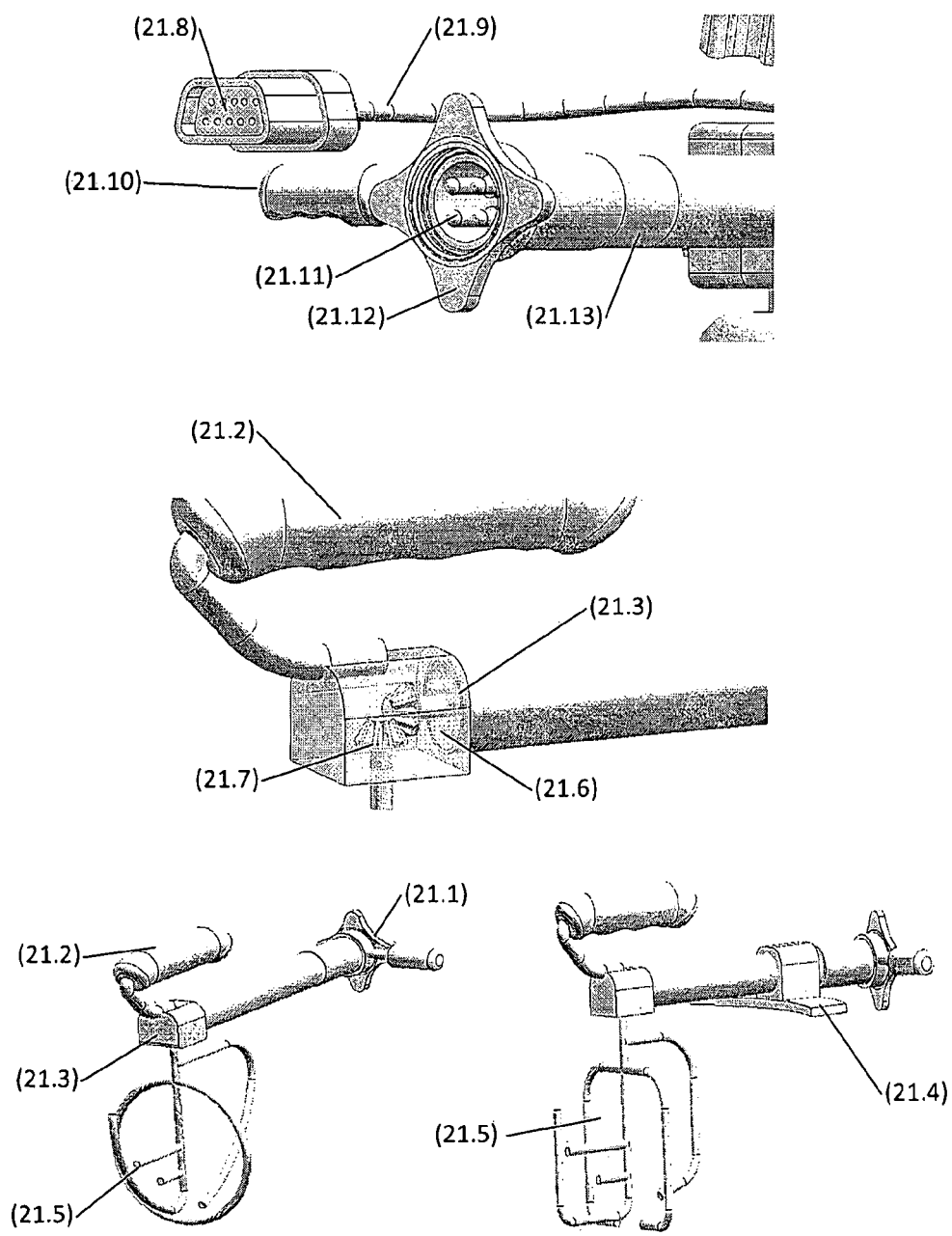
FIG. 21 displays the generic stirring attachments.

Generic Stirring Attachments: These attachments available with the machine, can be attached to a variety of vessels being joined to the machine for the purpose of stirring the ingredients properly while cooking. FIG. 21 displays these generic stirring attachments which show an extended stirrer to fit in various types of bases of vessels. The shape, design and movement pattern routine of this attachment is made ingredient friendly so that while stirring, the materials it doesn't crush them but stirs them gently. All the materials of the pan also get mixed properly using, this attachment as its shape matches that of pans. As shown in FIG. 21, these stirring attachments include, the generic attachment physically, mechanically, connecting handle (21.1) which includes shafts with mechanical gear units (as required) in its hollow piped body (21.13.. The shaft(s) (21.6) gets rotated by pouring unit (14). It rotates the bevel gears and other gear unit(s) (21.7) changed perpendicularity in angle inside housing (21.3) helps to convert horizontal shaft movement of shafts (21.11) to vertical movements, directed to vessels cooking area. There are various uses of the rotational force like, stirring, opening and closing of doors through pulley, sliding of roller locking system, rotating etc. The structure like frame support structure (21.4) provides, supporting base to various vessels while they are attached with this attachment (21), where the user handle (21.2) is used by the user to place the attachment/vessel or to take it out etc. The stirrers (21.5) in the attachment (21) can adapt and cover various shapes of pans and vessels. Digital connection sockets (21.8) with connecting cable (21.9) allow joining the attachment virtually and digitally with machine. These sockets provide power to various sensors, read their values, controls various hardware etc.; this also allows machine to read various sensor reading and other important feedbacks from attachment(s). The user handle for fastening and releasing (21.10) allows these attachments to lock or unlock this unit with machine's pouring unit (14). Now RFID chip (21.12) inside fastening socket handle (21.1) provides unique identity of attachment. From this identity, the machine will fetch all required data from its database, i.e. name of attachment, type of attachment, available tools for cooking in attachment, mapping, of tools with motors, mapping, of sensors with pins etc. The stirring attachment can also be powered by pneumatic controlled cylinders and components. With the help of these attachments the ingredients are mixed in a traditional method of using a frying ladle. The series of gears and gear mounting, housing, the rotational power received from the motor through flexible shaft is used for mixing of the ingredients in the pan. The frying ladle moves front and back till the end of the pan's edge. The additional rotary mechanism rotates the frying, ladle in a circular way which aids in proper mixing of the food item being cooked.

Figure 22:
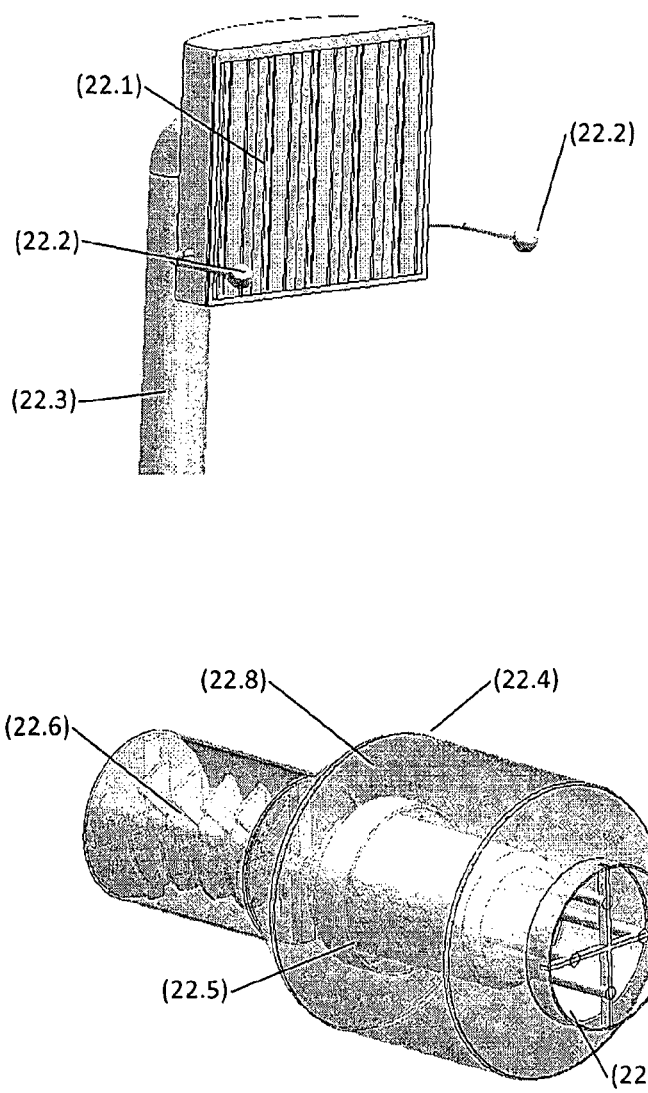
FIG. 22 displays the let exhaust unit.

Jet Exhaust System: During the process of cooking, lots of fumes, vapors, smoke etc. are liberated. These gases being light in nature i.e. thinner then air, they try to find its way upwards. If these gases do not find a proper way, they could stick to the machine's internal parts and may harm its proper working. So to ensure the proper working of the machine, it is necessary to provide a better exit way. The dynamic jet suction exhaust unit is used for this purpose. The intelligence of system manages the working of this unit, i.e. when any ingredients are getting dropped; this unit is deactivated for a while. Once the ingredients are dropped it again gets activated. It dynamically changes its position and working, based on the requirements by the machine. This unit collects the liberated vapors from both the burners and pushes these gases outside. FIG. 22 shows the jet exhaust motor unit (22.4) inside motor housing (22.8) in the machine which has an exhaust suction module (22.1) to suck in the exhausted gases from the machine through exhaust pipe system (22.3) which transfers these sucked gases. As the unit has been integrated in a pipe itself, it provides better vacuum which leads to better and efficient vapor suction. FIG. 22 also displays the exhaust housing which has the high efficiency motor (22.5) and the blades/propeller (22.6) integrated in the pipe system itself which provides better suction of fumes and vapors. These vapors go out through outlet point (22.7). The suction module (22.1) also has heat detection sensors and smoke detector sensors (22.2) for safety, which detects abnormality in flames and can shut off main heat source on any safety related issue findings.

Figure 23:
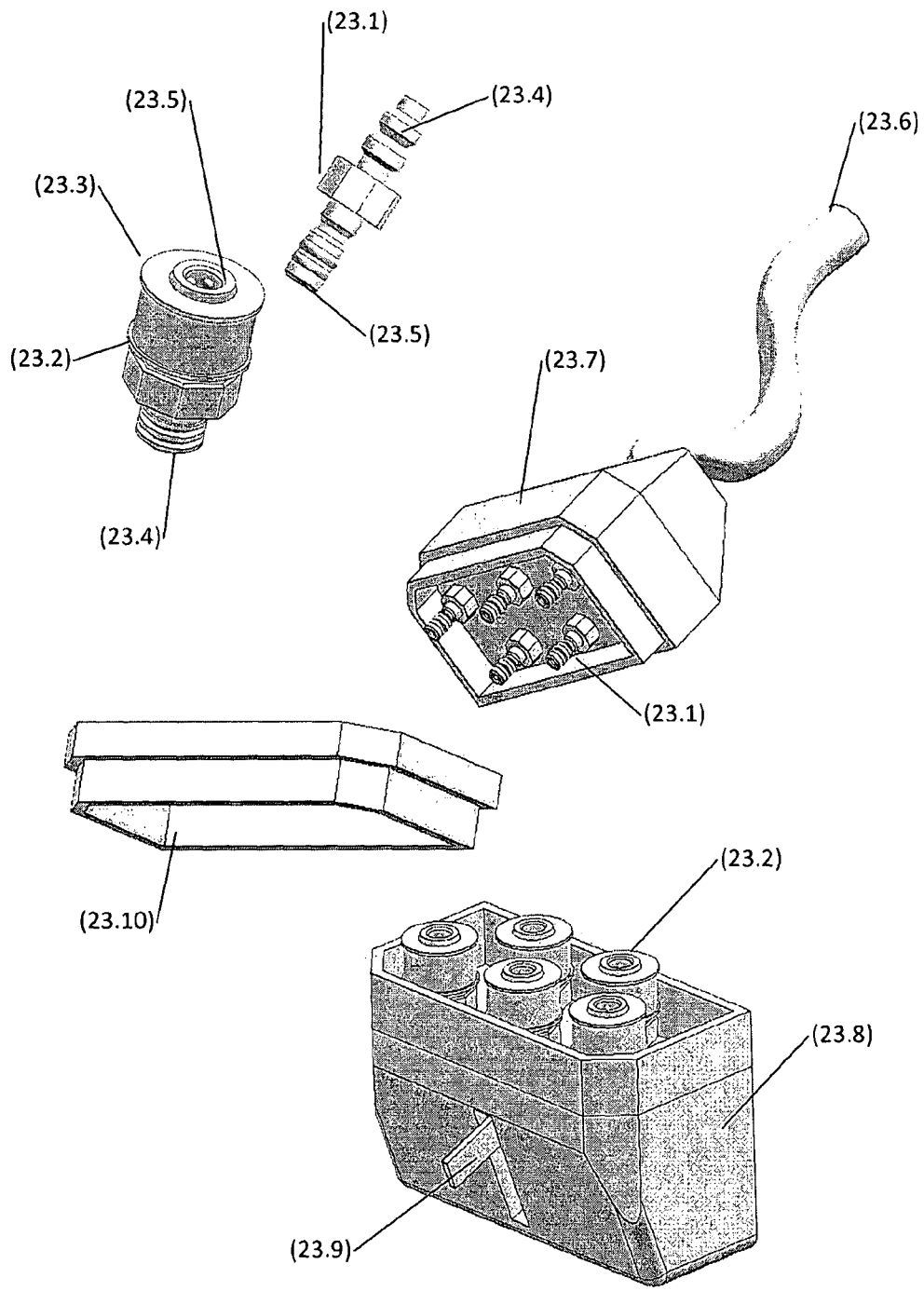
FIG. 23 displays the pneumatic quick connection system.

Pneumatic quick connection system: The pneumatic quick connection unit is the unit which provides common junction points in machine for various types of vessels and modules to get powered through pneumatic system of machine. This unit acts as a place told provide pneumatic power. When any module or vessel needs pneumatic support for its various needs, that module or vessels' pneumatic connection socket (23.7) is joined with source pneumatic connection socket (23.8). Once the connection is made, the flow of air through compressor (24.1) is provided through pipes and digitally controlled valves which are controlled by Microcontroller unit (1.11). Its various parts displayed in FIG. 23 include quick connection male (23.1) which gets inserted in quick connection female (23.2) through joining sockets (23.5). The quick connection attach/detach housing (23.3) allows the male unit to easily get inserted. Once inserted the housing (23.3) can be released, resulting in full grip of unit, the pipes shall be attached at attach end (23.4), a group of multiple pneumatic pipes (23.6) provides single unit attachment options through multiple male sockets module (23.7) and their counterpart multiple female sockets module (23.8). This unit to unit attachment and detachment is facilitated by multiple socket attach/detach lever (23.9) and safety cover (23.10) helps female socket (23.8) when not in use.

Supportive Hardware: In the system of the present invention, the supportive hardware have been integrated in design so that optimum and effective versions of these hardware are utilized. These hardware make the machine integrated in a single unit which is highly, portable so that it could be moved to any location and do not require other related hardware to be moved with the machine Compressor: Motor powered Compressor has been used in this machine as it has various components working on air pressure, although relative attention has been given in selecting as silent compressor as possible. This compressor powers various components e.g. actuating cylinders move other hardware attached to their end, the pressure of compressor with hot steam could be used for instant cleaning etc. FIG. 24.1 shows such a compressor for pneumatic related hardware parts movement.

Refrigerator System: As the system of the present invention is an end to end food preparing system, it has to deal with raw materials and ingredients which could be perishable in nature. A cooling unit is essential in this system as it has the luxury of delayed cooking. So it has to store and provide ingredients that are of perishable nature in the refrigerator. This unit backs the requirement of Item Holding chamber (9), sauces holding chamber/container unit (12.12) etc. FIG. 24.2 displays an iconic refrigerator unit for perishable ingredients holding and dispensing unit. This refrigerator is placed on the back side of the machine as displayed in FIG. 1(*f*).

(d) Sensors and Internal Feedback System:

Initial default sensor reading: This ensures proper working of sensors in the machine. To ensure its proper working, dummy scenarios/objects are provided as and when required, and the readings of various sensors are recorded and compared with stored bench marks if these sensors provide reading, in a default manner, the machine's working, is continued. Otherwise the user is alarmed regarding, the severity of the failure/problem and the machine stops functioning till the problem is identified and proper solution of this problem is suggested and performed. The primary means of movement and activity tracking are the encoders and electronics based components attached with a source of motion and/or area of consideration. They provide failsafe values of components movement and position in its working area. Along with these set of components, a secondary chain of modules also assist in this task. FIG. 24.3 is an iconic image of Digital Color Sensitive camera module which has the iconic electronics display and the color detection camera which also detects the digital motion. This module is placed on the top center of the machine in such a way that maximum of machines moving components fall in this module's area of vision. As it is a secondary movement tracking system, it provides useful tracking of moving components. All the moving components are highlighted with different color codes which can be easily spotted by this camera module.

Sensors: Sensors are used at various points to ensure the safe and secure functioning of the machine. When the user initiates the system, it goes through a self check to check the various hardware positions.

Gas Sensors: Gas sensors include pressure sensor, gas flow presence sensor etc. These sensors provide very and important critical information regarding gas. Gas availability and release check is done for checking, release of the gas flow, which depends upon its availability which is very essential for cooking. So initially, the pressure of the gas is checked after which flow is released and heat is measured. The burner gets heated over a given (tested and secured) point of time which is sensed by the sensors. Similar checks/detections are also done on non gas based stoves i.e. electric stoves. The main logic behind this checking is to maintain smooth working of the machine.

Temperature & Humidity Sensors: These sensors provide information regarding the temperature of burners, vessels, and area surrounding the vessels. These sensors are of two types, contact and contact less. Both these sensors serve similar purpose but in different ways. The information provided by these sensors is further used in regulating flame/heat in burners/electric stoves, estimating flame diameter and reach etc. Again flame sensors installed at other important locations also provide information about flames occurring where it shouldn't, and pro activate steps could be taken in advance. Similarly, humidity sensor readings are also considered in the machines' functioning.

Smoke Detector: The machine also has smoke detectors, flame detection sensors which don't allow flame to reach outside the predetermined area. The temperature sensors also provide live temperature readings which are compared with benchmark data of the recipe being cooked.

Toxic Gas Sensors: The machine provides information regarding stale or unhealthy ingredients status by performing an ingredient status health check which is performed at regular intervals. This is done by performing an environment air scanning. Staleness of food produces certain bad air molecules which can be detected and monitored. Advanced sensor mechanisms are used for ensuring, proper usage of various ingredients. When an ingredient gets stored inside the machine, its active life starts. The system monitors these ingredients for expiration signals. This is done by using sensors, which detect the various output gases produced by stale food. These readings are compared with normal benchmarks and accordingly the system informs the user by various methods notifications methods.

Position sensor for all moving mechanisms: To cover the machine and its, execution in a closed loop system, various sensors and custom made feedback modules/ proxies are incorporated at various locations in the machine. The feedback obtained from these modules ensures correct movement/execution detection of each command executed and hence keeps the machine in its actual position and the User Interface Device—Device Controller/Microcontroller Unit's virtual position about the machine in the same page. The hardware limit points are also incorporated for a failsafe system. Some of them include, proximity sensors, rotary, linear encoders, customized linear potentiometer based distance measurements, push, pull switch based positioning, infrared heat/temperature detection system, temperature detection sensors—contact type, visual and/or color detection system and live system log in Black Box feature.

(e) Security System:

User's Security: The machine and system's work process is designed and created considering the users' perspective in the center. So the users' security is at the top priority level. Hence the user is provided with full machine's working, details in the User Interface Device or in the user's tablet/smart phone via live system's video streaming. The machine has intelligent sensor systems inside the machine, technical logics for safe cooking, visual display system etc. which help the system perform its tasks in safe and secure manner.

System/Machine's security: There are various parameters which maintain the system/machine's security like all the uploaded recipes are virtually/physically tested according to the standards defined by the system and passed through various virtual and physical testing scenarios to ensure good taste, healthy ingredients combinations, safe cooking (executions) processes, easy user interactions, least human interface steps requirement, optimum business logic formation, audio visual assistance and recommendations etc. Moreover all the latest necessary security measures of authentication, authorization etc. are considered to ensure that the user's data is kept safe, the recipe data are integrated, there is smooth flow of information through system and there is authorized operation of machine/system. The data of the system which is very important and crucial won't be accessed by unauthorized persons thus making the system secure.

The present invention is a multi-cuisine, single or multi phased cooking system which can automatically cook various Indian cuisines like Gujarati, Punjabi, Rajasthani, Marathi etc. which includes different kinds of techniques, styles etc. as well as international cuisines like Chinese, Thai, Asian, American etc. In the present invention, the user has to just give command regarding the food item to be prepared and the time at which it needs to be ready and the system makes the food ready at the specified time. In the multi phase of this cooking system, the device can cook multiple recipes or multiple parts of recipe at the same time. Moreover, where some recipes need different ingredients to be cooked differently and then mixed, like in recipes where the gravy, sauces, stuffing, curry liquids, cooking portions etc. need to be prepared separately and the additives need to be cooked separately, the multi phase can simultaneously cook/mix/store/hold these different ingredients separately and then mix them as and when mentioned in the recipe, and custom developed multi phased cooking, related algorithms' computations. Moreover, the interactive features of the system communicate with the user as and when required.

The cooking system of the present invention is available in various models and versions based on various features which include preparation of single/multiple dishes, presence of different kinds of storages like cooling unit for perishable items, heating unit to keep temperature sensitive materials like butter or ghee in liquid form, normal storage units for storing cereals/grains/pulses etc., dispensers for ingredients of other shapes and sizes e.g. ingredients like jaggery etc. and others. Ingredients which are in unorganized form or shape are provided with various organizing tools which help in systematic storing, dispensing, etc. of those ingredients. The raw material units in the system will store and/or demand from user, interactively all the vegetables, grains or special required items etc. respectively and use them as per the requirement based on food item selected. The system contains specific storage sections and dispensers for powder form, liquid form, solid form, or other form applicable of ingredients used in cooking. Sometimes, if the user demands some special food item, and some ingredients of that recipe aren't present in the device, the system demands interactively from the user to input the ingredient in special provided containers prior to its initiation of cooking. However, if the user doesn't provide the ingredient, the system will continue cooking the food item without the ingredient depending on its necessity in the dish specified. Similarly, there are various sections designed for different types of raw materials e.g. liquid section to hold all liquid items, spices section for spices, cereal section will hold all regularly used cereals, solid sections will hold solids etc. Moreover, special sections are placed to take input from user when required for preparing special or unconventional recipes. The system keeps a stock of the raw materials present and notifies the user regarding depleting, raw materials. If the system has been programmed it also places the order of the listed depleting items either online or offline as per its program.

The system of the present invention has and supports various special designed vessels for cooking, frying, boiling, steaming, etc. for better output and high percentage of compatibility with system to cook different kinds of food, as well as exhaust module, self cleaning module, power saving module etc. for the optimum working and maintenance of the system. The cooking system is capable of adapting with different special dish cooking modules and vessels which can be procured and used by the user as and when required. The system of the present invention has capabilities of cooking various special purpose dish with compatible modules which are optional and can be selected and procured by the user as and when required, e.g. it could be dosa/pudla maker which will make dosas/pudla of better quality, the water ball (panipuri) maker which will prepare and make available ready to eat water balls (panipuris) etc.

The present invention is also a compact cooking system and so is portable and can be taken-by, the user at various places like on picnics, holidays, tours etc. This way the portable fully automatic cooking system of the present invention has a number of features, the first and topmost one among which is that it is a fully automatic cooking system which doesn't require or has the least requirement of manual presence to cook food based on the food item selected. The system also supports manual overridden option which can be done at any point of time by user. It is a self contained kitchen as all the essentials of the kitchen, be it the vegetables, the spices, temperature sensitive containers, the liquid additives, the powder additives, the solid additives, the specially designed vessels & kitchen utensils for cooking, the cooking range, everything are included in this device which are controlled by controlling unit. Moreover the system is self sufficient in cleaning and can automatically clean its various modules and vessels. The system of the present invention can be used as a single tasking or if required as a multi tasking, device i.e. it can cook a single food item or multiple food items at the same time. This system is a multi-cuisine single and multi phase system which is available in various variants which can automatically cook both Indian and International cuisines automatically and so has worldwide application specially in developing and developed countries where nuclear families are widely prevalent and all the adult members of the family work outside the house. Due to this they don't have sufficient time and sometimes skill to cook food and so can get benefited by using this automatic cooking system. This automatic cooking system becomes the best option for busy, aged etc. people who don't have the time, resources, and capability etc. to cook food or for people who don't know the art of cooking. This system prepares food hygienically and so makes healthy food and if programmed for specific health oriented, it too can be prepared using this system food as it maintains user/group modifiable profiles in system. It makes food cooking cost effective and can cook tasty, food completely in accordance with the recipe provided. The device also provides diet conscious suggestions which are scientifically generated from its database. It has various supportive modules which are dedicated for the preparation of specific food items. Moreover the vessels, used in this system are compatible with it and gives better output then conventional vessels. The system of the present invention can also work on live running bases such that the user can prepare food items as per his requirement by controlling the system from its control panel i.e. on manual override mode. In such a case the user need not select a recipe file of the food item from the system's memory and can prepare food according to his own recipe directly from default control panel device i.e. tablet/computing device by using systems' controlling software application. Such recipe prepared can be stored in the system's memory and can also be shared as per the user's wishes for free or for gaining monetary benefits. Moreover the controlling of the system is very simple without any complications making it easy to be used by the common man without the need of special training. Thus the system of the present invention is very advantageous and very useful for ranges of users and scenarios.

Although the preferred embodiment as well as the construction and use have been specifically described, it should be understood that variations in the preferred embodiment could be achieved by a person skilled in the art without departing from the spirit of the invention. The invention has been described with reference to specific embodiment which is merely illustrative and not intended to limit the scope of the invention as defined in the claims.

I claim:

1. An automated cooking system, the system comprising a machine unit, the machine unit comprising:
    a first vessel and a second vessel configured to receive ingredients required for cooking;
    at least one controller to control the functioning of the machine unit and the first vessel and the second vessel;
    a heating unit configured to heat at least the first vessel, wherein at least a portion of the heating unit is in contact with the first vessel;
    a plurality of movable ingredient boxes configured to store and dispense ingredients upon requirement;
    an ingredient boxes moving mechanism, configured to move the movable ingredient boxes, the ingredient boxes moving mechanism comprising:
        at least one transmission unit connected to each of the movable ingredient boxes; and
        a motor coupled to the transmission unit to drive the transmission unit, wherein driving of the transmission unit results in movement of the movable ingredient boxes;
    a plurality of stationary ingredient boxes housed within at least one temperature controlled chamber;
    a procuring unit disposed underneath the plurality of stationary ingredient boxes, wherein the procuring unit receives the ingredients dispensed by one or more of the stationary ingredient boxes and transports the received ingredients to the first vessel; and
    a pouring mechanism comprising a pouring unit coupled to the second vessel, wherein the pouring unit is configured to, traverse along an axis to move the second vessel towards or away from the first vessel and manoeuvre the second vessel to pour ingredients present in the second vessel into the first vessel.

2. The automated cooking system as claimed in claim 1, further comprising an ingredient selecting mechanism configured to extract ingredients from one of the movable ingredient boxes, which is moved to interface with the ingredient selecting mechanism, the ingredient selecting mechanism comprising:
    a first coupling unit configured to engage with the movable ingredient box;
    a stepper motor coupled to the first coupling unit to operably rotate the first coupling unit about an axis;
    a slider configured to position the first coupling unit relative to the movable ingredient box;
    a guide member configured to engage with the slider, wherein the slider is configured to move along an axis of the guide member; and
    an actuator coupled to the slider, wherein the actuator is configured to move the slider along the axis of the guide member.

3. The automated cooking system as claimed in claim 2, wherein each of the movable ingredient boxes comprises:
    a second coupling unit to be operably engaged to the first coupling unit of the ingredient selecting mechanism, as a result of movement of the ingredient selecting mechanism moving along the axis of the guide member;
    an ingredient levelling mechanism for spreading and mixing uniformly the ingredients present in the movable ingredient box;
    a dispensing port through which the ingredients are dispensed out of the movable ingredient box; and
    a screw conveyor coupled with the second coupling unit, wherein rotation of the first coupling unit results in rotation of the second coupling unit, which results in the rotation of the screw conveyor, which results in directing the ingredients present in the movable ingredient box towards the dispensing port.

4. The automated cooking system as claimed in claim 3, wherein,
    each of the movable ingredient boxes further comprises an additional holding unit located underneath the dispensing port, to hold the ingredients dispensed from the dispensing port, the additional holding unit comprising:
        a gate, wherein opening of the gate causes the ingredients received into the additional holding unit to be dispensed; and
        a lever configured to open or close the gate; and
    the procuring unit comprising an arm configured to operably engage with lever, wherein the arm operates the lever to cause the gate to open, thereby enabling the ingredients dispensed from the additional holding unit to be received by the procuring unit.

5. The automated cooking system as claimed in claim 4, wherein the procuring unit comprises:
   a dropping bucket configured to receive the ingredients from the stationary ingredient boxes, wherein a stationary ingredient box activator lever is used to operably dispense ingredients from the stationary ingredient boxes;
   a bucket moving mechanism configured to selectively rotate the dropping bucket to transfer the ingredients from the dropping bucket to the first vessel or the second vessel;
   at least a funnel configured to operably receive the ingredients from the movable ingredient boxes, wherein the funnel is operably positioned above the first vessel or the second vessel;
   a movable ingredient box activator lever configured to dispense ingredients from the movable ingredient boxes into the funnel; and
   a plurality of valves configured to serve as passage for liquid ingredients to be supplied to the first vessel.

6. The automated cooking system as claimed in claim 5, wherein the pouring unit further comprises:
   a scanner configured to scan a portion of the second vessel and determine manner in which the second vessel has to be handled and operated;
   a first, second, third and fourth collet placed inside a collet housing, wherein the collets are configured to receive at least a portion of the second vessel;
   a digital and power connector configured to provide respective source to the second vessel;
   a tightening mechanism configured to tighten the grip of the collets upon receiving the portion of the second vessel;
   a high-speed motor coupled to the first collet via a first socket, wherein the rotation of the high speed motor results in rotation of the first collet thereby activating and controlling a first operation corresponding to the second vessel;
   a geared motor coupled to the second collet via a second socket, wherein the rotation of the geared motor results in rotation of the second collet thereby activating and controlling a second operation corresponding to the second vessel;
   a first and second stepper motor coupled to the third and the fourth collet, respectively, via third and fourth sockets, wherein the rotation of the stepper motors results in rotation of the third and fourth collet thereby activating and controlling a precision movement mechanism configured within the second vessel;
   base portion; and
   an actuator coupled to the base portion of the pouring unit, wherein the movement of the actuator results in rotation of the pouring unit.

7. The automated cooking system as claimed in claim 6, wherein the transmission unit of the ingredient boxes moving mechanism is a chain-sprocket mechanism, wherein the transmission unit comprises:
   a chain forming a loop, wherein each of the movable ingredient boxes are attached to the chain;
   a plurality of sprockets engaged with the chain;
   multiple sprocket bottom supports configured to provide stability to the sprockets; and
   a motor coupled to at least one of the sprockets, wherein rotation of the motor causes the sprockets to rotate, thereby causing the chain and the movable ingredient boxes to move along the loop.

8. The automated cooking system as claimed in claim 7, wherein the machine unit further comprises a slider-based ingredients dispenser unit comprising:
   a body defining a plurality of chambers to store ingredients, wherein each of the chambers defines a hole through which stored ingredients are dispensed;
   a motor coupled to the body, wherein the motor rotates the body to selectively position one of the chambers at a dispensing position;
   a fetcher disposed below each of the chamber, wherein the fetcher defines an opening that operably aligns with the hole of the chamber after the chamber is positioned at the dispensing position;
   a fetcher pushing mechanism comprising an actuator configured to displace the fetcher to align the opening with the hole of the chamber; and
   a spring mechanism configured to displace the fetcher from a position wherein the opening is aligned with the hole of the chamber after a required quantity of the ingredients is dispensed into the fetcher.

9. The automated cooking system as claimed in claim 1, wherein each of the movable ingredient boxes comprises:
   a primary chamber configured to store the ingredients;
   an attachment socket engaged with the transmission unit of the ingredient changing mechanism;
   an ingredient levelling mechanism for spreading and mixing uniformly the ingredients present in the movable ingredient box;
   a dispensing port disposed towards the bottom of the primary chamber, wherein the ingredients stored in the primary chamber is dispensed through the dispensing port;
   a screw conveyor located inside the primary chamber, wherein rotation of the screw conveyor causes the ingredients in the primary chamber to be dispensed through the dispensing port; and
   an additional holding unit located towards the bottom of the ingredient container to receive the ingredients dispensed from the dispensing port, the additional holding unit comprising:
      a gate, wherein opening of the gate causes the ingredients received into the additional holding unit to be dispensed; and
      a lever configured to open or close the gate.

10. The automated cooking system as claimed in claim 1, wherein the procuring unit further comprises a sensor configured to sense temperature of the first or second vessel over which the funnel is positioned.

11. The automated cooking system as claimed in claim 1, wherein the procuring unit comprises a dropping bucket configured to move, the procuring unit comprising a procurer slider unit comprising a screw rod and a motor to selectively rotate the screw rod, wherein the procuring slider unit is coupled to the screw rod, wherein rotation of the screw rod causes the procurer slider unit to move along the screw rod, thereby enabling the dropping bucket to transport the ingredients dispensed by the stationary ingredient boxes to the first vessel or the second vessel.

12. The automated cooking system as claimed in claim 1, wherein the machine unit further comprises a spherical-ingredient dispenser unit, the spherical-ingredient dispenser unit comprising:
   a holding chamber configured to store spherical ingredients, the holding chamber defining an opening at the bottom of the holding chamber;

a fetching unit defining a hole that aligns with the opening at the bottom of the holding chamber, when the fetching unit is positioned at a catching position, the spherical ingredients exit the holding chamber to be received by the fetching unit at the catching position;

a lever configured to align the hole of the fetching unit with the opening of the holding chamber; and a spring mechanism configured to displace the fetching unit from the catching position to a dispensing position, wherein in the dispensing position, the spherical ingredient received into the fetching unit is dispensed out of the fetching unit.

13. The automated cooking system as claimed in claim 1, wherein the machine unit further comprises a paste dispensing mechanism comprising:

a housing comprising a plurality of chambers, wherein each of the chambers is configured to hold ingredients;

a motor coupled with the housing, wherein the motor rotates the housing to position one of the chambers at a dispensing position;

a plunger provided in each of the chambers to push the ingredient from the chamber through a dropping point, the plunger comprising:
  a shaft having one of its ends extending outside of the chamber through a hole defined by the chamber; and
  a release activator agent coupled to the shaft, wherein the release activator agent is configured to assume a ready state and a release state;

a paste release activator configured to displace the plunger, wherein the paste release activator pushes the release activator agent from the ready state to the release state;

an actuator coupled with the paste release activator to displace the paste release activator, thereby displacing the plunger to a release position in which ingredients are dispensed; and a spring configured to displace the release activator agent from the release state to the ready state.

14. The automated cooking system as claimed in claim 1, wherein the pouring mechanism further comprises a lifting mechanism configured to lift the pouring unit, the lifting mechanism comprising:

a base plate, wherein the pouring unit is mounted on to the base plate;

a plurality of lifting rods configured to provide stability while lifting the pouring unit, wherein one end of the lifting rods is coupled with the base plate; and an actuator configured to lift the pouring unit to a required height, wherein a portion of the actuator is coupled with the base plate.

15. The automated cooking system as claimed in claim 14, wherein the pouring mechanism further comprises:

a screw rod configured to displace the lifting mechanism along the axis to move the second vessel towards or away from the first vessel;

a ball screw unit coupled with the screw rod, wherein the ball screw unit is disposed underneath the lifting mechanism; and a pouring mechanism motor coupled with the screw rod, wherein the rotation of the pouring mechanism motor results in rotation of the screw rod, which results in movement of the ball screw unit along an axis of the screw rod, thereby resulting in the movement of the lifting mechanism along the axis of the screw rod.

16. The automated cooking system as claimed in claim 1, wherein the machine unit further comprises an exhaust unit configured to guide gases away from the machine unit, the exhaust unit comprises:

one or more exhaust suction modules configured to suck exhaust gases from the machine unit;

a pipeline, wherein a first end of the pipeline is coupled to the exhaust suction module and configured to carry the exhaust gases towards an outlet point;

an exhaust motor comprising a shaft, the exhaust motor enclosed inside a housing and the shaft of the motor extending into a second end of the pipeline, wherein the shaft of the motor is coupled to a propeller;

an outlet point defined on the housing through which the exhaust gases exit; and a smoke detection sensor configured to detect abnormalities in smoke and further shut down the heating unit.

17. The automated cooking system as claimed in claim 1, wherein the machine unit further comprises a liquid dispensing unit configured to dispense liquid ingredients, the liquid dispensing unit comprises:

a body defining a plurality of chambers configured to store liquid ingredients, wherein each of the chambers defines a hole through which the liquid ingredient is dispensed;

a temperature-controlled area comprising a heating unit, wherein the heating unit is configured to maintain the temperature of the liquid ingredients stored in the chambers at a user defined value;

a conduit coupled to the hole defined by the chamber, wherein the conduit is configured to transport the liquid ingredient to the first vessel; and a heating mechanism provided with the conduit to enable liquid to flow freely via the conduit.

18. The automated cooking system as claimed in claim 1, wherein at least one of the first vessel or the second vessel comprises:

at least a body configured to receive and process ingredients for cooking;

a vessel controller for receiving instructions and executing;

a hollow handle and tightening mechanism attached to a portion of the body;

a plurality of shafts enclosed inside the hollow handle, wherein at least a portion of the shafts is operably coupled to the pouring unit;

at least a cooking mechanism operably coupled to the shafts, wherein the rotation of shafts controls the operation of the cooking mechanism;

at least a digital connection socket or at least a pneumatic socket, wherein the digital connection socket is configured to receive digital instructions from the controller, and wherein the pneumatic socket enables powering the cooking mechanism, wherein the pneumatic sockets receive power from a master pneumatic socket; and a RFID chip, wherein the RFID chip comprises the information about the vessel.

19. The automated cooking system as claimed in claim 18, wherein the first vessel or the second vessel is configured to enable preparation of dishes which requires input ingredients that are similar in their construct and have output that is similar in form.

20. The automated cooking system as claimed in claim 1, wherein the machine unit further comprising a sensing unit, the sensing unit comprising:

a colour sensitive camera configured to monitor cooking process and detect changes in the cooking process;
a gas sensor configured to detect gas fuel availability and regulate the gas flow based on the availability of the gas fuel;
a temperature sensor configured to detect temperature of at least one of the first vessel or the second vessel;
a toxic gas sensor configured to detect the emission of toxic gas from the cooking process or expired ingredients; and
a weight sensor configured to detect weight of ingredients received by the first vessel or the second vessel.

\* \* \* \* \*